United States Patent
Mook et al.

(10) Patent No.: US 10,961,949 B2
(45) Date of Patent: Mar. 30, 2021

(54) ENERGY CONVERSION APPARATUS AND CONTROL SYSTEM

(71) Applicant: General Electric Company, Schenectady, NY (US)

(72) Inventors: Joshua Tyler Mook, Cincinnati, OH (US); Michael Thomas Gansler, Mason, OH (US); Scott Douglas Waun, Loveland, OH (US); Kevin Michael VandeVoorde, Cincinnati, OH (US); Aigbedion Akwara, Cincinnati, OH (US); Michael Robert Notarnicola, Cincinnati, OH (US); Jason Joseph Bellardi, Fairfield, OH (US); Mohammed El Hacin Sennoun, West Chester, OH (US); Mary Kathryn Thompson, Fairfield Township, OH (US); Mohamed Osama, Garching (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/878,797

(22) Filed: May 20, 2020

(65) Prior Publication Data
US 2020/0370504 A1 Nov. 26, 2020

Related U.S. Application Data

(60) Provisional application No. 62/850,701, filed on May 21, 2019, provisional application No. 62/850,692, (Continued)

(51) Int. Cl.
*F02G 1/047* (2006.01)
*F02G 1/043* (2006.01)
(Continued)

(52) U.S. Cl.
CPC .............. *F02G 1/047* (2013.01); *F02G 1/044* (2013.01); *F02G 1/0435* (2013.01); *F02G 1/05* (2013.01);
(Continued)

(58) Field of Classification Search
CPC ........ F02G 1/0435; F02G 1/045; F02G 1/047; F02G 1/055; F02G 1/06; F02G 2270/80;
(Continued)

(56) References Cited

U.S. PATENT DOCUMENTS 3,296,808 A 1/1967 Malik
3,552,120 A 1/1971 Beale
(Continued)

FOREIGN PATENT DOCUMENTS

CN 104763553 A 7/2015

OTHER PUBLICATIONS

American Stirling Company, Regenerators, 10 Pages. https://www.stirlingengine.com/regenerators/.
(Continued)

*Primary Examiner* — Mark A Laurenzi
*Assistant Examiner* — Xiaoting Hu
(74) *Attorney, Agent, or Firm* — Dority & Manning, P.A.

(57) ABSTRACT

A system including a closed cycle engine having a piston body defining a hot side and a cold side and having a piston assembly movable within the piston body. An electric machine is operatively coupled with the piston assembly. A control system includes one or more sensors operable to detect a piston movement characteristic of the piston assembly movable within the piston body. A controller is communicatively coupled with the one or more sensors and a controllable device. The controller is configured to determine a control command based at least in part on data received from the one or more sensors. The control com-
(Continued)

mand is selected based at least in part to cause the electric machine operatively coupled with the piston assembly to generate a preselected electrical power output. The controller provides the determined control command to the controllable device. The controllable device is operable to control an input to an engine working fluid disposed within the piston body.

30 Claims, 35 Drawing Sheets

Related U.S. Application Data filed on May 21, 2019, provisional application No. 62/850,678, filed on May 21, 2019, provisional application No. 62/850,623, filed on May 21, 2019, provisional application No. 62/850,599, filed on May 21, 2019.

(51) Int. Cl.
   *F02G 1/044* (2006.01)
   *F02G 1/05* (2006.01)
(52) U.S. Cl.
   CPC ...... *F02G 2244/52* (2013.01); *F02G 2270/80* (2013.01); *F02G 2280/10* (2013.01)
(58) Field of Classification Search
   CPC .. F02G 2244/12; F02G 1/044; F02G 2280/10; F02G 2275/00; F02G 2275/10; F02G 2275/20; F02G 2275/30; F02G 2275/40; F02G 2244/50; F02G 2244/52
   See application file for complete search history.

(56) References Cited

U.S. PATENT DOCUMENTS

| | | | |
|---|---|---|---|
| 3,777,718 A | 12/1973 | Pattas | |
| 4,026,114 A | 5/1977 | Belaire | |
| 4,030,297 A | 6/1977 | Kantz et al. | |
| 4,077,216 A | 3/1978 | Cooke-Yarborough | |
| 4,183,214 A | 1/1980 | Beale et al. | |
| 4,199,945 A | 4/1980 | Finkelstein | |
| 4,387,568 A | 6/1983 | Dineen | |
| 4,545,738 A | 10/1985 | Young | |
| 4,644,851 A | 2/1987 | Young | |
| 4,717,405 A | 1/1988 | Budliger | |
| 4,723,411 A | 2/1988 | Darooka et al. | |
| 5,005,349 A | 4/1991 | Momose et al. | |
| 5,172,784 A * | 12/1992 | Varela, Jr. .............. | H02K 16/02 180/65.245 |
| 5,675,974 A | 10/1997 | Heikrodt et al. | |
| 6,293,101 B1 | 9/2001 | Conrad | |
| 7,134,279 B2 | 11/2006 | White et al. | |
| 7,171,811 B1 * | 2/2007 | Berchowitz ........... | F02G 1/0435 60/517 |
| 8,720,198 B2 | 5/2014 | Wood | |
| 8,721,981 B2 | 5/2014 | Freund et al. | |
| 8,820,068 B2 | 9/2014 | Dadd | |
| 9,689,344 B1 | 6/2017 | Gedeon | |
| 2003/0163990 A1 | 9/2003 | Maceda et al. | |
| 2003/0230440 A1 * | 12/2003 | Kamen ................ | B60W 10/06 180/65.245 |
| 2004/0079087 A1 | 4/2004 | Chandran et al. | |
| 2005/0250062 A1 | 11/2005 | Kornbluth et al. | |
| 2006/0059912 A1 | 5/2006 | Romanelli et al. | |
| 2009/0025388 A1 | 1/2009 | Silver et al. | |
| 2011/0226284 A1 | 9/2011 | Taylor et al. | |
| 2011/0302902 A1 | 12/2011 | Kelly et al. | |
| 2012/0260668 A1 | 10/2012 | Rogers et al. | |
| 2015/0041454 A1 | 2/2015 | Foret | |
| 2019/0010834 A1 | 1/2019 | Ford | |

OTHER PUBLICATIONS

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Bright Hub Engineering, Oil Piston Cooling, Oct. 19, 2009, 6 Pages. https://www.brighthubengineering.com/marine-engines-machinery/52783-how-are-marine-pistons-cooled-with-oil/

Conner, 3D Printed Stirling Engine, Solar Heat Engines, Simulate, Analyze, Design, Build, and Test Solar-Powered Engines, Oct. 29, 2012, 12 Pages. http://www.solarheatengines.com/2012/10/29/3d-printed-stirling-engine/.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarheatengines.com/2012/12/18/a-regenerator-for-the-3d-printed-pe-2-stirling-engine/.

Deetlefs, Design, Simulation, Manufacture and Testing of a Free-Piston Stirling Engine, Thesis, Department of Mechatronic Engineering Stellenbosch University, Scholar Sun, South Africa, Dec. 2014, 138 Pages. https://scholar.sun.ac.za/bitstream/handle/10019.1/95922/deetlefs_design_2014.pdf?sequence=3&isAllowed=y Defense Visual Information Distribution Service (DVIDS), Mod II Automotive Stirling Engine, NASA, C-1986-3706, Washington, DC, 2 pages. https://www.dvidshub.net/image/844058/mod-ii-automotive-stirling-engine.

Defense Visual Information Distribution Service (DVIDS), Mod II Automotive Stirling Engine, NASA, C-1986-3724, Washington, DC, 2 pages. https://www.dvidshub.net/image/841262/mod-ii-automotive-stirling-engine.

Defense Visual Information Distribution Service (DVIDS), Mod II Automotive Stirling Engine, NASA, C-1986-3725, Washington, DC, 2 pages. https://www.dvidshub.net/image/759360/mod-ii-automotive-stirling-engine.

Devitt, Restriction and Compensation of Gas Bearings—Bently Bearings by Newway, Aston, PA, 5 Pages. https://bentlybearings.com/restriction-and-compensation/.

Dudareva et al., Thermal Protection of Internal Combustion Engines Pistols, Science Direct, Procedia Engineering, vol. 206, 2017, pp. 1382-1387. https://www.sciencedirect.com/science/article/pii/S1877705817353341.

Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.

Elizondo-Luna, Investigation of Porous Metals as Improved Efficiency Regenerators, The University of Sheffield, Doctor of Philosophy Thesis, Mar. 2016, 261 Pages. http://etheses.whiterose.ac.uk/13111/1/Thesis%20Elizondo-Luna.pdf.

Enerlyt Stirling Engine, Enerlyt, Glowing-Isothermal-Mechanical-Stirling-Arranged-Motor, Enerlyt Technik GmbH, Potsdam, 2012, 13 Page. http://www.enerlyt.de/english/pdf/en_motorbeschreibung_040413.pdf.

Engine Piston GIF shared on GIPHY, 1 Page. https://giphy.com/gifs/engine-hybrid-piston-10YygVUCHx2HC.

Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.

Free-Piston Engine Range Extender Technology, Sir Joseph Swan Centre for Energy Research, 2016. (Video) https://www.youtube.com/watch?v=u4b0_6byuFU.

Garcia-Santamaria et al., A German Inverse Woodpile Structure with a Large Photonic Band Gap, Advanced Materials Communication, Wiley InterScience, 2007, Adv. Mater. 0000, 00, pp. 1-5. http://colloids.matsc.illinois.edu/articles/garcia_advmat_2007.pdf.

General Electric—GE Power, Breaking the Power Plant Efficiency Record, 2016, 4 Pages. https://www.ge.com/power/about/insights/articles/2016/04/power-plant-efficiency-record.

Georgescu, Rotary Engine, 2007. (Video Only) https://www.youtube.com/watch?v=ckuQugFH68o.

(56) References Cited

OTHER PUBLICATIONS

Gibson, et al., Cellular Solids Structure and Properties, Cambridge University Press, 2$^{nd}$ Edition, 1997. (Web Link Only) https://doi.org/10.1017/CBO9781139878326.

Green Car Congress, New Toroidal Internal Combustion Engine Promises 20:1 Power-to-Weight-Ratio Energy, Technologies, Issues and Polices for Sustainable Mobility, Apr. 2006, 2 Pages. https://www.greencarcongress.com/2006/04/new_toroidal_in.html.

Hoegel et al., Theoretical Investigation of the Performance of an Alpha Stirling Engine for Low Temperature Applications, Conference: ISEC 15$^{th}$ International Stirling Engine Conference, ResearchGate, New Zealand, Jan. 2012, 10 Pages. https://www.researchgate.net/publication/256706755_Theoretical_investigation_of_the_perfomance_of_an_Alpha_Stirling_engine_for_low_temperature_applications.

Honeywell Aerospace, Ultra Long-Life, Flight Qualified Technology for High Speed Imaging and Sensing Infra-Red Detectors, Stirling Cycle Cryocoolers, Auxiliary Power and Thermal, Honeywell Aerospace, 2018, 3 Pages. https://aerospace.honeywell.com/en/products/auxiliary-power-and-thermal/stirling-cycle-cryocoolers.

Howden, Reciprocating Compressor C series—animation, Jun. 2017. (Video Only) https://www.youtube.com/watch?v=owNOdUBL37U&feature=youtu.be.

Huang, Toroidal Engine Ver: 2.0, 2017. (Video Only) https://www.youtube.com/watch?v=n5L0Zc6Ic8Y&feature=youtu.be.

http://www.hybrid-engine-hope.com/media/pagini/95_0071d630dba777d16e9a770de27060e6.gif (Web Link Only).

Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08ProjectPt4GtTemp.pdf.

Microgen Engine Corporation, Technology. (Abstract Only) https://www.microgen-engine.com/technology/technology/.

Murphy, IAV Sees Huge Potential With 3D-Printed Pistons, Wards Auto, Apr. 12, 2018, 6 Pages. https://www.wardsauto.com/engines/iav-sees-huge-potential-3d-printed-pistons.

Ni et al., Improved Simple Analytical Model and Experimental Study of a 100 W B-Type Stirling Engine, Applied Energy, vol. 169, 2016, pp. 768-787. https://www.researchgate.net/publication/296632477_Improved_Simple_Analytical_Model_and_experimental_study_of_a_100W_b-type_Stirling_engine/figures?lo=.

Nightingale, Automotive Stirling Engine, Mod II Design Report, DOE/NASA/0032-28, NASA CR-175106, TI86ASE58SRI, New York, 1986, 54 Pages. https://ntrs.nasa.gov/archive/nasa/casi.ntrs.nasa.gov/19880002196.pdf.

O'Dell, SuperTruck Program Scores Big, Head into Second 5-Year Phase, Trucking.com, 2016, 7 Pages. https://www.trucks.com/2016/10/31/supertruck-program-5-year-phase/.

Owczarek, On the Design of Lubricant Free Piston Compressors, Nonlinear Solid Mechanics, Faculty of Engineering Technology, Thesis, University of Twente, Enschede, Sep. 17, 2010. (Abstract Only) https://research.utwente.nl/en/publications/on-the-design-of-lubricant-free-piston-compressors.

Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.

Park et al., Thermal/Fluid Characteristics of Isotropic Plain-Weave Screen Laminates as Heat Exchange Surfaces, AIAA 2002-0208, 2002, pp. 1-9. https://wolfweb.unr.edu/~rawirtz/Papers/AIAA2002-0208.pdf.

Penswick et al., Duplex Stirling Machines, Sunpower Incorporated 19$^{th}$ Annual Intersociety Energy Conversion Engineering Conference, QP051082-A, vol. 3, No. CONF-840804, United States, 1984, 7 Pages. https://www.ohio.edu/mechanical/stirling/engines/Duplex-Stirling-Machines.pdf.

Pneumatic Round Body Cylinder—SRG_SRG Series, Parker, Richland MI, 3 Pages. http://ph.parker.com/us/en/pneumatic-round-body-cylinder-srg-srgm-series.

Qiu et al., Advanced Stirling Power Generation System for CHP Application, ARPA, Temple University, Philadelphia, 5 Pages. https://arpa-e.energy.gov/sites/default/files/Temple_GENSETS_Kickoff.pdf.

Ranieri et al., Efficiency Reduction in Stirling Engines Resulting from Sinusoidal Motions, Energies, vol. 11, No. 11: 2887, 2018, 14 Pages. https://doi.org/10.3390/en11112887.

Renewable Energy, Double-Acting Stirling Engine, Stirling Engine, 1 Page. (Abstract Only) https://sites.google.com/a/emich.edu/cae546816t5/history/types/double—acting-stirling-engine.

Rodriguez Perez, Cellular Nanocomposites: A New Type of Light Weight Advanced Materials with Improved Properties, CellMat Technologies S.L. Transfer Center and Applied Technologies, Valladolid, 35 Pages. http://crono.ubu.es/innovationh2020/pdf/cellmat.pdf.

Schonek, How big are power line losses?, Energy Management/Energy Efficiency, Schneider Electric, Mar. 25, 2013, 2 Pages. https://blog.schneider-electric.com/energy-management-energy-efficiency/2013/03/25/how-big-are-power-line-losses/.

Schwartz, The Natural Gas Heat Pump and Air Conditioner, 2014 Building Technologies Office Peer Review, ThermoLift, Inc., U.S. Department of Energy, Energy Efficiency & Renewable Energy, DE-FOA-0000823, 27 Pages. (Refer to p. 7). https://www.energy.gov/sites/prod/files/2014/11/f19/BTO%202014%20Peer%20Review%20Presentation%20-%20ThermoLift%204.4.14.pdf.

Shimizu, Next Prius Will Have Engine Thermal Efficiency of 40%, XTECH, Solar Plant Business, Nikkei Business Publications, May 22, 2015, 2 Pages. https://tech.nikkeibp.co.jp/dm/english/NEWS_EN/20150522/419560/.

Stirling Engines, Regenerators, What They Are and How They Work, American Stirling Company, 7 Pages. https://www.stirlingengine.com/regenerators/.

Stirling Engines, Solar Cell Central, 3 Pages. http://solarcellcentral.com/stirling_page.html.

Technology, Microgen Engine Corporation, 2016, 4 Pages. https://www.microgen-engine.com/technology/technology/.

ThermoLift, Technology—Background, The Thermodynamic Process Behind ThermoLift, ThermoLift, Inc., 3 Pages. http://www.tm-lift.com/background/.

Thimsen, Stirling Engine Assessment, 1007317, Electronic Power Research Institute (EPRI), Palo Alto, California, 2002, 170 Pages. https://www.engr.colostate.edu/~marchese/mech337-10/epri.pdf.

Thomassen, Free Floating Piston Film (mpeg).mpg, Mar. 5, 2010. (Video Only) https://www.youtube.com/watch?v=bHFUi0F0PgA.

Toptica Photonics, 2-Photon Polymerization, FemtoFiber Technology for Two-Photon Polymerization, 2 Pages. https://www.toptica.com/applications/ultrafast-studies/2-photon-polymerization/.

Toyota Motor Corporation, Inline 4 Cylinder 2.5L Injection Gasoline Engine/New Transaxle, Global Website, Dec. 6, 2016, 2 Pages. https://global.toyota/en/download/14447877/.

Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-notes/MIT3_054S15_L13_Cellular.pdf.

Urieli, Chapter 5B—Regenerator Simple Analysis, Stirling Cycle Machine Analysis, Ohio Edu, Jan. 17, 2010, 5 Pages. https://www.ohio.edu/mechanical/stirling/simple/regen_simple.html.

Vodhanel, Characterization of Performance of a 3D Printed Stirling Engine Through Analysis and Test, Cleveland State University Engaged Scholarship@CSU, ETD Archive, 2016, 91 Pages. https://engagedscholarship.csuohio.edu/cgi/viewcontent.cgi?referer=https://www.google.com/&httpsredir=1&article=1944&context=etdarchive.

Wikipedia, Heat Engine, 8 Pages. https://en.wikipedia.org/wiki/Heat_engine.

Wikipedia, Regenerative Heat Exchanger, 3 Pages. https://en.wikipedia.org/wiki/Regenerative_heat_exchanger.

Wikipedia, Stirling Engine, 2019, 24 Pages. https://en.wikipedia.org/wiki/Stirling_engine.

Wirtz et al., High Performance Woven Mesh Heat Exchangers, Mechanical Engineering Department, University of Nevada, Reno, 2002, 8 Pages. https://apps.dtic.mil/dtic/tr/fulltext/u2/a408219.pdf.

(56) References Cited

OTHER PUBLICATIONS

Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/d1a3/b4ce0baa639cf349d25d1506c3fa6118dc3e.pdf.

Wu et al., Model-based Analysis and Simulation of Regenerative Heat Wheel, ScienceDirect, Energy and Buildings, vol. 38, No. 5, May 2006, pp. 502-514. http://citeseerx.ist.psu.edu/viewdoc/download?doi=10.1.1.616.3103&rep=rep1&type=pdf.

Xie et al., Investigation on the Performances of the Gas Driven Vuilleumier Heat Pump, International Refrigeration and Air Conditioning Conference, Purdue University, School of Mechanical Engineering, 2008, 7 Pages. https://docs.lib.purdue.edu/cgi/viewcontent.cgi?referer=https://www.google.com/&httpsredir=1&article=1935&context=iracc.

United States Non Final Office Action Corresponding to U.S. Appl. No. 16/878,760 dated Jul. 22, 2020.

United States Non Final Office Action Corresponding to U.S. Appl. No. 16/878,787 dated Jul. 21, 2020.

\* cited by examiner

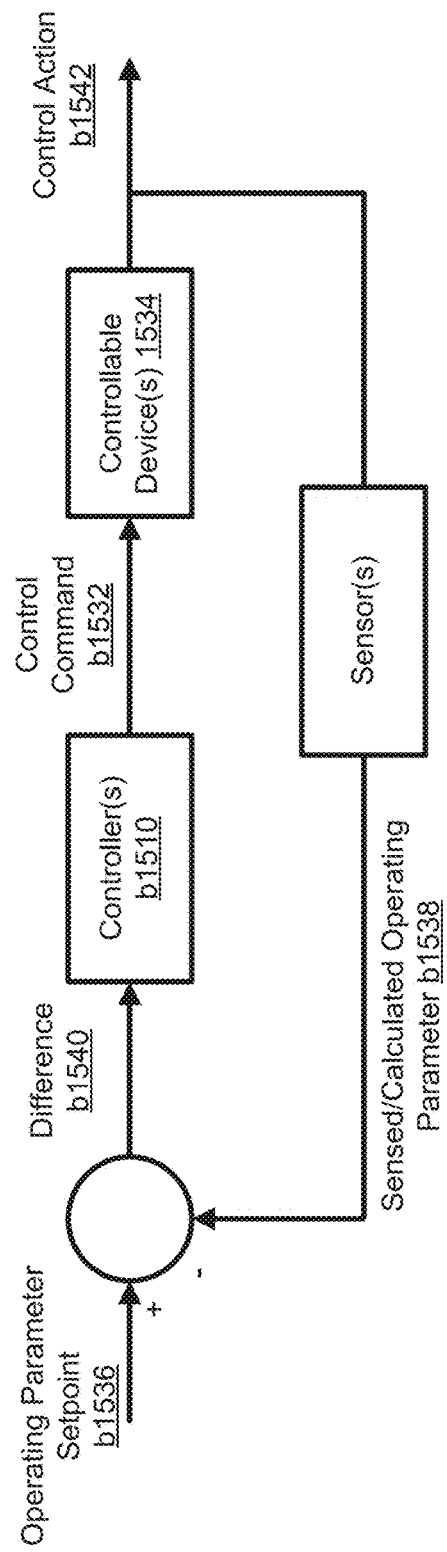

ENERGY CONVERSION APPARATUS AND CONTROL SYSTEM

CROSS-REFERENCE TO RELATED APPLICATIONS

The present application claims priority to each of the following U.S. Provisional Applications, the contents of which are incorporated herein by reference in their entirety for all purposes as if set forth verbatim: App. No. 62/850,599, filed May 21, 2019; App. No. 62/850,623, filed May 21, 2019; App. No. 62/850,678, filed May 21, 2019; App. No. 62/850,692, filed May 21, 2019; and App. No. 62/850,701, filed May 21, 2019. The present application also incorporates by reference International Patent Application Number PCT/US2020/033674 filed on May 20, 2020 in its entirety for all purposes.

FIELD

The present subject matter relates generally to energy conversion systems, power generation systems, and energy distribution systems. The present subject matter additionally relates to heat exchangers and heat exchanger systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

Furthermore, there is a need for improved control system and methods for operating power generation systems as may include subsystems that collectively may provide improved power generation efficiency or reduced emissions.

BRIEF DESCRIPTION

Aspects and advantages of the invention will be set forth in part in the following description, or may be obvious from the description, or may be learned through practice of the invention.

An aspect of the disclosure is directed to a system including a closed cycle engine having a piston body defining a hot side and a cold side and having a piston assembly movable within the piston body. An electric machine is operatively coupled with the piston assembly. A control system includes one or more sensors operable to detect a piston movement characteristic of the piston assembly movable within the piston body. A controller is communicatively coupled with the one or more sensors and a controllable device. The controller is configured to determine a control command based at least in part on data received from the one or more sensors. The control command is selected based at least in part to cause the electric machine operatively coupled with the piston assembly to generate a preselected electrical power output. The controller provides the determined control command to the controllable device. The controllable device is operable to control an input to an engine working fluid disposed within the piston body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure including the best mode, directed to one of ordinary skill in the art, is set forth in the specification, which makes reference to the appended figures, in which:

FIG. 34 provides a table of an example control law that associates various differences with various control commands;

FIG. 35 provides an example feedback control loop for controlling the power generation system in accordance with an embodiment of the present disclosure;

Figure 1:
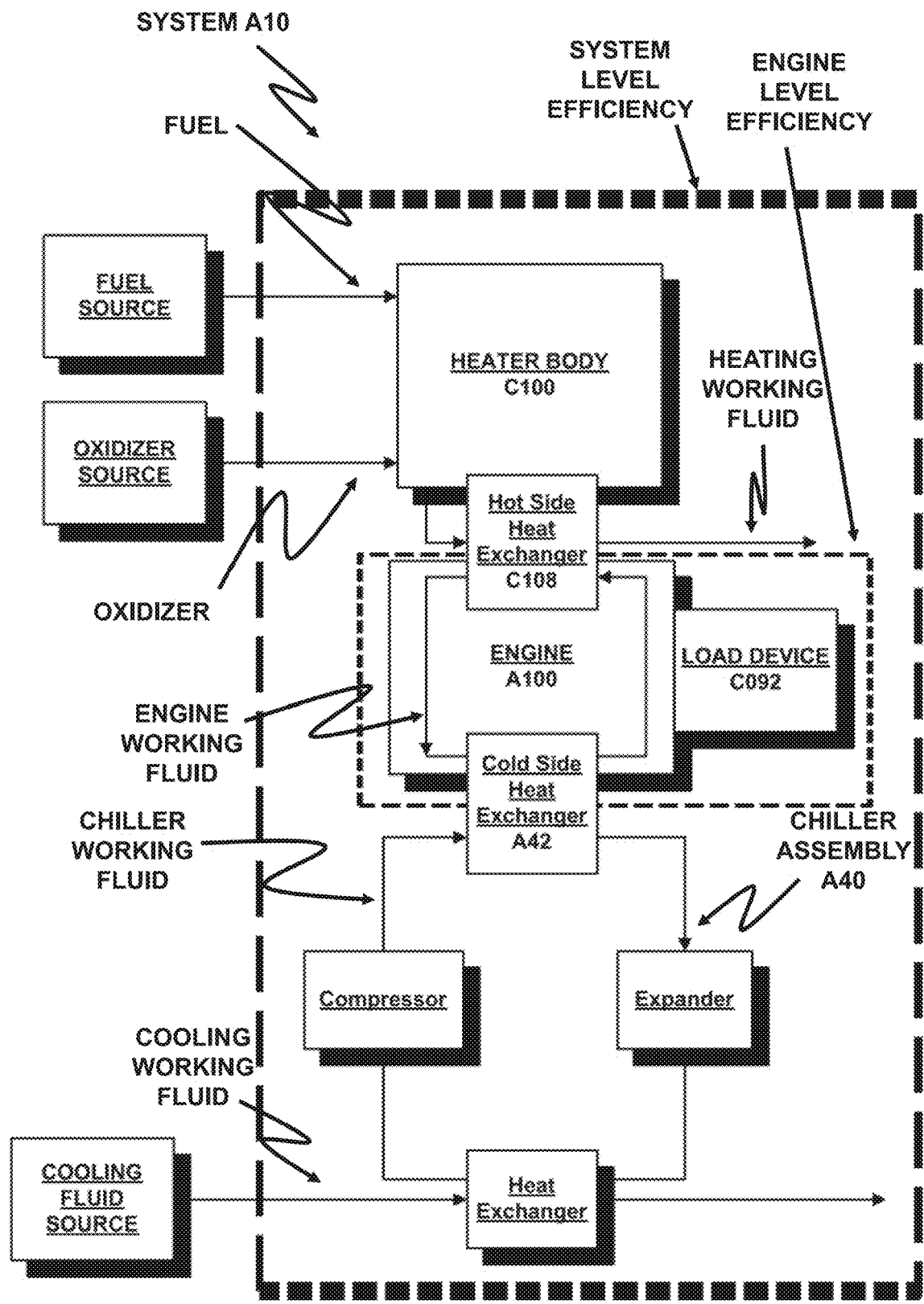
FIG. 1 is a schematic block diagram depicting a system for energy conversion according to an aspect of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The term "loop" can be any suitable fluid pathway along which fluid can flow and can be either open or closed, unless stated otherwise.

Power generation and distribution systems are generally challenged to reduce production inefficiencies, transmission losses, and emissions (e.g., oxides of nitrogen, sulfur, or carbon) during and post energy production. Local, distributed, or on-demand power generation may not require access to transmission and distribution (T&D) networks or grids, such as to result in an at least 5% improvement in efficiency, in addition to reducing emission and adverse environmental impacts.

There is a need for power generation systems that provide improved efficiency and reduced emissions over known power generation systems that may further be sized or scaled to provide improved power distribution without adversely affecting efficiency and emissions. The need for improved power generation systems is further, or alternatively, such that issues regarding power distribution, power generation versus changing peak power demands, emissions, barriers to infrastructure development, and challenges and limitations posed by vehicle electrification may each be addressed, improved upon, or alleviated.

Small-scale or portable power generation systems are desirable for applications including space vehicles and systems, automotive drivetrain and aerospace propulsion electrification, direct cooling sources, and portable or distributed power generation such as to address issues regarding power generation efficiency, density, and output. However, there is a need for improved thermal efficiency, electrical conversion efficiency, or both, for such systems.

Heat engines and other devices for converting thermal energy into useful work are generally inefficient. Carnot's theorem states that the maximum theoretical efficiency ($\eta_{Carnot}$) for an ideal, reversible heat engine is given by:

$$\eta_{Carnot} = 1 - \left(\frac{T_{Hot,engine}}{T_{Cold,ambient}}\right)$$

where $T_{hot,engine}$ is the absolute temperature (e.g. in Rankine or Kelvin) at which heat enters the engine and $T_{cold,ambient}$ is the absolute temperature of the environment into which the engine exhausts its waste heat.

Achieving maximum theoretical efficiency of an engine is challenged or limited based at least on inefficient combustion, inefficient heat exchange, heat losses to a surrounding environment, non-ideal behavior of one or more working fluids, friction losses, pumping losses, or other inefficiencies and imperfections. Actual or real thermal efficiency $\eta_{th}$ of a heat engine is given by:

$$\eta_{th} = \frac{W_{out}}{Q_{in}} = \frac{Q_{in} - Q_{out}}{Q_{in}} = 1 - \frac{Q_{out}}{Q_{in}}$$

where $W_{out}$ is the net useful work done by the engine, $Q_{in}$ is the thermal energy received by the engine, and $Q_{out}$ is the thermal energy lost or rejected to the environment. Achievable thermal efficiency tends to increase with power output. Stirling engines have demonstrated thermal efficiencies up to 38%.

The useful work generated by a heat engine can further be converted into electrical energy. The electrical efficiency ($\eta_{El}$) can be calculated in the same manner as the thermal efficiency:

$$\eta_{El} = \frac{E_{out}}{Q_{in}}$$

where $E_{out}$ is the net electrical energy output from an electric machine that is operatively coupled to the engine and $Q_{in}$ is the thermal energy received by the engine. $E_{out}$ may be calculated by subtracting any electricity required to operate the power generation system from the gross power generated by the system. If combustion is the source of heating working fluid for the engine, the electrical efficiency may be calculated using a lower heating value (LHV) of the fuel.

Known closed cycle engines, such as Stirling arrangements, are challenged to produce increasing levels of power output and power density, and generally compromise improved efficiency or power output with larger sizes and scaling. Such larger sizes or scales can negate other desirable qualities of the engine, such as relatively small-scale or portability.

Stirling engines may generally include two types: kinematic or free piston. Kinematic Stirling engines use mechanically-connected piston assemblies to transmit and convert linear motion of the pistons to a rotary motion for an output shaft. Although such systems may address certain issues regarding power transmission and stability of the engine, mechanically-connected piston assemblies introduce relatively large power losses via the mechanical members. Additionally, or alternatively, the relatively fixed relationship of mechanically-connected piston assemblies limits the mechanical stroke of the piston assembly. As such, the efficiency of mechanically-connected multi-piston assemblies in a closed cycle engine is decreased in addition to mechanical losses (e.g., friction, leakage, inertia, etc.).

Single-piston free piston closed cycle engine arrangements generally exchange improved thermal efficiency for lower total power generation and density. As such, single-piston free piston closed cycle engine arrangements are not generally suited for higher power output applications.

Multi-piston free piston closed cycle engine arrangements may provide thermal efficiencies of single-piston free piston arrangements and further increase total power generation. However, multi-piston free piston arrangements generally differ from single-piston arrangements and mechanically-connected multi-piston arrangements in that the cycle or motion of a multi-piston free piston arrangement is generally determined by thermo-mechanical interactions of the entire system including the free pistons, the thermal source(s), and a power extraction apparatus. The thermo-mechanical interactions may further include mechanical losses and their effect on balance of the entire system.

For example, multi-piston free-piston closed cycle engines are challenged to respond to time lags. As another example, if one piston assembly drifts from an intended position a subsequent oscillation can become unbalanced. An unbalanced arrangement may lead to undesired vibrations, crashing of the pistons to end walls, or other mechanical losses that may further reduce power output, induce wear and deterioration, or otherwise reduce efficient, stable, or effective use of a multi-piston free piston engine.

As such, there is a need for improved closed cycle engines such as Stirling engines that provide improved power generation efficiency and output. Additionally, there is a need for such improved closed cycle engines that may further retain or improve power density, such as to provide relatively small-scale or portability such as to provide improved application to power generation and distribution systems.

System for Energy Conversion

Referring now to FIG. 1, an exemplary schematic block diagram depicting a system for energy conversion (hereinafter, "system A10") is provided. Various embodiments of the system A10 provided herein include systems for power generation, a heat recovery system, a heat pump or cryogenic cooler, a system including and/or acting as a bottoming cycle and/or a topping cycle, or other system for producing useful work or energy, or combinations thereof. Referring additionally for FIG. 2, various embodiments of the system A10 include a closed cycle engine apparatus (hereinafter, "engine A100", apparatus "A100", or "engine assembly C900", or otherwise denoted herein) operably coupled to a load device c092. The engine A100 contains a substantially fixed mass of an engine working fluid to which and from which thermal energy is exchanged at a respective cold side heat exchanger A42 and a hot side heat exchanger C108. In one embodiment, the engine working fluid is helium. In other embodiments, the engine working fluid may include air, nitrogen, hydrogen, helium, or any appropriate compressible fluid, or combinations thereof. In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the engine. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device C092 is a mechanical work device or an electric machine. In one embodiment, the load device C092 is a pump, compressor, or other work device. In another embodiment, the load device C092 as an electric machine is configured as a generator producing electric energy from movement of a piston assembly A1010 at the engine. In still another embodiment, the electric machine is configured as a motor providing motive force to move or actuate the piston assembly A1010, such as to provide initial movement (e.g., a starter motor). In still various embodiments, the electric machine defines a motor and generator or another electric machine apparatus such as described further herein.

A heater body C100 is thermally coupled to the engine A100. The heater body C100 may generally define any apparatus for producing or otherwise providing a heating working fluid such as to provide thermal energy to the engine working fluid. Various embodiments of the heater body C100 are further provided herein. Exemplary heater bodies C100 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies C100 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. The exemplary heater body C100 providing thermal energy to the engine working fluid may include all or part of a combined heat and power cycle, or cogeneration system, or power generation system generally.

In still various embodiments, the heater body C100 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, the system A10 includes a working fluid body C108, such as further described herein. In one embodiment, the working fluid body C108 defines a hot side heat exchanger A160, such as further described herein, from which thermal energy is output to the engine working fluid at an expansion chamber A221 of the engine. The working fluid body C108 is positioned at the expansion chamber A221 of the engine in thermal communication with the heater body C100. In other embodiments, the working fluid body C108 may be separate from the heater body C100, such that the heating working fluid is provided in thermal communication, or additionally, in fluid communication with the working fluid body C108. In particular embodiments, the working fluid body C108 is positioned in direct thermal communication with the heater body C100 and the expansion chamber A221 of the engine A100 such as to receive thermal energy from the heater body C100 and provide thermal energy to the engine working fluid within the engine.

In still various embodiments, the heater body C100 may include a single thermal energy output source to a single expansion chamber A221 of the engine. As such, the system A10 may include a plurality of heater assemblies each providing thermal energy to the engine working fluid at each expansion chamber A221. In other embodiments, such as depicted in regard to FIG. 2, the heater body C100 may provide thermal energy to a plurality of expansion chambers A221 of the engine. In still other embodiments, such as depicted in regard to FIG. 8, the heater body includes a single thermal energy output source to all expansion chambers A221 of the engine.

The system A10 further includes a chiller assembly, such as chiller assembly A40 further described herein. The chiller assembly A40 is configured to receive and displace thermal energy from a compression chamber A222 of the engine. The system A10 includes a cold side heat exchanger A42 thermally coupled to the compression chamber A222 of the closed cycle engine and the chiller assembly. In one embodiment, the cold side heat exchanger A42 and the piston body C700 defining the compression chamber A222 of the engine are together defined as an integral, unitary structure, such as further shown and described in regard to FIGS. 4-10. In still various embodiments, the cold side heat exchanger A42, at least a portion of the piston body C700 defining the compression chamber A222, and at least a portion of the chiller assembly together define an integral, unitary structure.

In various embodiments, the chiller assembly A40 is a bottoming cycle to the engine A100. As such, the chiller assembly A40 is configured to receive thermal energy from the engine A100. The thermal energy received at the chiller assembly A40, such as through a cold side heat exchanger A42, or cold side heat exchanger A170 further herein, from the engine A100 is added to a chiller working fluid at the chiller assembly A40. In various embodiments, the chiller assembly A40 defines a Rankine cycle system through which the chiller working fluid flows in closed loop arrangement with a compressor. In some embodiments, the chiller working fluid is further in closed loop arrangement with an expander. In still various embodiments, the system A10 includes a heat exchanger A88 (FIG. 3). In various embodiments, the heat exchanger A188 may include a condenser or radiator. The cold side heat exchanger A40 is positioned downstream of the compressor and upstream of the expander and in thermal communication with a compression chamber A222 of the closed cycle engine, such as further depicted and described in regard to FIG. 2-FIG. 3. In various embodiments, the cold side heat exchanger A42 may generally define an evaporator receiving thermal energy from the engine A40.

Referring still to FIG. 1, in some embodiments, the heat exchanger A188 is positioned downstream of the expander and upstream of the compressor and in thermal communication with a cooling working fluid. In the schematic block diagram provided in FIG. 1, the cooling working fluid is an air source. However, in various embodiments, the cooling fluid may define any suitable fluid in thermal communication with the heat exchanger. The heat exchanger may further define a radiator configured to emit or dispense thermal energy from the chiller assembly A40. A flow of cooling working fluid from a cooling fluid source is provided in thermal communication with the heat exchanger to further aid heat transfer from the chiller working fluid within the chiller assembly A40 to the cooling working fluid.

As further described herein, in various embodiments the chiller assembly A40 may include a substantially constant density heat exchanger. The constant density heat exchanger generally includes a chamber including an inlet and an outlet each configured to contain or trap a portion of the chiller working fluid for a period of time as heat from the closed cycle engine is transferred to the cold side heat exchanger A42. In various embodiments, the chamber may define a linear or rotary chamber at which the inlet and the outlet are periodically opened and closed via valves or ports such as to trap the chiller working fluid within the chamber for the desired amount of time. In still various embodiments, the rate at which the inlet and the outlet of the chamber defining the constant density heat exchanger is a function at least of velocity of a particle of fluid trapped within the chamber between the inlet and the outlet. The chiller assembly A40 including the constant density heat exchanger may provide efficiencies, or efficiency increases, performances, power densities, etc. at the system A10 such as further described herein.

It should be appreciated that in other embodiments, the chiller assembly A40 of the system A10 may include a thermal energy sink generally. For example, the chiller assembly A40 may include a body of water, the vacuum of space, ambient air, liquid metal, inert gas, etc. In still various embodiments, the chiller working fluid at the chiller assembly A40 may include, but is not limited to, compressed air, water or water-based solutions, oil or oil-based solutions, or refrigerants, including, but not limited to, class 1, class 2, or class 3 refrigerants. Further exemplary refrigerants may include, but are not limited to, a supercritical fluid including, but not limited to, carbon dioxide, water, methane, ethane, propane, ethylene, propylene, methanol, ethanol, acetone, or nitrous oxide, or combinations thereof. Still exemplary refrigerants may include, but are not limited to, halon, perchloroolefin, perchlorocarbon, perfluoroolefin, perfluorocarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof. Still further exemplary embodiments of refrigerant may include, but are not limited to, methylamine, ethylamine, hydrogen, helium, ammonia, water, neon, nitrogen, air, oxygen, argon, sulfur dioxide, carbon dioxide, nitrous oxide, or krypton, or combinations thereof.

It should be appreciated that where combustible or flammable refrigerants are included for the chiller working fluid, various embodiments of the system A10 may beneficially couple the heater body C100, and/or the fuel source, and the chiller assembly A40 in fluid communication such that the combustible or flammable working fluid to which thermal energy is provided at the chiller assembly A40 may further be utilized as the fuel source for generating heating working fluid, and the thermal energy therewith, to output from the heater body C100 to the engine working fluid at the engine A100.

Various embodiments of the system A10 include control systems and methods of controlling various sub-systems disclosed herein, such as, but not limited to, the fuel source, the oxidizer source, the cooling fluid source, the heater body C100, the chiller assembly C40, the engine A100, and the load device C092, including any flow rates, pressures, temperatures, loads, discharges, frequencies, amplitudes, or other suitable control properties associated with the system A10. In one aspect, a control system for the system A10 defining a power generation system is provided. The power generation system includes one or more closed cycle engines (such as engine A100), one or more load devices defining electric machines (such as load device C092) operatively coupled to the engine, and one or more energy storage devices in communication with the electric machines.

The control system can control the closed cycle engine and its associated balance of plant to generate a temperature differential, such as a temperature differential at the engine working fluid relative to the heating working fluid and the chiller working fluid. Thus, the engine defines a hot side, such as at the expansion chamber A221, and a cold side, such as at the compression chamber A222. The temperature differential causes free piston assemblies A1010 to move within their respective piston chambers defined at respective piston bodies C700. The movement of the pistons A1011 causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system A10. The controllable devices execute control actions in accordance with the control commands. Accordingly, the desired output of the system A10 can be achieved.

Furthermore, the control system can monitor and anticipate load changes on the electric machines and can control the engine A100 to anticipate such load changes to better maintain steady state operation despite dynamic and sometimes significant electrical load changes on the electric machines. A method of controlling the power generation system is also provided. In another aspect, a control system for a heat pump system is provided. The heat pump system includes one or more of the closed cycle engines described herein. A method of controlling the heat pump system is also provided. The power generation and heat pump systems as well as control methods therefore are provided in detail herein.

Energy Conversion Apparatus

Figure 2:
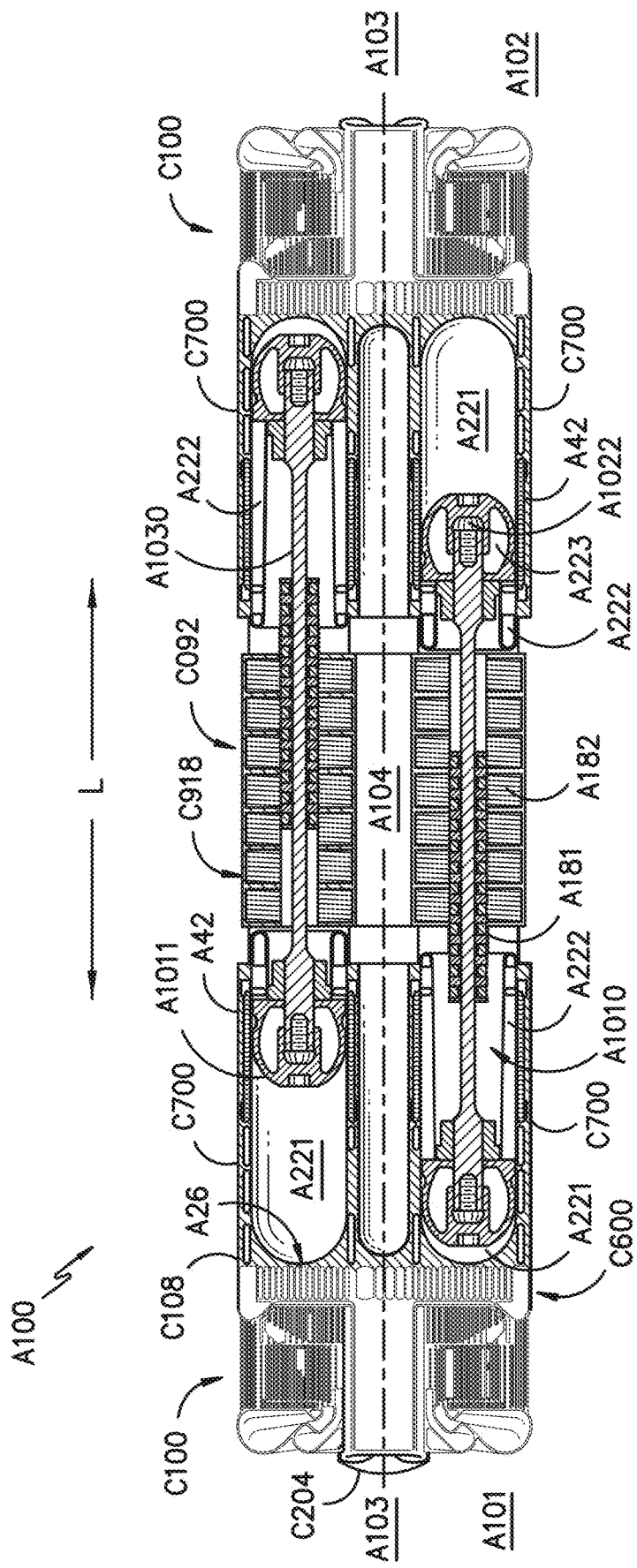
FIG. 2 is a cross sectional view of an exemplary embodiment of a closed cycle engine and load device according to an aspect of the present disclosure.
Figure 3:
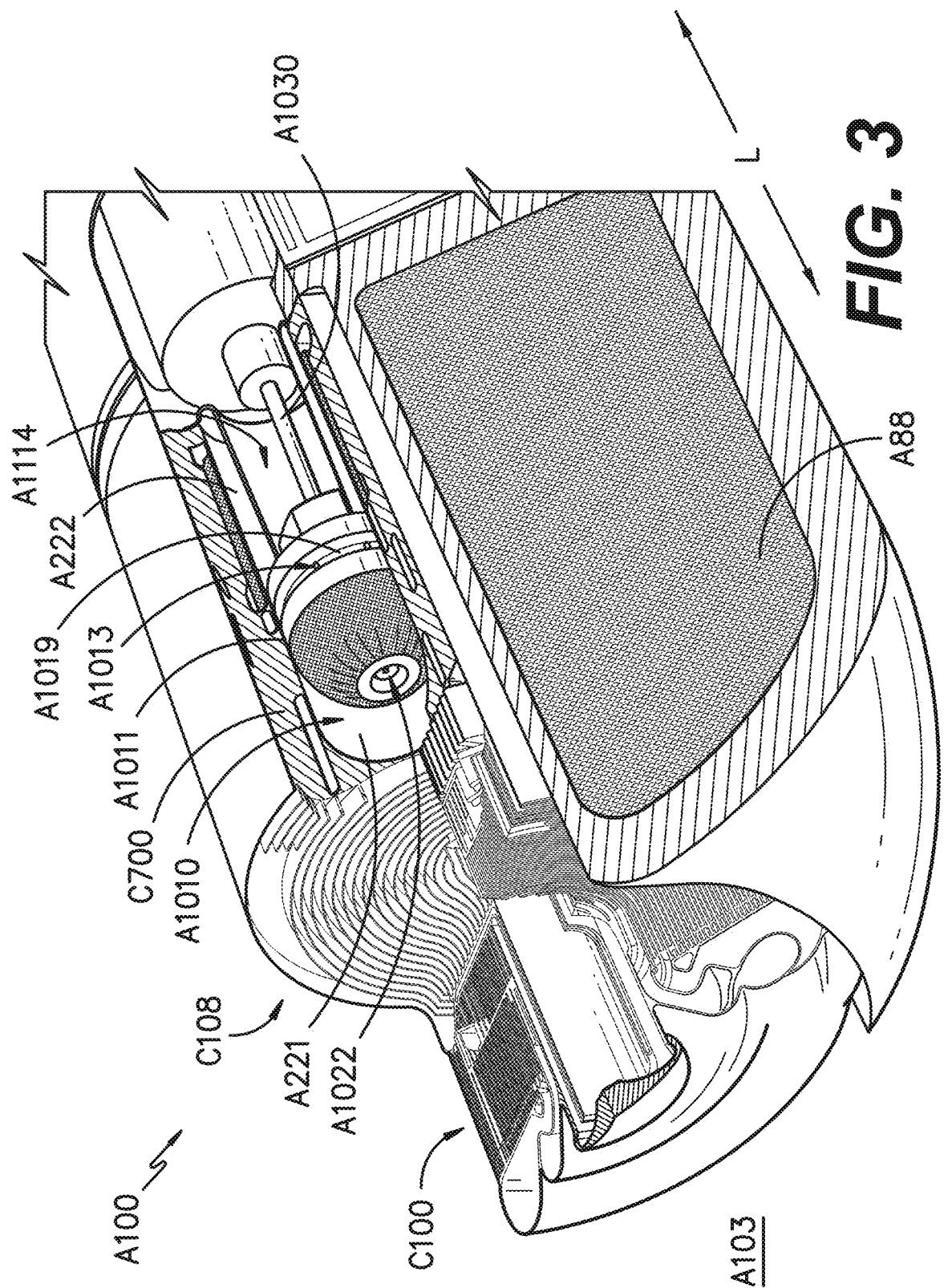
FIG. 3 is a perspective cutaway view of an exemplary portion of an exemplary embodiment of an engine according to an aspect of the present disclosure.

Referring now to FIG. 2-FIG. 3, exemplary embodiments of the system A10 are further provided. FIG. 2 is an exemplary cross sectional view of the system A10 including the heater body C100 and the chiller assembly A40 each in thermal communication with the engine A100, or particularly the engine working fluid within the engine A100, such as shown and described according to the schematic block diagram of FIG. 1. FIG. 3 is an exemplary cutaway perspective view of a portion of the engine A100. The system A10 includes a closed cycle engine A100 including a piston assembly A1010 positioned within a volume or piston chamber defined by a wall defining a piston body C700. The volume within the piston body C700 is separated into a first chamber, or hot chamber, or expansion chamber A221 and a second chamber, or cold chamber (relative to the hot chamber), or compression chamber A222 by a piston A1011 of the piston assembly A1010. The expansion chamber A221 is positioned thermally proximal to the heater body C100 relative to the compression chamber A222 thermally distal to the heater body C100. The compression chamber A222 is positioned thermally proximal to the chiller assembly A40 relative to the expansion chamber A221 thermally distal to the chiller assembly A40.

In various embodiments, the piston assembly A1010 defines a double-ended piston assembly A1010 in which a pair of pistons A1011 is each coupled to a connection member A1030. The connection member A1030 may generally define a rigid shaft or rod extended along a direction of motion of the piston assembly A1010. In other embodiments, the connection members A1030 includes one or more springs or spring assemblies, such as further provided herein, providing flexible or non-rigid movement of the connection member A1030. In still other embodiments, the connection member A1030 may further define substantially U- or V-connections between the pair of pistons A1011.

Each piston A1011 is positioned within the piston body C700 such as to define the expansion chamber A221 and the compression chamber A222 within the volume of the piston body C700. The load device c092 is operably coupled to the piston assembly A1010 such as to extract energy therefrom, provide energy thereto, or both. The load device c092 defining an electric machine is in magnetic communication with the closed cycle engine via the connection member A1030. In various embodiments, the piston assembly A1010 includes a dynamic member A181 positioned in operable communication with a stator assembly A182 of the electric machine. The stator assembly A182 may generally include a plurality of windings wrapped circumferentially relative to the piston assembly A1010 and extended along a lateral direction L. In one embodiment, such as depicted in regard to FIG. 2, the dynamic member A181 is connected to the connection member A1030. The electric machine may further be positioned between the pair of pistons A1011 of each piston assembly A1010. Dynamic motion of the piston assembly A1010 generates electricity at the electric machine. For example, linear motion of the dynamic member A181 between each pair of chambers defined by each piston A1011 of the piston assembly A1010 generates electricity via the magnetic communication with the stator assembly A182 surrounding the dynamic member A181.

Referring to FIG. 2-FIG. 3, in various embodiments, the working fluid body C108 may further define at least a portion of the expansion chamber A221. In one embodiment, such as further described herein, the working fluid body C108 defines a unitary or monolithic structure with at least a portion of the piston body C700, such as to define at least a portion of the expansion chamber A221. In some embodiments, the heater body C100 further defines at least a portion of the working fluid body C108, such as to define a unitary or monolithic structure with the working fluid body C108, such as further described herein. In one embodiment, such as further shown and described in regard to FIG. 12, the system A10 includes the hot side heat exchanger or working fluid body C108 positioned between the heater body C100 and the expansion chamber A221 of the piston body C700. In various embodiments, such as further shown and described in regard to FIG. 12, the working fluid body C108 includes a plurality of heater conduits or working fluid pathways C110 extended from the expansion chamber A221.

The engine A100 defines an outer end A103 and an inner end A104 each relative to a lateral direction L. The outer ends A103 define laterally distal ends of the engine A100 and the inner ends 104 define laterally inward or central positions of the engine A100. In one embodiment, such as depicted in regard to FIG. 2-FIG. 3, the heater body C100 is positioned at outer ends A103 of the system A10. The piston body C700 includes a dome structure A26 at the expansion chamber A221. The expansion chamber dome structure A26 s provides reduced surface area heat losses across the outer end A103 of the expansion chamber A221. In various embodiments, the pistons A1011 of the piston assembly A1010 further include domed pistons A1011 corresponding to the expansion chamber A221 dome. The dome structure A26, the domed piston A1011, or both may provide higher compressions ratios at the chambers A221, A222, such as to improve power density and output.

The chiller assembly A40 is positioned in thermal communication with each compression chamber A222. Referring to FIG. 2-FIG. 3, the chiller assembly A40 is positioned inward along the lateral direction L relative to the heater body C100. In one embodiment, the chiller assembly A40 is positioned laterally between the heater body C100 and the load device c092 along the lateral direction L. The chiller assembly A40 provides the chiller working fluid in thermal communication with the engine working fluid at the cold side heat exchanger A42 and/or compression chamber A222. In various embodiments, the piston body C700 defines the cold side heat exchanger A42 between an inner volume wall A46 and an outer volume wall A48 surrounding at least the compression chamber A222 portion of the piston body C700.

In various embodiments, such as depicted in regard to FIG. 2-FIG. 3, the load device c092 is positioned at the inner end A104 of the system A10 between laterally opposing pistons A1011. The load device c092 may further include a machine body c918 positioned laterally between the piston bodies C700. The machine body c918 surrounds and houses the stator assembly A182 of the load device c092 defining the electric machine. The machine body c918 further surrounds the dynamic member A181 of the electric machine attached to the connection member A1030 of the piston assembly A1010. In various embodiments, such as depicted in regard to FIG. 2-FIG. 3, the machine body c918 further provides an inner end wall A50 at the compression chamber A222 laterally distal relative to the expansion chamber A221 dome.

Cold Side Heat Exchanger, Piston Body, and Chiller Assembly

Referring now to FIG. 4-FIG. 10, exemplary embodiments of a portion of the piston body C700, cold side heat exchanger A42, and chiller assembly A40 are provided. In various embodiments, the system A10 includes the cold side heat exchanger A42 further including a plurality of chiller conduits A54 each defining chiller passages A56 providing fluid communication of the engine working fluid through the chiller conduit A54 and the compression chamber A222. The piston body C700 includes the outer volume wall A48 and an inner volume wall A46 each separated along a radial direction R perpendicular to the lateral direction L. Each volume wall A46, A48 may be defined at least partially circumferentially relative to a piston body centerline A12 extended through each piston body C700.

Figure 4:
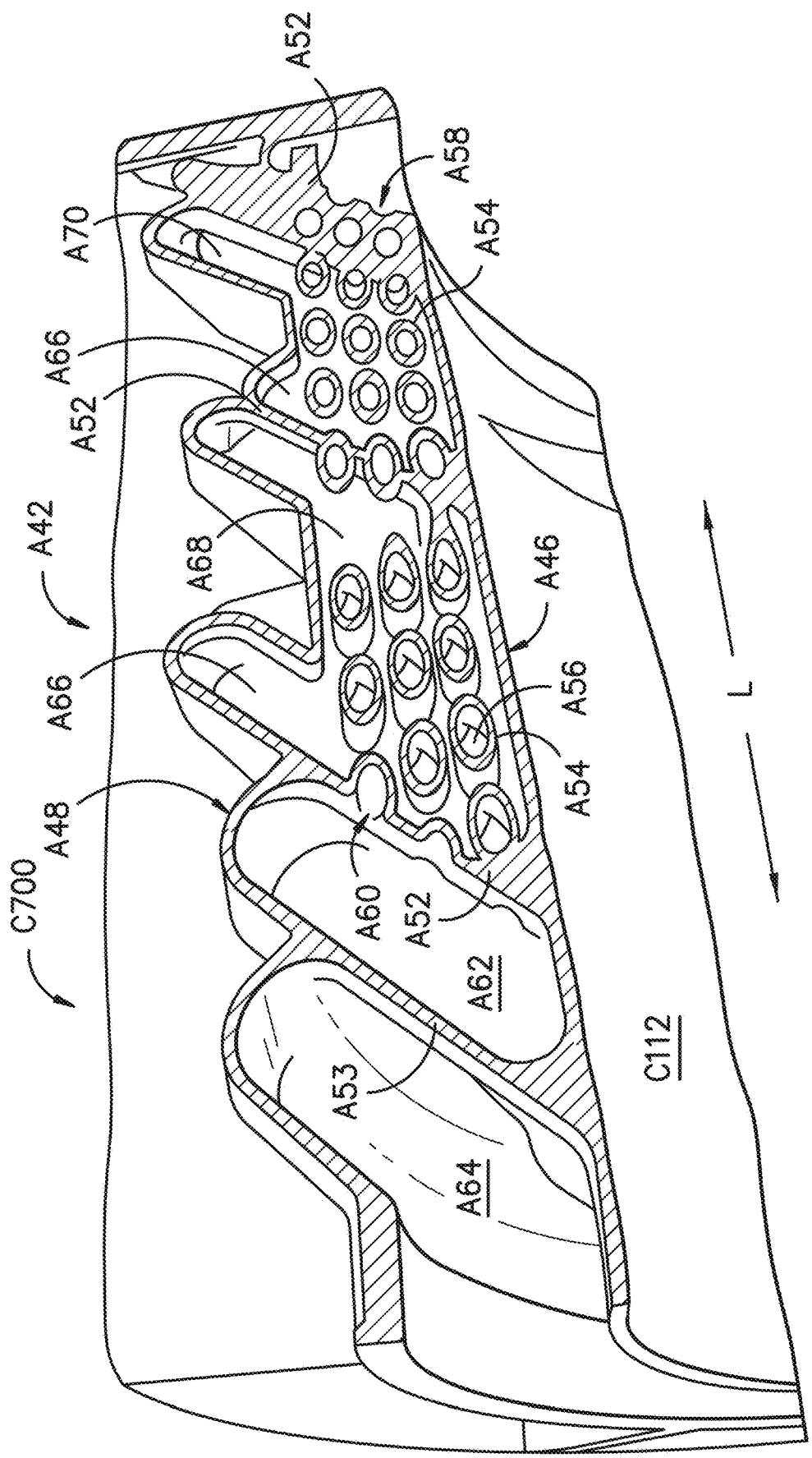
FIG. 4 is a perspective cutaway view of an exemplary portion of an engine according to an aspect of the present disclosure.
Figure 5:
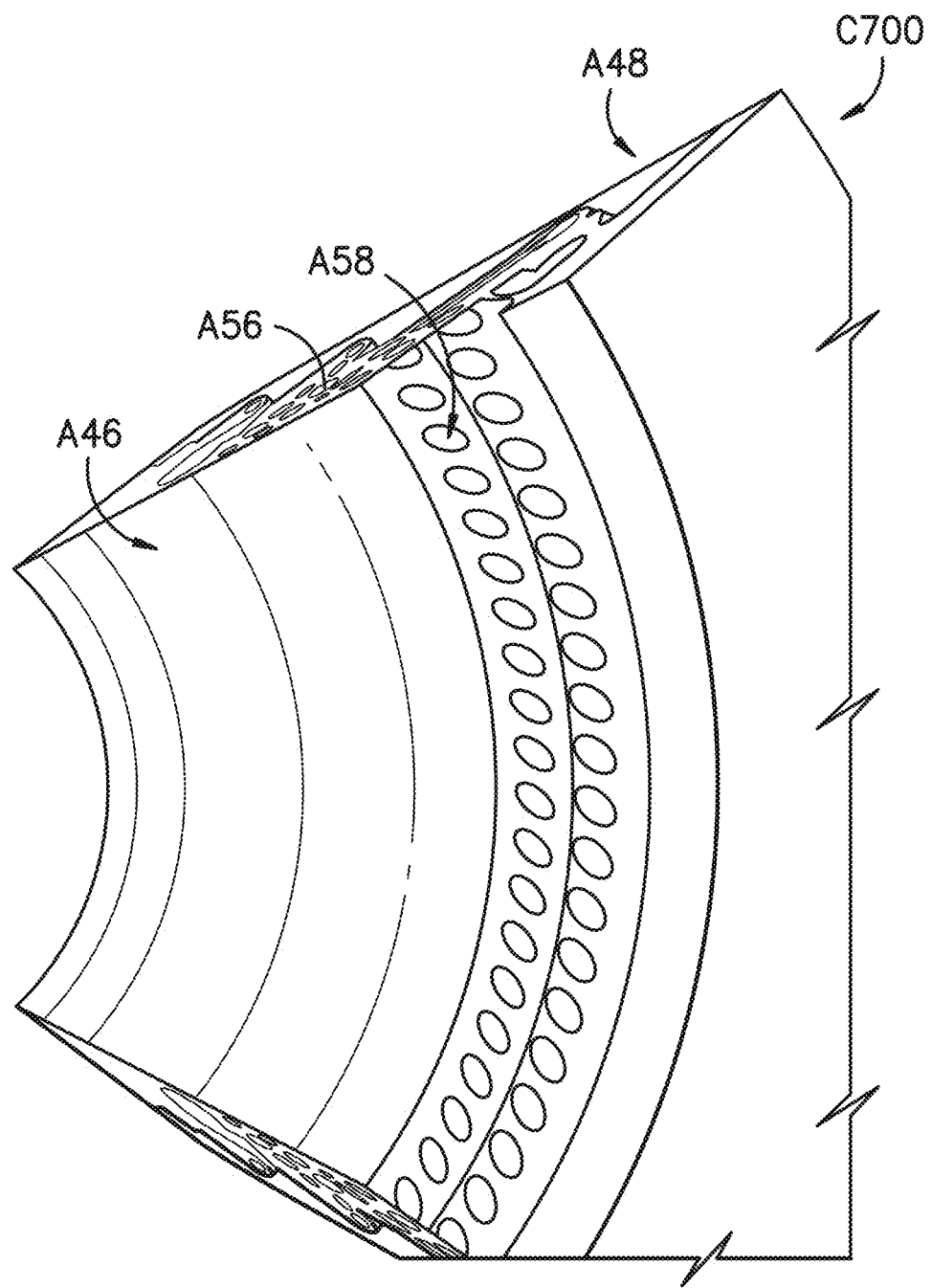
FIG. 5 is a perspective cutaway view of another exemplary portion of an engine according to an aspect of the present disclosure.

In the embodiments depicted in the perspective cutaway views of FIGS. 4-5, each volume wall A46, A48 is extended along the lateral direction L. The outer volume wall A48 surrounds the plurality of chiller conduits A54. The plurality of chiller conduits A54 is positioned between the outer volume wall A48 and the inner volume wall A46. The cold side heat exchanger A42 further includes a chamber wall A52 extended between the outer volume wall A48 and the inner volume wall A46. The chamber wall A52, the outer volume wall A48, and the inner volume wall A46 together define a chiller working fluid passage A66 surrounding the plurality of chiller conduits A54. The chiller conduits A54 define walled manifolds fluidly separating the chiller passage A56 (i.e., the passage through which the engine working fluid flows) and the chiller working fluid passage A66 (i.e., the passage through which the chiller working fluid flows). As such, the chiller working fluid flowing through the chiller working fluid passage A66 is fluidly separated from the engine working fluid flowing through the chiller conduits A54. Additionally, the chiller working fluid flowing through the chiller working fluid passage A66 is in thermal communication with the engine working fluid flowing through the chiller conduits A54.

In various embodiments, the chamber wall A52 is extended between the volume walls at an acute angle relative to the lateral direction L along which the piston assembly A1010 is extended. In one embodiment, the chamber wall A52 is extended between 0 degrees and approximately 90 degrees relative to the lateral direction L. In another embodiment, the chamber wall A52 is extended between 30 degrees and approximately 60 degrees relative to the lateral direction L along which the volume walls A46, A48 are substantially extended. In yet another embodiment, the chamber wall A52 is extended approximately 45 degrees relative to the lateral direction L. The chamber wall A52 is further connected to the outer volume wall A48, the inner volume wall A46, and the chiller conduits A54 such as to provide support to one another. The chamber walls A52 extended along an acute angle may further provide advantageous placement of the chiller conduits A54 within the chiller working fluid passage A66 such as to promote thermal energy transfer from the engine working fluid to the chiller working fluid.

During operation of the engine A100, a portion of the engine working fluid is admitted from the compression chamber A222 into the plurality of chiller conduits A54 via the plurality of chiller passage openings A58. The chiller passage opening A58 is defined at a fluid interface of the chiller conduit A54 to the compression chamber A222. In various embodiments, the chiller passage opening A58 provides direct fluid communication with the compression chamber A222. In one embodiment, a distance between the compression chamber A222 of the engine and the cold side heat exchanger A42, or particularly the plurality of chiller conduits A54 in direct thermal communication with the chiller working fluid, is substantially zero. Stated differently, the distance from the compression chamber A222 to the chiller conduits A54 in direct thermal communication with the chiller working fluid (i.e., the chiller working fluid is fluidly contacting an outer wall of the chiller conduits A54 such as to provide direct thermal communication to the engine working fluid within the chiller conduit A54) is the thickness of the chamber wall A52 through which the plurality of chiller passage openings A58 is defined. A distance between the compression chamber A222 and the cold side heat exchanger A42 beyond or greater than the thickness of the chamber wall A52 is approximately zero.

Still further, during operation of engine A100, the compression stroke of the piston assembly A1010 may generally push the engine working fluid through the chiller conduits A54. The engine working fluid within chiller passages A56 in the chiller conduits A54 is in thermal communication with the chiller working fluid surrounding the chiller conduits A54 within the chiller working fluid passage A66. The expansion stroke of the piston assembly A1010 may generally pull the engine working fluid through the chiller conduits A54 such as to egress the engine working fluid from the chiller conduits A54 through the chiller passage openings A58 and into the compression chamber A222. As further described herein, the chiller working fluid passage A66 is in fluid communication with a chiller working fluid outlet opening A78 and a chiller working fluid outlet opening A80 together providing flow of the chiller working fluid such as to remove and displace thermal energy from the engine working fluid at the chiller conduits A54. As still further described herein, the chiller working fluid passage A66, the chiller working fluid outlet opening A78, and/or the chiller working fluid output may form a circuit of the chiller assembly at which thermal energy from the engine working fluid at the compression chamber A222 is released from the closed cycle engine.

An outer chamber wall A53 and at least one chamber wall A52 may together define a chiller collection chamber A62 at which the engine working fluid may egress the plurality of chiller conduits A54 and collect into a volume. The outer chamber wall A53 defines a plurality of chiller collection chamber openings A60 each corresponding to a respective chiller conduit A54 and chiller passage opening A58. As further described herein in regard to FIGS. 8-10 and FIG. 13-FIG. 16, the chiller collection chamber A62 is further in fluid communication with a walled conduit A1050 such as to provide fluid communication between the compression chamber A222 of one piston assembly A1010 and the expansion chamber A221 of another piston assembly A1010.

In various embodiments, the compression chamber A222 of one piston assembly A1010 is fluidly connected to the expansion chamber A221 of another piston assembly A1010 via the walled conduit A1050 to provide a balanced pressure and/or balanced phase fluid coupling arrangement of the plurality of chambers A221, A222. An interconnected volume of chambers including the expansion chamber A221 of one piston assembly A1010 and the compression chamber A222 of another piston assembly A1010 defines a fluid interconnection of the chambers A221, A222 at different piston assemblies A1010. The fluid interconnection of chambers A221, A222 at different piston assemblies is such that if there is any fluid communication or fluid leakage path between the expansion chamber A221 and the compression chamber A222 of the same piston assembly A1010, a single fluid loop of connected chambers A221, A222 is provided that is separated from the chambers A221, A222 outside of the interconnected volume of chambers. In one embodiment, the balanced pressure arrangement, or additionally, the balance phase arrangement, of the piston assemblies A1010 is the fluid interconnection of the walled conduits A1050 and the chambers A221, A222 such that the chambers within the interconnected volume are substantially fluidly and/or pneumatically separated from those outside of the interconnected volume to provide a substantially equal and opposite force relative to one another to at least one piston assembly A1010 when the engine working fluid within the chambers A221, A222 is at a uniform temperature. Stated differently, when one piston assembly A1010 is articulated, such as along the lateral direction L, the fluid interconnection of chambers A221, A222 via the walled conduit A1050 provides a substantially net zero force at another piston assembly A1010 when the engine working fluid is at a substantially uniform temperature. As such, when one piston assembly A1010 is articulated under such conditions, adjacent or other piston assemblies A1010 remain stationary due at least to the net zero force at the piston assembly A1010. In various embodiments, the substantially uniform temperature is defined when no heat input or thermal energy is provided from the heater body C100 or working fluids body C108 to the engine working fluid.

Figure 6:
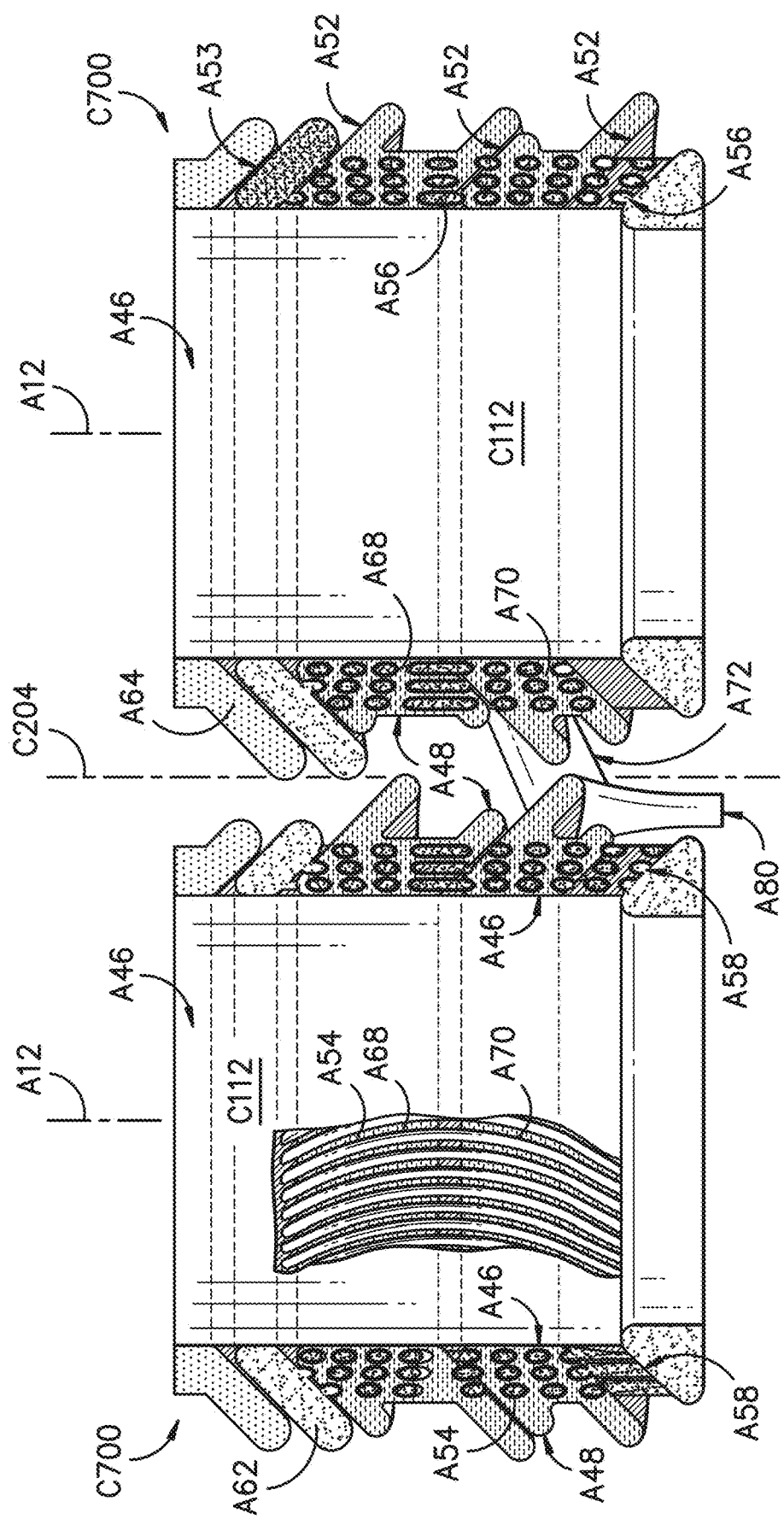
FIG. 6 is a cutaway view of a portion of an exemplary embodiment of an engine according to an aspect of the present disclosure.

Referring now to FIG. 6, a side cutaway view of an embodiment of a pair of piston bodies C700 is provided. The embodiment depicted in regard to FIG. 6 is configured substantially similarly as shown and described in regard to FIGS. 4-5. FIG. 6 further provides a partial cutaway view within the piston body C700 exposing a portion of the plurality of chiller conduits A54 between the volume walls A46, A48. In various embodiments, the chiller conduit A54 extends along the lateral direction L between the chiller passage opening A58 and the chiller collection chamber A62. In one embodiment, the chiller conduit A54 extends at least partially along an oblique or orthogonal direction relative to the lateral direction L. In various embodiments, the chiller conduit A54 extends substantially circumferentially around the piston body C700. The chiller conduit A54 may extend at least partially along the oblique or orthogonal direction relative to the lateral direction L such as to desirably increase a surface area of the chiller passage A56 defined within the chiller conduit A54 at which the engine working fluid is in thermal communication with the chiller working fluid in the cold side heat exchanger A42. The desirable increase in surface area of the chiller passage A56 defined by the chiller conduit A54 provides the surrounding chiller working fluid in the first and second chiller working fluid passage A68, A70 to be in thermal communication so as to improve the opportunity for the transfer of thermal energy from the engine working fluid to the chiller working fluid. In one embodiment, the surface area over which the engine working fluid is desirably in thermal communication with the surrounding chiller working fluid is desirably adjusted by adjusting the lateral, circumferential, or orthogonal extension of the chiller conduits A54 such as to adjust the heat exchanging surface area of the chiller passage A56. In one embodiment, the chiller conduit A54 may extend at least partially in a curved or circumferential or spiral direction, such as a helix, between the chiller passage opening A58 and the chiller collection chamber A62. In another embodiment, the chiller conduit A54 may extend in a zig-zag or serpentine pattern between the chiller passage opening A58 and the chiller collection chamber A62. However, it should be appreciated that other geometries may be defined such as to produce the desired heat exchanging surface area of the chiller conduit A54 relative to the chiller working fluid passage A66.

It should be appreciated that in various embodiments the surface area of the chiller passage A56 defined within each chiller conduit A54 described herein corresponds to the chiller passage A56, such as an internal wall or surface of the chiller conduit A54 at which the engine working fluid is in direct contact. In one embodiment, the surface area defines a nominal surface area of the chiller passage A56, such as a cross section of the chiller conduit A54. In other embodiments, features may be added or altered to the chiller passage A56 within the chiller conduit A54, such as, but not limited to, surface roughness, protuberances, depressions, spikes, nodules, loops, hooks, bumps, burls, clots, lumps, knobs, projections, protrusions, swells, enlargements, outgrowths, accretions, blisters, juts, and the like, or other raised material, or combinations thereof, to desirably alter flow rate, pressure drop, heat transfer, flow profile or fluid dynamics of the engine working fluid.

Referring still to FIG. 6, various embodiments further include a connecting chiller conduit A54 extended between the first piston body C700 and the second piston body C700. The connecting chiller conduit A54 provides fluid communication of the chiller working fluid between two or more piston bodies C700. In various embodiments, the chiller working fluid passage A66 at each piston body C700 includes a first chiller working fluid passage A68 and a second chiller working fluid passage A70 each in thermal communication with the compression chamber A222. The second chiller working fluid passage A70 is positioned proximal to the chiller passage opening A58 at the compression chamber A222. The first chiller working fluid passage A68 is positioned distal to the chiller passage opening A58 at the compression chamber A222. Additionally, or alternatively, the first chiller working fluid passage A68 is positioned proximal to the chiller collection chamber A62 or the expansion chamber A221. The connecting chiller conduit A54 is configured to fluidly connect the first chiller working fluid passage A68 of one piston body C700 (e.g., the first piston body 82) to the second chiller working fluid passage A70 of another piston body C700 (e.g., the second piston body 84), such as further depicted in the embodiments in regard to FIGS. 7-10. As further shown and described in regard to FIGS. 7-10 and FIG. 13-FIG. 16, the chiller working fluid may enter the chiller assembly A40 and flow at the first chiller working fluid passage A68 of one piston body C700 and the second chiller working fluid passage A70 of another piston body C700. Stated differently, in various embodiments, the chiller working fluid may enter the chiller assembly A40 and flow in thermal communication with a generally hotter portion of one piston body C700 (i.e., proximate along the lateral direction L to the expansion chamber A221) and engine working fluid positioned proximal to the hot or expansion chamber A221. The chiller working fluid may then flow to another piston body C700 to a portion distal to the hot or expansion chamber A221 of the other piston body C700, such as may be generally cooler relative to first piston body C700.

Figure 7:
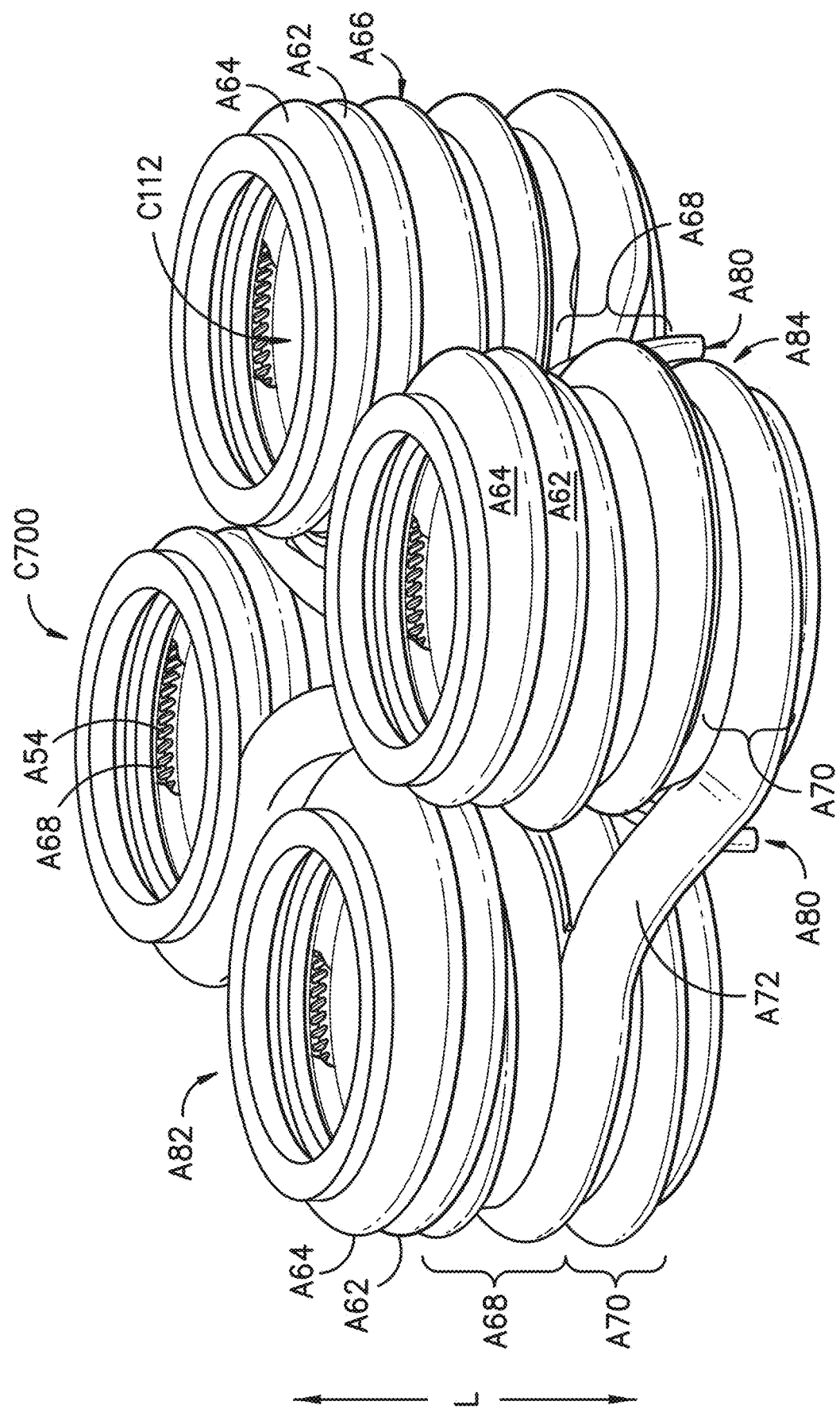
FIG. 7 is a perspective view of a portion of an exemplary embodiment of an engine according to an aspect of the present disclosure.
Figure 8:
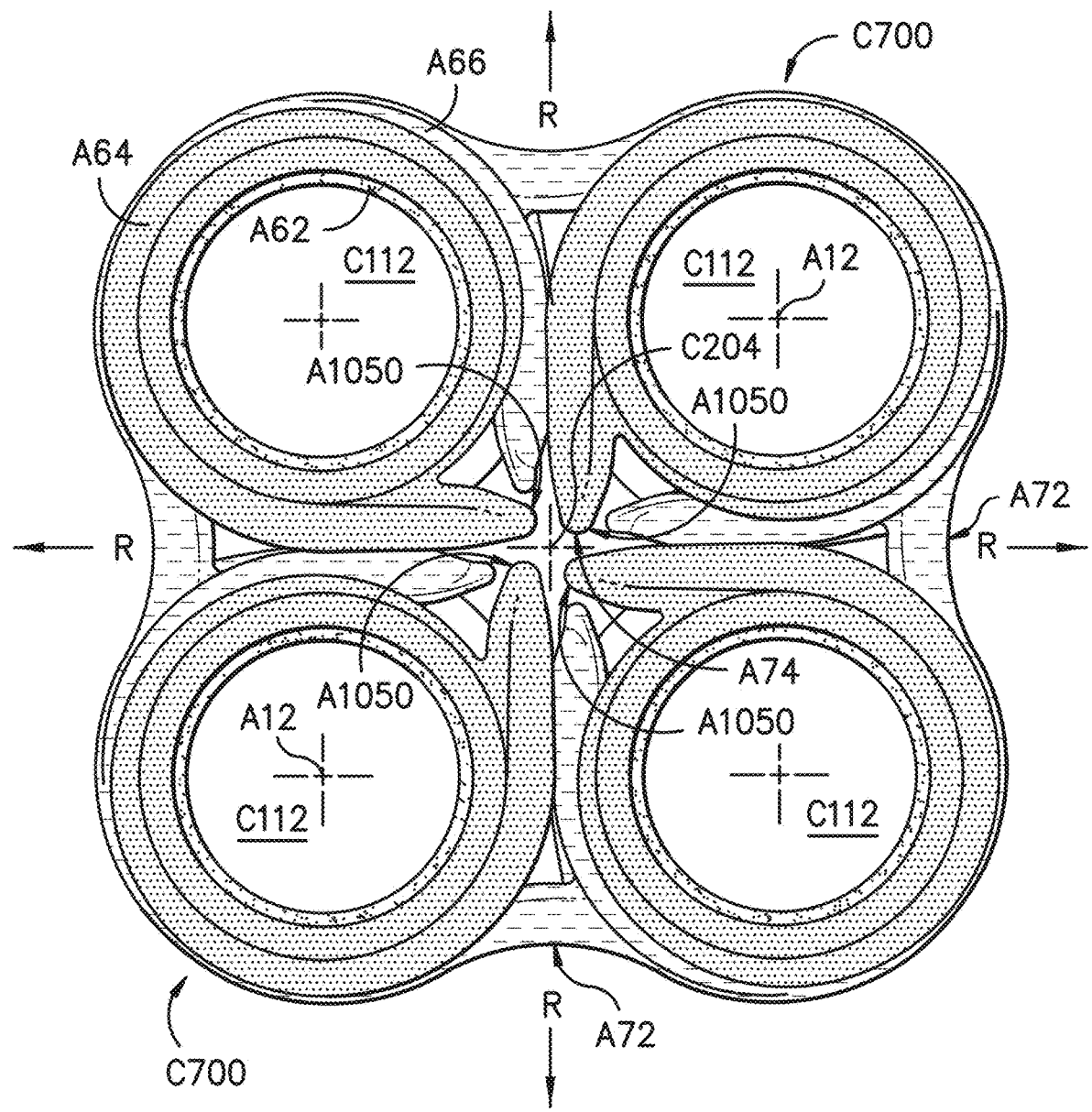
FIG. 8 is a top-down view of fluid flowpaths within a portion of an exemplary embodiment of an engine such as provided in regard to FIG. 7.
Figure 9:
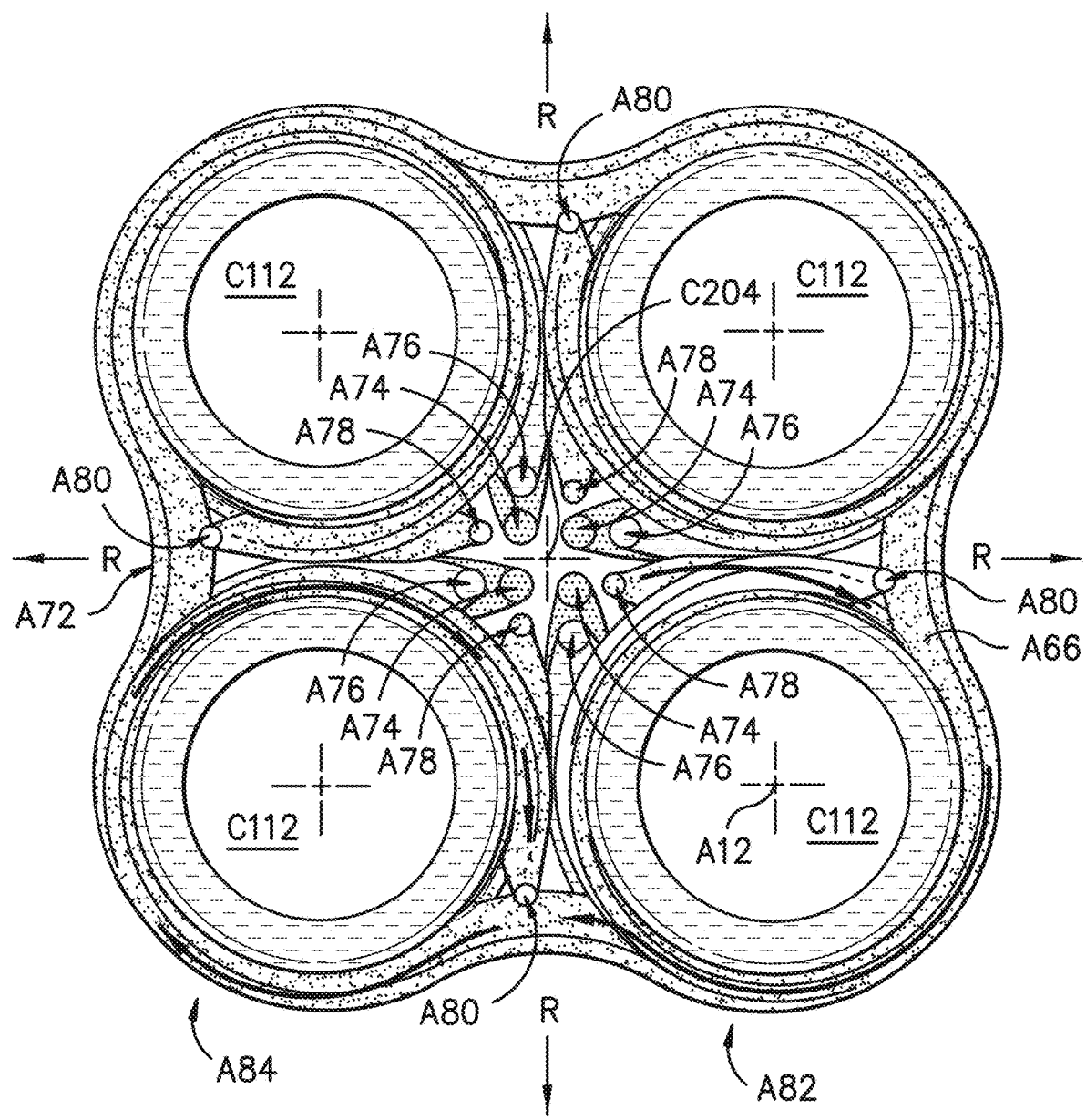
FIG. 9 is a bottom-up view of fluid flowpaths within a portion of an exemplary embodiment of an engine such as provided in regard to FIG. 7.

Referring now to FIG. 7, a perspective view of an exemplary embodiment of a portion of the engine A100 is provided. Referring additionally to FIG. 8-FIG. 9, further embodiments of the portion of the engine A100 are provided. FIG. 7 includes a partial cutaway view within the piston body C700 exposing chiller conduits A54 between the volume walls A46, A48. FIG. 7 depicts at least a pair of the piston bodies C700 including the connecting chiller conduit A54 such as to provide fluid communication and thermal communication from the first chiller working fluid passage A68 of the first piston body C700 to the second chiller working fluid passage A70 of the second piston body C700. Additionally, the second piston body C700 includes the connecting chiller conduit A54 providing fluid communication and thermal communication from the first chiller working fluid passage A68 of the second piston body C700 to another adjacent second chiller working fluid passage A70 of another adjacent piston body C700 different from the first piston body C700 and the second piston body C700.

Referring to FIG. 8, a top-down view of an exemplary embodiment of the portion of the engine depicted in FIG. 7 is provided. Referring additionally to FIG. 9, a bottom-up view of an exemplary embodiment of the portion of the engine depicted in FIG. 7 is provided. Referring to FIG. 8-FIG. 9, the embodiments further depict the connecting chiller conduit A54 extended between pairs of the piston body C700. In one embodiment, such as depicted in regard to FIG. 8-FIG. 9, the engine includes a chiller working fluid inlet opening A78 through which chiller working fluid is provided to the chiller working fluid passage A66. The chiller working fluid inlet opening A78 may be positioned generally inward within the engine or proximal to the reference longitudinal axis C204. Referring to FIG. 9, in one embodiment, the chiller working fluid passage A66 may define a flowpath from the chiller working fluid inlet opening A78 and at least partially around one piston body C700. The flowpath may further extend across the connecting chiller conduit A54 to another or second piston body 84 adjacent or next to the first piston body 82. The flowpath of the chiller working fluid passage A66 further extends substantially circumferentially around the other piston body C700 (e.g., depicted at the second piston body C700). The flowpath is in fluid communication with a chiller working fluid outlet opening A80. In various embodiments, the chiller working fluid outlet opening A80 is positioned outward or distal from the reference longitudinal axis C204.

In various embodiments, the flowpath of the chiller working fluid passage A66 extends from the chiller working fluid inlet opening A78 at least partially circumferentially around one piston body C700 and further across the connecting chiller conduit A54 to extend at least partially circumferentially, or substantially circumferentially, around another or adjacent piston body C700. Similarly, the other or second piston body C700 includes the chiller working fluid opening and flowpath extended at least partially circumferentially to the connecting chiller conduit A54 to provide fluid communication and thermal communication to yet another piston body C700 and circumferentially around the yet another piston body C700 to the chiller working fluid outlet opening A80.

In still various embodiments, the chiller working fluid inlet opening A78, the chiller working fluid outlet opening A80, or both extend at least partially along the lateral direction L or orthogonal to the flowpath of the chiller working fluid passage A66 such as to ingress and egress the chiller working fluid through the chiller working fluid passage A66.

In one embodiment, the engine includes the chiller working fluid inlet opening A78 corresponding to each piston body C700. Additionally, or alternatively, the engine includes the chiller working fluid outlet opening A80 corresponding to each piston body C700. It should further be appreciated that in various embodiments, the flowpath of the chiller working fluid passage A66 extends at least partially along the lateral direction L such as shown and described in regard to FIG. 6. As further described in various embodiments herein, the flowpath arrangement shown and described in regard to FIGS. 6-10 provides thermal communication of the chiller working fluid with the engine working fluid, such as the engine working fluid within the chiller conduits A54 at each piston body C700. Furthermore, the flowpath arrangements shown and described in regard to FIGS. 6-10 further provide a desired amount of heat exchanging surface area for thermal energy transfer from the engine working fluid to the chiller working fluid. As such, embodiments of the chiller conduits A54, the chiller working fluid passage A66, or both, may provide an improved transfer of thermal energy from the engine working fluid to the chiller working fluid. Further still, embodiments of the chiller conduits A54, the chiller working fluid passage A66, or both, may desirably increase a temperature differential of the engine working fluid from the cold or compression chamber A222 relative to the hot or expansion chamber A221. Additionally, or alternatively, embodiments of the chiller conduits, A54, the chiller working fluid passage A66, or both, may desirably a stroke or cycle time or period of the engine A100.

Figure 10:
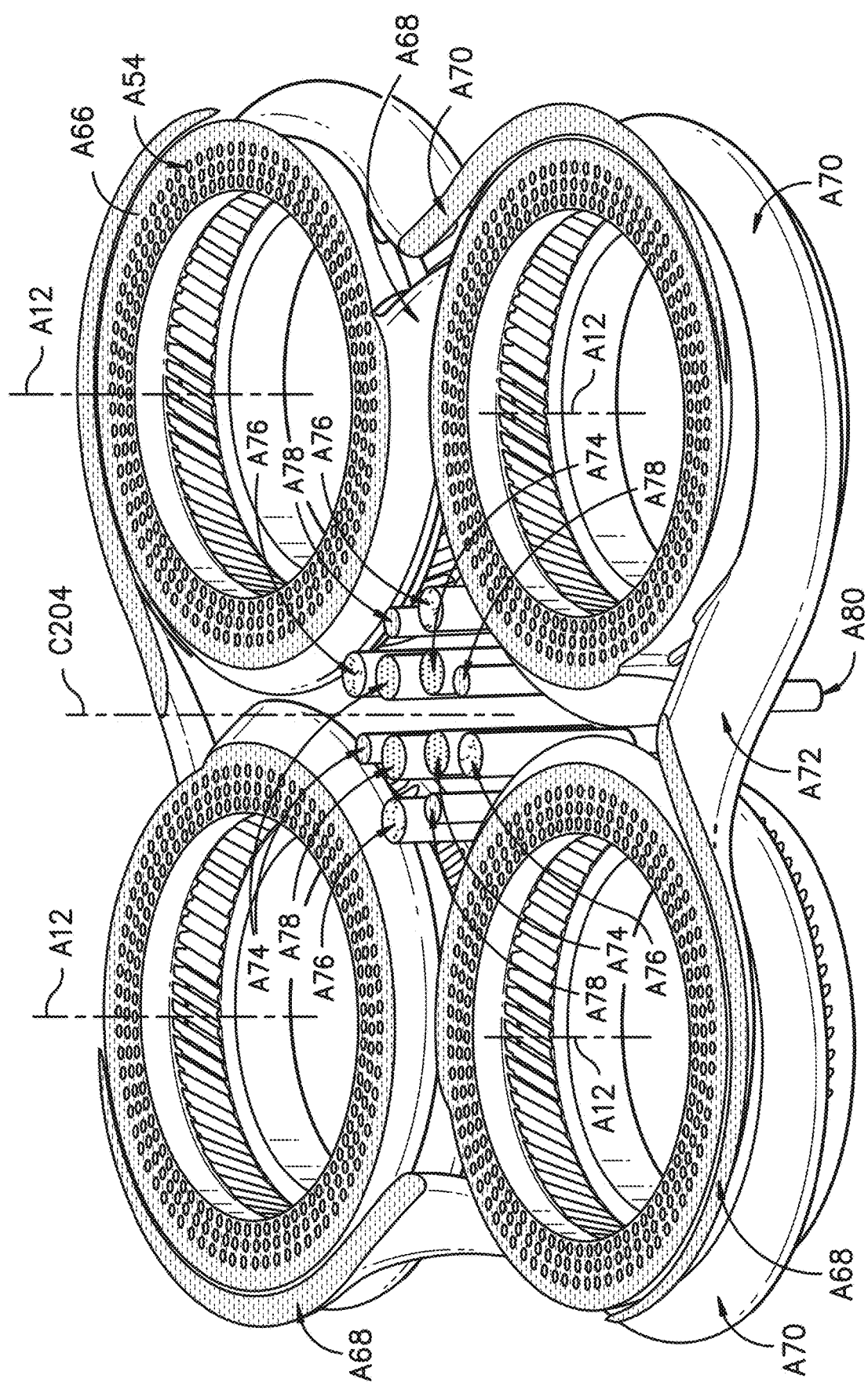
FIG. 10 is a perspective cutaway view of a portion of an exemplary embodiment of an engine such as provided in regard to FIG. 7.

Referring now to FIG. 10, a cutaway perspective view of an exemplary embodiment of the portion of the engine A100 depicted in FIG. 7 is provided. The exemplary embodiment in regard to FIG. 10 may be configured substantially similarly as shown and described in regard to FIGS. 4-9. The cutaway view further depicts the chiller conduit A54 surrounded by the chiller working fluid passage A66. The embodiment in regard to FIG. 10, and further depicted at least in part in FIGS. 8-9, a portion of the walled conduit A1050 is extended through the engine A100 inward of the plurality of piston bodies C700 relative to the radial direction R from the longitudinal axis C204. In one embodiment, such as depicted in regard to FIG. 10, the plurality of walled conduits A1050 is extended proximal to a reference longitudinal axis C204, such as inward of the piston bodies C700 along a radial direction R relative to the longitudinal axis C204. However, in other embodiments, such as depicted in regard to FIG. 13 through FIG. 16, the walled conduits A1050 may extend outward of the piston bodies C700, such as outward along the radial direction R relative to the longitudinal axis C204.

Figure 11:
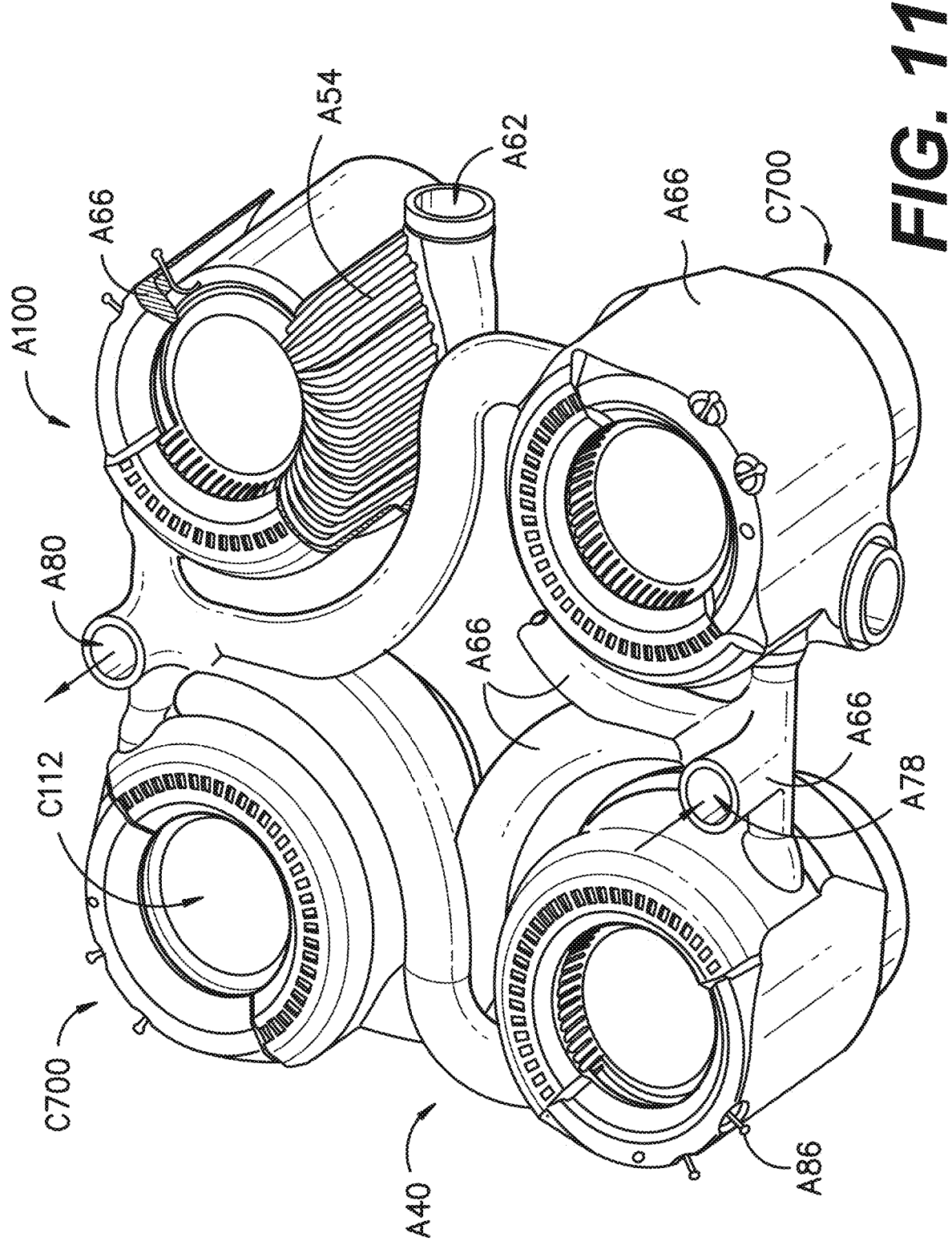
FIG. 11 is a perspective view with a partial cutaway view of a portion of an exemplary embodiment of an engine according to an aspect of the present disclosure.

Referring now to FIG. 11, a perspective view of another exemplary embodiment of the engine A100 is provided. The perspective view in FIG. 11 further includes a partial cutaway view within the piston body C700 exposing the chiller working fluid passage A66 and chiller conduits A54. The embodiment provided in regard to FIG. 11 is configured substantially similarly as shown and described in regard to FIGS. 3-10. In FIG. 11, the chiller working fluid passage A66 depicts a single or common chiller working fluid inlet opening A78 from which the chiller working fluid passage A66 provides separate flowpaths to each piston body C700. The chiller working fluid passage A66 further depicts a single or common chiller working fluid outlet opening A80 at which the chiller working fluid passage A66 re-combines the separated chiller working fluid passages A66 before egressing the chiller working fluid through the single chiller working fluid outlet opening A80.

Referring to FIG. 11, the chiller working fluid passage A66 at the chiller working fluid inlet opening A78 separates into the shorter chiller working fluid flowpath provided to piston bodies C700 proximate to the chiller working fluid inlet opening A78. The chiller working fluid passage A66 at the chiller working fluid inlet opening A78 further separates into the longer chiller working fluid flowpath provided to piston bodies C700 distal to the chiller working fluid inlet opening A78.

In various embodiments, the piston bodies C700 distal to the chiller working fluid inlet opening A78 additionally are proximate to the chiller working fluid outlet opening A80. The shorter chiller working fluid flowpath provides the shorter flowpath from the piston body C700 proximate to the chiller working fluid outlet opening A80. The chiller working fluid flowpath A66 further provides the longer flowpath (relative to the first chiller working fluid flowpath) from the piston body C700 distal to the chiller working fluid outlet opening A80.

In one embodiment, the piston body C700, such as proximate to the chiller working fluid inlet opening A78, receives chiller working fluid via the shorter chiller working fluid flowpath and egresses chiller working fluid via the longer chiller working fluid flowpath. Alternatively, the piston body C700, such as proximate to the chiller working fluid outlet opening A80, receives chiller working fluid via the longer chiller working fluid flowpath and egresses chiller working fluid via the shorter chiller working fluid flowpath. Altogether, the chiller working fluid passage A66 may define a substantially equal volume flowpath at each piston body C700 between the chiller working fluid inlet opening A78 and the chiller working fluid outlet opening A80. The substantially equal volume arrangement may provide a substantially even thermal energy transfer from the engine working fluid at each piston body C700 to the chiller working fluid.

Referring still to FIG. 11, in one embodiment, the chiller working fluid passage A66 at least partially circumferentially surrounds each piston body C700. Still further, the chiller working fluid passage A66 is extended along the lateral direction L or otherwise co-directional to the piston body C700 such that the chiller working fluid surrounds the piston body C700.

In various embodiments, such as depicted in regard to FIG. 11, the chiller conduit A54 is extended from the compression chamber A222 along a first lateral direction and extends along a second lateral direction opposite of the first lateral direction. The chiller conduit A54 includes an approximately 180 degree turn between the chiller passage opening A58 and the chiller collection chamber A62. The chiller working fluid passage A66 further surrounds the chiller conduit A54 along the lateral direction L. In various embodiments, such as depicted in FIG. 11, the chiller working fluid passage A66 further surrounds the 180 degree turn portion of the chiller conduit A54. The chiller passage openings A58 may generally be positioned such as to prevent the piston A1011 of the piston assembly A1010 from covering or otherwise obscuring the chiller passage openings A58 during operation of the system A10.

During operation, chiller working fluid flowing through the chiller working fluid passage A66 may receive thermal energy from the engine working fluid within one or more of the chiller conduits A54. The rate or quantity of thermal energy transferring from the engine working fluid to the chiller working fluid within the chiller working fluid passage A66 may vary as between respective portions of the chiller working fluid passage A66, such as shown and described in regard to the first chiller working fluid passage A68 and the second chiller working fluid passage A70, and/or between respective piston bodies (e.g., the first piston body and the second piston body). For example, the rate or quantity of thermal energy transferring from the engine working fluid to the chiller working fluid passage A66 may depend at least in part on a temperature gradient between the chiller conduit A54 and the chiller working fluid passage A66, such as a temperature gradient between the engine working fluid and the chiller working fluid. In some embodiments, however, the engine working fluid within the plurality of chiller conduits A54 may exhibit a temperature that differs as between at least two piston bodies C700 (e.g., first piston body and second piston body) and/or as between at least two portions along the lateral extension of the chamber 222 (i.e., temperature gradient of the chamber 222 along the lateral direction L) within a given piston body. Additionally, or in the alternative, the engine working fluid within the plurality of piston bodies C700 may exhibit a temperature that differs as between at least two piston bodies. For example, the engine working fluid within the plurality of chiller conduits A54 corresponding to one piston body (e.g., the first piston body) may exhibit a temperature different from the plurality of chiller conduits A54 corresponding to another piston body (e.g., the second piston body) based at least on the phase difference of the piston assemblies A1010 within the respective piston bodies during operation of the engine.

In some embodiments, the temperature of the chiller working fluid may increase as the chiller working fluid flows through the chiller working fluid passage A66 and receives thermal energy from the engine working fluid within the chiller conduits A54. In one embodiment, as depicted in regard to FIG. 6-FIG. 10, the chiller working fluid passage A66 extending at least partially circumferentially around one piston body (e.g., the first piston body), and further extended at least partially circumferentially around one or more other piston bodies (e.g., the second piston body) includes the chiller working fluid increasing in temperature by receiving thermal energy at one piston body.

In some embodiments, engine working fluid flowing from a first piston body flowing to another or second piston body may exhibit a temperature that differs from the engine working fluid flowing in an opposite direction, from the other piston body to the first piston body.

In various embodiments, the chiller working fluid and the engine working fluid may exhibit a temperature gradient that depends at least in part on whether the engine working fluid is flowing towards one piston body or another piston body. For example, a first temperature gradient may correspond to the engine working fluid flowing towards one piston body and a second temperature gradient may correspond to the engine working fluid flowing towards another piston body. In some embodiments the first temperature gradient may be smaller than the second temperature gradient. In other embodiments the second temperature gradient may be greater than the first temperature gradient. For example, the first temperature gradient may be smaller than the second temperature gradient at least in part because of the temperature of the engine working fluid flowing towards one piston body is greater than the temperature of engine working fluid flowing towards the other piston body.

In some embodiments, the rate and/or quantity of thermal energy transfer from the engine working fluid to the chiller working fluid may depend on whether the engine working fluid defines the first temperature gradient or the second temperature gradient. For example, a first rate and/or quantity of thermal energy transfer from the engine working fluid to the chiller working fluid may correspond to engine working fluid flowing towards one piston body and a second rate and/or quantity of thermal energy transfer from the engine working fluid to the chiller working fluid may correspond to the engine working fluid flowing towards another piston body. In some embodiments the first rate and/or quantity of thermal energy transfer may be smaller than the second rate and/or quantity of thermal energy transfer. In other words, the second rate and/or quantity of thermal energy transfer may be greater than the first rate and/or quantity of thermal energy transfer. For example, the first rate and/or quantity of thermal energy transfer may be smaller than the second rate and/or quantity of thermal energy transfer at least in part because of the first temperature gradient corresponding to engine working fluid flowing towards one piston body being smaller than the second temperature gradient corresponding to engine working fluid flowing towards another piston body.

In some embodiments, the efficiency of thermal energy transfer from the engine working fluid to the chiller working fluid may be enhanced at least in part by the second rate and/or quantity of thermal energy transfer corresponding to the engine working fluid flowing towards the first piston body being greater than the first rate and/or quantity of thermal energy transfer corresponding to the engine working fluid flowing towards second piston body. For example, in this way, a relatively larger proportion of the thermal energy input from the chiller conduits A54 may be applied to the chiller working fluid as the chiller working fluid flows from one piston body to another piston body to which the chiller working fluid passage A66 is thermally coupled (i.e., via the connecting chiller conduit A54). The thermal energy input to the chiller working fluid during the cycle of the piston assembly in a first direction (e.g., downstroke portion of the stroke cycle) may contribute to the downstroke (e.g., directly) by further cooling and thereby further contracting the engine working fluid. During another portion of the engine cycle (e.g., the upstroke portion of the stroke cycle), a relatively smaller proportion of the thermal input by the engine working fluid in the chiller conduits A54 may be applied to the chiller working fluid, which may reduce or mitigate a potential for thermal energy output from the engine working fluid to counteract the upstroke by further heating and thereby contracting the engine working fluid, providing an additional or alternative efficiency enhancement. With a relatively smaller proportion of the thermal energy input by the chiller conduits A54 applied to the chiller working fluid during the upstroke, a smaller portion of the thermal energy input may be transferred to the chiller working fluid.

As the chiller working fluid flows through the chiller working fluid passage A66, thermal energy may preferentially transfer to the chiller working fluid within the chiller working fluid passage A66 where the temperature gradient is larger or largest, thereby preferentially providing thermal energy to the chiller working fluid at the walled conduit and/or first or second chiller working fluid passage A70 where there is a greater capacity to receive thermal energy from the engine working fluid. For example, the first chiller working fluid passage A68, positioned more proximate to the expansion chamber A221 than the second chiller working fluid passage A70, may exhibit a larger temperature gradient between the engine working fluid and the chiller working fluid. The second chiller working fluid passage A70, positioned distal to the expansion chamber A221 relative to the first chiller working fluid passage A68, may exhibit a lower temperature gradient between the engine working fluid and the chiller working fluid. Additionally, such as described herein, the chiller working fluid passage A66 at one piston body may exhibit a larger temperature gradient than another piston body to which the chiller working fluid passage A66 is thermally coupled (i.e., via the connecting chiller conduit A54), such as based on the cycle or stroke of the engine during operation. Still further, the temperature gradient at the first chiller working fluid passage A68 at one piston body may be different (e.g., greater or lesser) than the second chiller working fluid passage A70 at another piston body to which the chiller working fluid passage A66 is thermally coupled, such as due at least in part to the cycle or stroke of the engine. As such, thermal energy may preferentially transfer from the engine working fluid to the chiller working fluid based at least on the larger temperature gradient at any time during the cycle of the engine.

It should be appreciated that embodiments of the chiller assembly including the chiller working fluid passage A66 and the cold side heat exchanger A42 may function substantially similarly as shown and described by embodiments of the hot side heat exchanger C108 provided herein.

Working Fluid Body Heater Conduits

Figure 12:
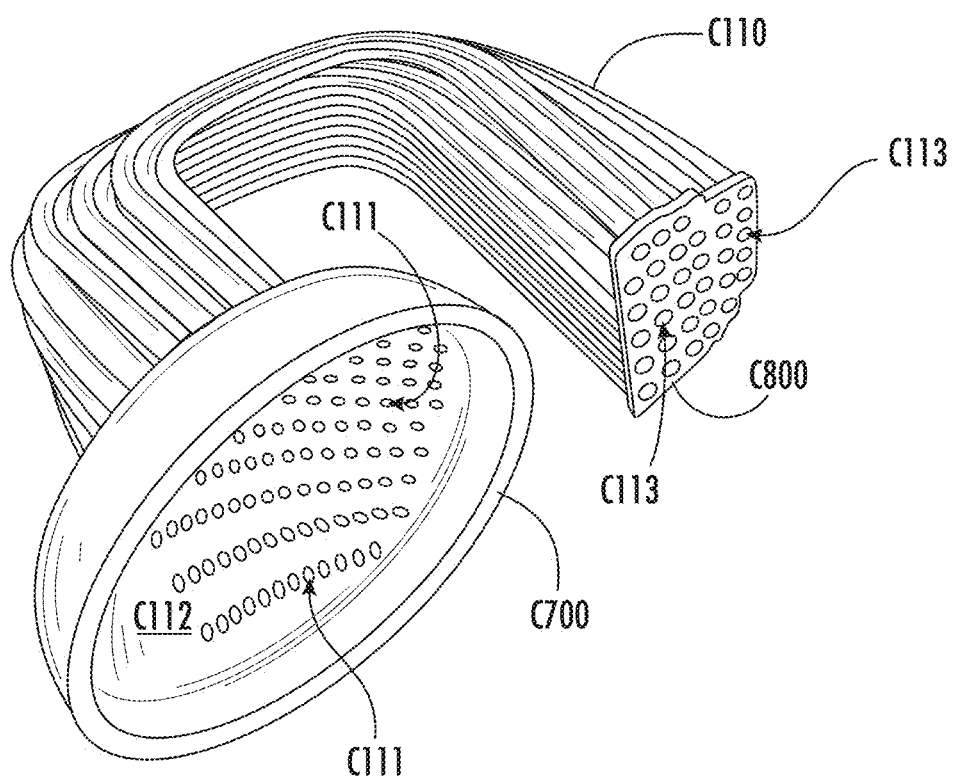
FIG. 12 is a perspective view of a portion of an exemplary embodiment of an engine such as provided according to an aspect of the present disclosure.
Figure 13:
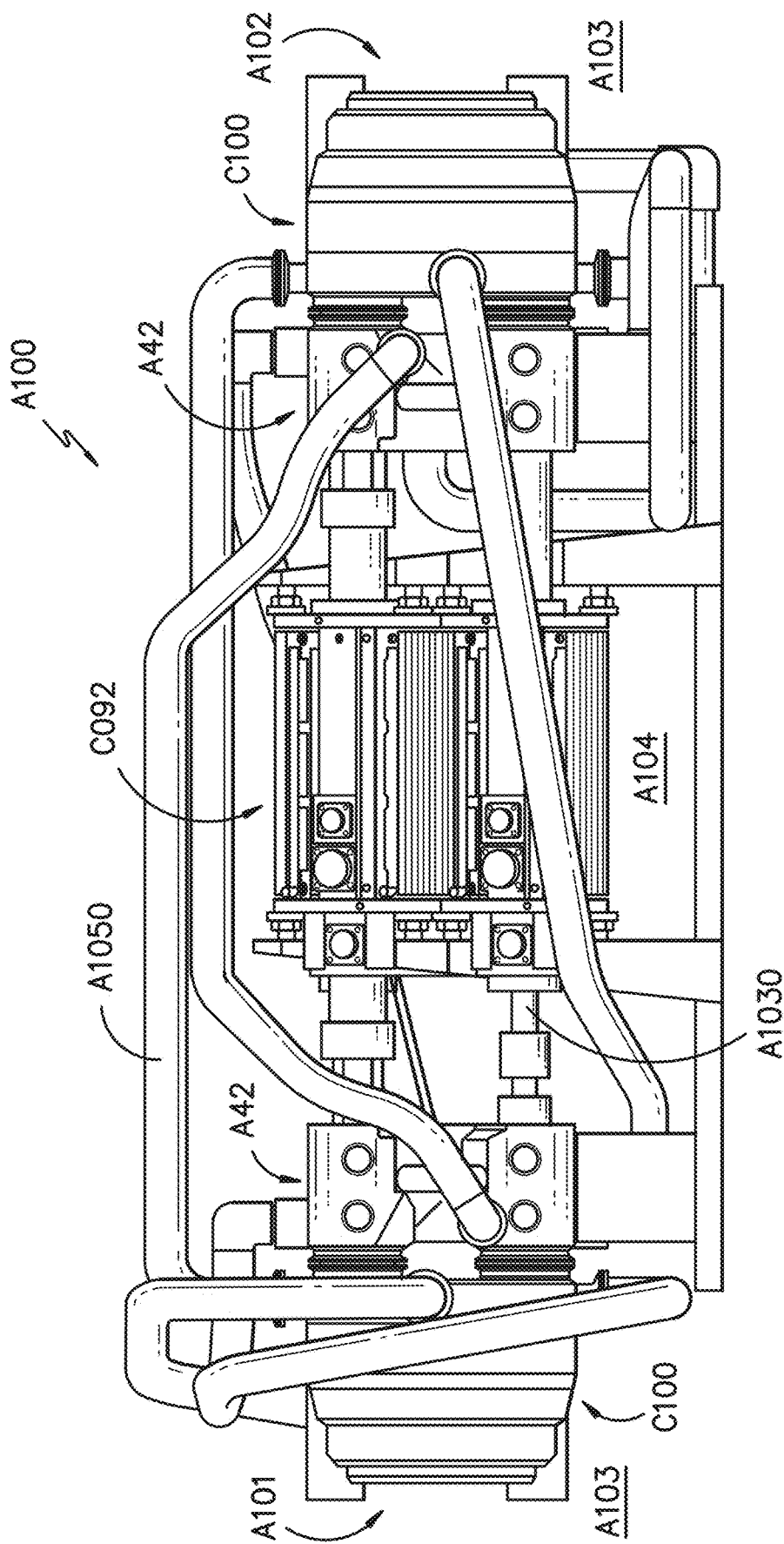
FIG. 13 is a side view of an exemplary embodiment of a portion of an engine according to an aspect of the present disclosure.

Now referring to FIG. 12, an exemplary embodiment of the working-fluid body c108 is provided. The presently disclosed working-fluid bodies c108 may define part of the heater body c100 the piston body C700. The working fluid body C108 includes a plurality of heater conduits or working-fluid pathways C110 through which engine working fluid flows between the expansion chamber A221 and the compression chamber A222.

The plurality of working-fluid pathways c110 may extend between respective ones of a plurality of a first opening or piston chamber apertures c111 and respective ones of a plurality of a second opening or regenerator apertures c113. The piston chamber apertures c111 provide fluid communication between the working-fluid pathways c110 and the piston chamber c112, and the regenerator apertures c113 provide fluid communication between the working-fluid pathways c110 and the regenerator conduit c1000. The piston chamber apertures c111 may define a first end of the working-fluid pathways c110 and the regenerator apertures c113 may define a second end of the working-fluid pathways c110.

Operation of the engine A100 and system A10 includes the plurality of piston assemblies A1010 moving in cyclic operation, such as in back and forth movement between the piston body c700 at the first end A101 and another piston body c700 at the second end A102 (FIG. 2). Pressure increases and decreases at respective chambers A221, A222 correspond to movement of the piston assemblies A1010, such as further described herein. In exemplary embodiments such as depicted in regard to FIG. 2. or FIG. 13 through FIG. 16, the plurality of piston bodies c700 may include the expansion chamber A221 and the compression chamber A222 defined at each end A101, A102 of each piston assembly A1010, such as to provide eight each of the expansion chamber A221 and the compression chamber A222 at four piston assemblies A1010. The plurality of piston assemblies A1010 may be disposed radially relative to the longitudinal axis C204.

The plurality of working fluid pathways C110 extend in fluid communication from an expansion chamber A221 to the walled conduit A1050. In various embodiments, such as further described herein, the working fluid pathways C110 extend in fluid communication from the expansion chamber A221 to a corresponding regenerator body C800 at the walled conduit A1050. A first plurality of heater conduits or working-fluid pathways C110 may fluidly communicate between an expansion chamber A221 defined by a first piston body C700 and a first compression chamber A222 defined by another piston body C700 different from the first piston body C700 (e.g., not the first piston body). A second plurality of working-fluid pathways C110 may fluidly communicate between a second expansion chamber A221 (i.e., different from the first expansion chamber) defined by a second piston body c700 and a compression chamber A222 defined by another piston body C700 (e.g., not the second piston body).

Fluid communication between the expansion chamber A221 of one piston body C700 and the compression chamber A222 of another piston body C700 through the heater conduits or working fluid pathways C110 provides for the engine working fluid to be in thermal communication with the heating working fluid surrounding the working fluid pathways C110. For example, the heating working fluid, such as described herein, is provided in thermal and/or fluid communication around the working fluid pathways C110. The working fluid pathways C110 fluidly separate the heating working fluid and the engine working fluid while further providing heat transfer between the heating working fluid and the engine working fluid (e.g., heat transfer from the heating working fluid to the engine working fluid).

The engine working fluid is heated at least at the working fluid pathways C110 and provides for pressure change at the respective expansion chamber A221 (e.g., pressure increase at the expansion chamber A221). Based at least on the engine cycle, such as the movement of the piston assemblies A1010, pressure changes at the engine working fluid between the fluidly connected expansion chamber A221 and the compression chamber A222 via the heater conduit or working fluid pathways C110 correspond to heat transfer to the engine working fluid from the heating working fluid. As further described herein, based at least on the engine cycle, heat transfer, or an amount of heat transferred, to the engine working fluid may be based on the engine cycle. For example, the amount of heat transferred to the engine working fluid may correspond to whether the expansion chamber A221 is increasing in pressure or decreasing in pressure, or whether a corresponding fluidly connected compression chamber A222 is decreasing in pressure or increasing in pressure.

As further described herein, the plurality of heater conduits or working fluid pathways C110 beneficially provides for heat exchange, such as heat transfer to from the heating working fluid to the engine working fluid. The plurality of working fluid pathways C110 provides a desired amount of heat transfer to the engine working fluid, such as to improve operation of the engine A100. Improved operation of the engine A100 may include improved power output, improved power density, and/or improved efficiency of the engine A100.

Engine Chamber to Chamber Conduits Arrangements

The cross sectional view provided in FIG. 2 is cut along the lateral direction L such as to depict two of four piston assemblies A1010 of the system A10. In various embodiments, the system A10 provided in regard to FIG. 2 further includes the walled conduits A1050 disposed inward of the piston bodies C700 proximate to the reference longitudinal axis C204, such as shown and described in regard to FIGS. 8-10. In other embodiments, the system A10 provided in regard to FIG. 2 further includes the walled conduits A1050 disposed outward of the piston bodies C700, such as shown and described in regard to FIG. 13 through FIG. 16.

Referring to FIG. 13 through FIG. 16, side, end, and perspective views of a portion of the system A10 are provided. The embodiments provided in regard to FIG. 13 through FIG. 16 are configured substantially similarly as shown and described in regard to FIG. 2-FIG. 3. In regard to FIG. 13-FIG. 16, the portions of the system A10 depicted therein include four piston assemblies A1010 positioned within eight respective piston bodies C700. The piston bodies C700 may generally include the first volume wall and the second volume wall shown and described in regard to FIG. 2-FIG. 3. The piston bodies C700 may generally define cylinders into which pistons A1011 of the piston assembly A1010 are each positioned such as to define the expansion chamber A221 and the compression chamber A222 within each piston body C700. However, it should be appreciated that other suitable geometries of the piston body C700 containing the piston A1011 may be utilized.

The engine A100 further includes a plurality of walled conduits A1050 connecting particular chambers A221, A222 of each piston body C700 (FIG. 2) such as to define a balanced pressure arrangement of the pistons A1011. In various embodiments, the engine A100 includes at least one interconnected volume of chambers A221, A222 such as described herein. In one embodiment, such as depicted in regard to FIG. 13-FIG. 16, the engine A100 includes two interconnected volumes in which each interconnected volume includes an expansion chamber A221 of a first piston body C700 of a first piston assembly A1010 connected in fluid communication of the engine working fluid with a compression chamber A222 of a second piston body C700 of a second piston assembly A1010 each connected by a conduit A1050. More particularly, the balanced pressure arrangement of piston assemblies A1010 depicted in regard to FIG. 13-FIG. 16 includes two interconnected volumes each substantially fluidly separated from one another and/or substantially pneumatically separated from one another. The fluidly separated and/or pneumatically separated arrangement of chambers A221, A222 into the interconnected volume, and those chambers A221, A222 outside of the interconnected volume or in another interconnected volume, is particularly provided via the arrangement of expansion chambers A221 connected to compression chambers A222 via the walled conduits A1050 such as further described herein.

Figure 14:
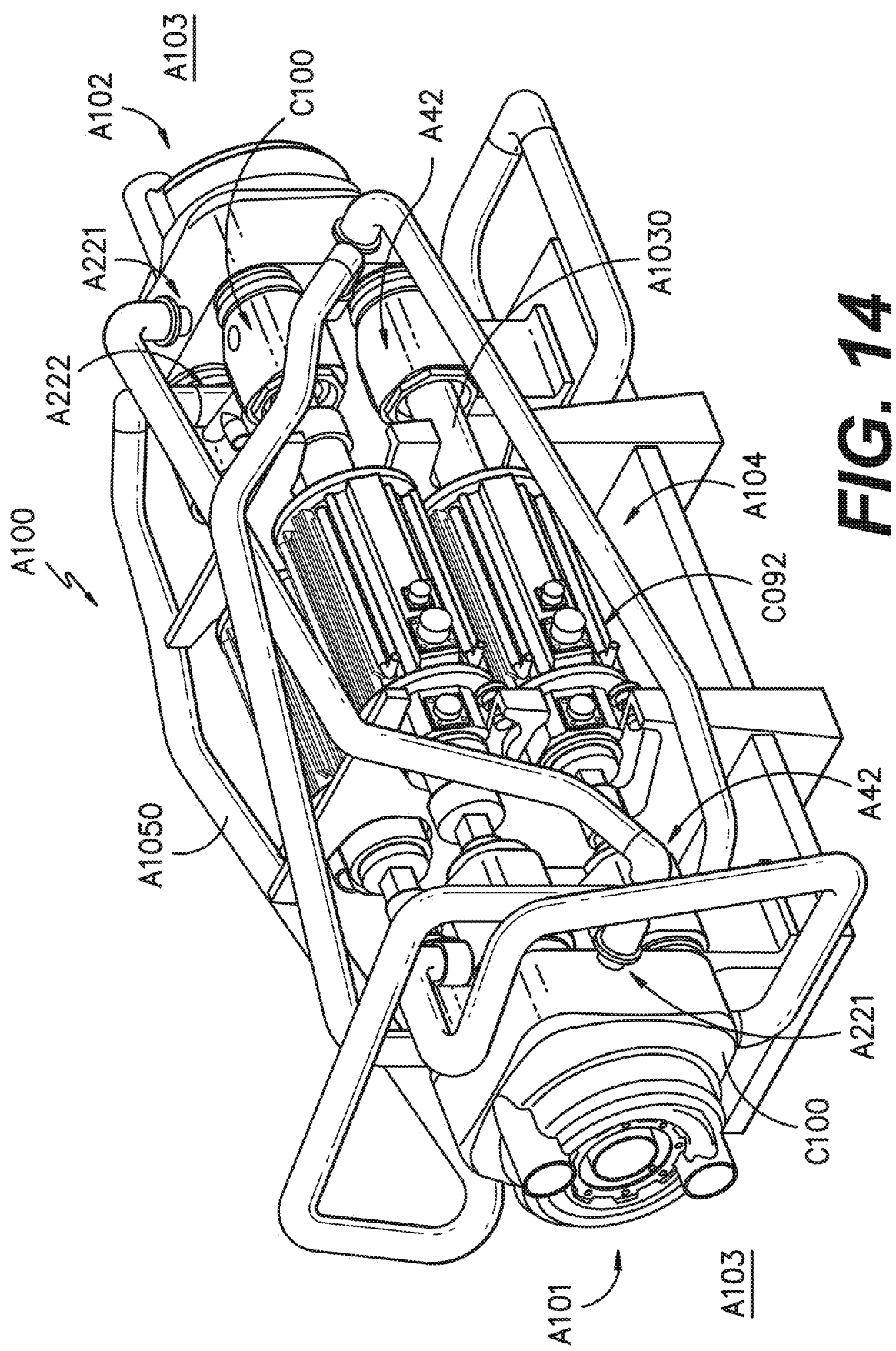
FIG. 14 is a perspective view of an exemplary embodiment of a portion of an engine such as provided in regard to FIG. 13.
Figure 15:
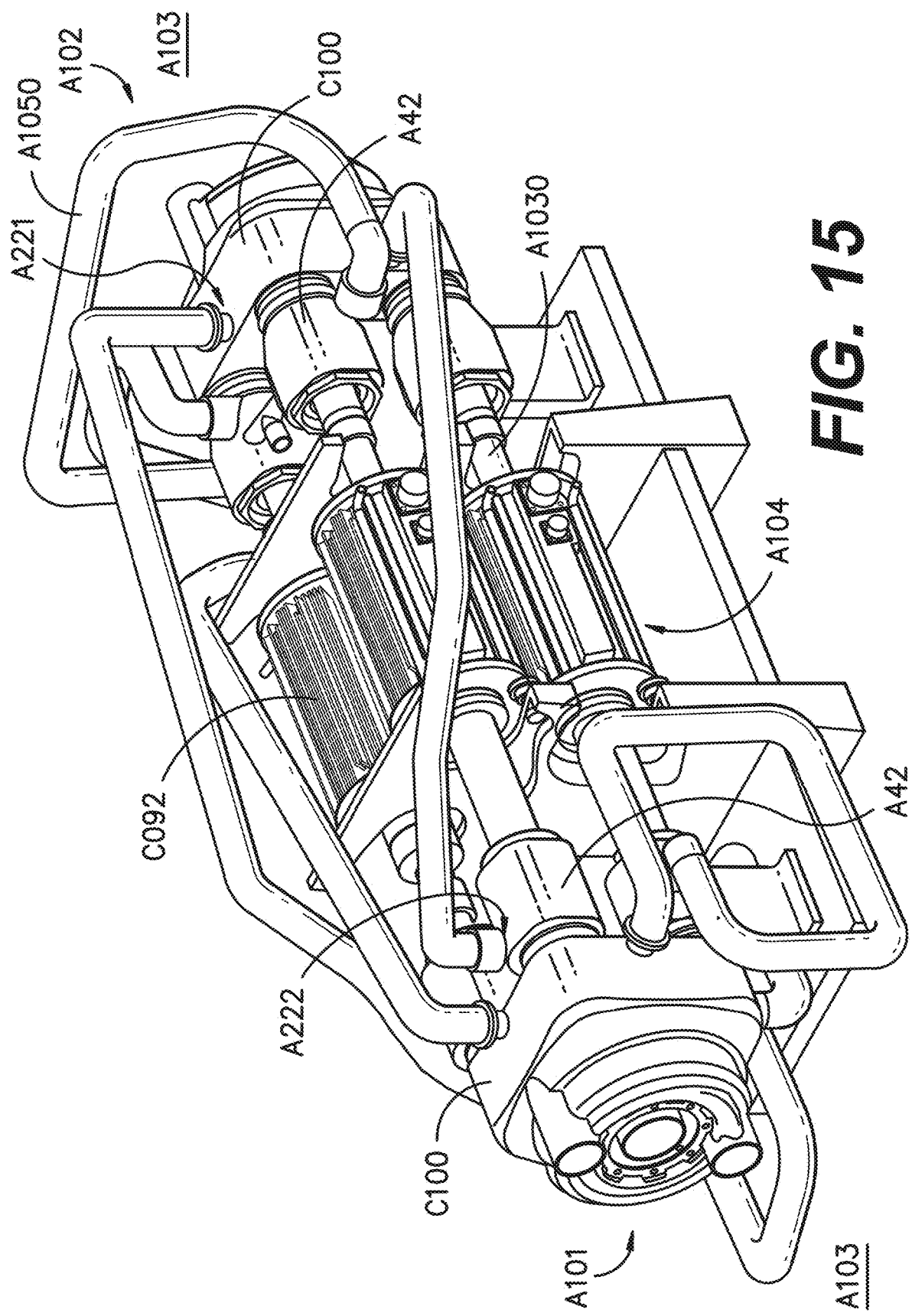
FIG. 15 is another perspective view of an exemplary embodiment of a portion of an engine such as provided in regard to FIG. 13 through FIG. 14.
Figure 16:
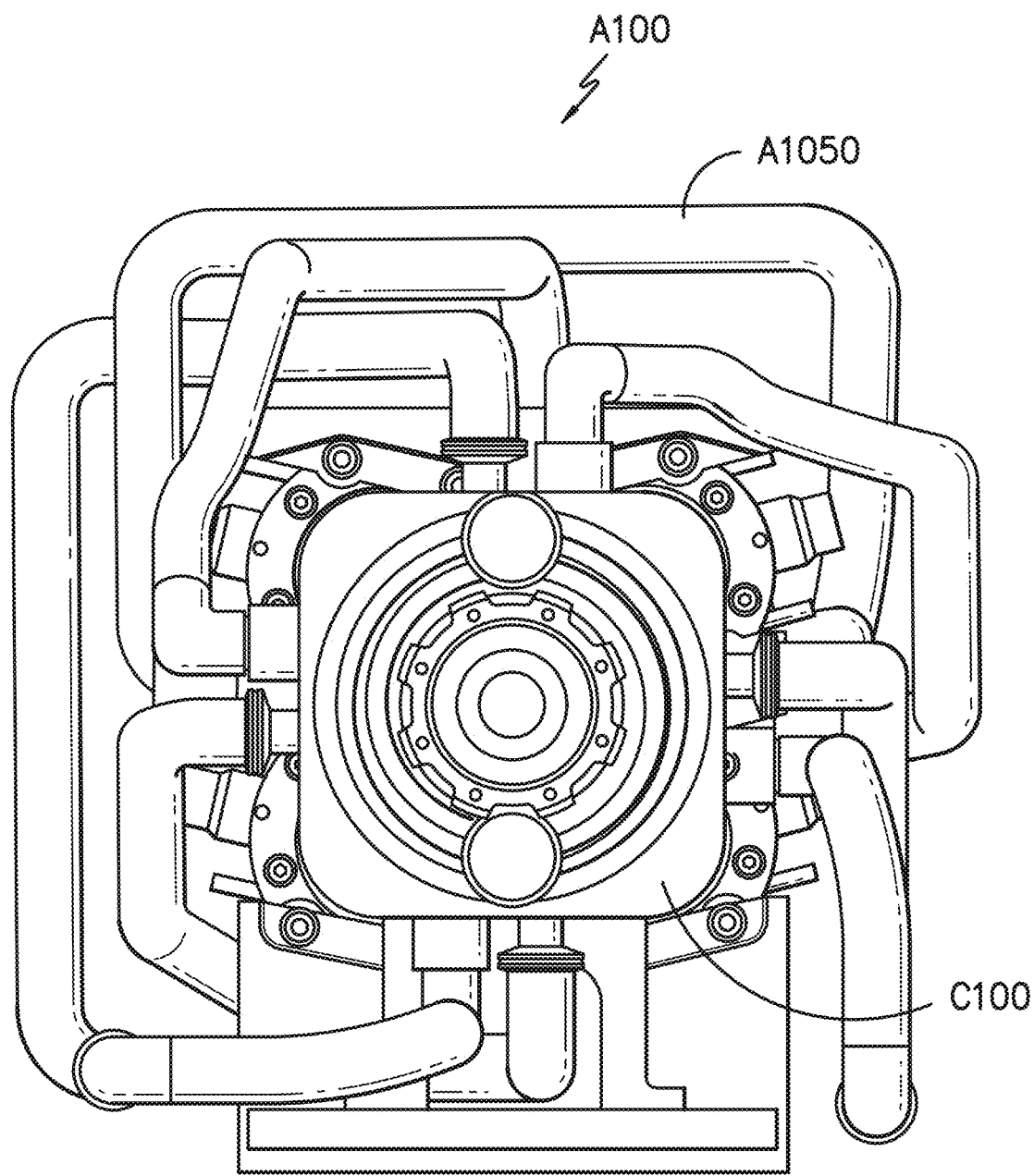
FIG. 16 is an end view of an exemplary embodiment of a portion of an engine such as provided in regard to FIG. 13 through FIG. 14.

In various embodiments, the interconnected volume includes pairs of the expansion chamber A221 fluidly coupled to the compression chamber A222 each defined at laterally separated ends of the piston assemblies A1010. In one embodiment, the engine A100 defines a first end 101 separated along the lateral direction L by the connection member A1030 from a second end 102, such as depicted in FIG. 14 and FIG. 15. Each end of the engine A100 defines an expansion chamber A221 and a compression chamber A222 at each piston A1011 of each piston assembly A1010. The engine A100 depicted in FIG. 13-FIG. 16, and further in regard to FIG. 2, includes the expansion chamber A221 at one end connected to a respective compression chamber A222 at another end via respective conduits. In one embodiment, such as depicted in FIGS. 14 and 15, the engine A100 includes two expansion chambers A221 at the first end 101 each connected to respective compression chambers A222 at the second end 102 via respective conduits A1050. The engine A100 further includes two expansion chambers A221 at the second end 102 each connected to respective compression chamber A222 at the first end 101 via respective conduits A1050. The system A10 further includes four expansion chambers A221 at one end each connected to respective compression chambers A222 at the same end via respective conduits A1050. In one embodiment, the system A10 includes two expansion chambers A221 at the first end 101 each connected to respective compression chambers A222 at the first end 101 via respective walled conduits A1050. The system A10 further includes two expansion chambers A221 at the second end 102 each connected to respective compression chambers A222 at the second end 102 via respective walled conduits A1050.

To provide a balanced pressure arrangement of piston assemblies A1010, one interconnected volume includes a pair of the expansion chamber A221 at one end (e.g., the first end 101 or the second end 102) connected to the compression chamber A222 at the other or opposite end. In one embodiment, the expansion chamber A221 at the first end 101 is fluidly connected to the compression chamber A222 at the second end 102. In another embodiment, the expansion chamber A221 at the second end 102 is fluidly connected to the compression chamber A222 at the first end 101. The interconnected volume further includes a pair of expansion chambers A221 at the first end 101 or the second end 102 connected to a respective compression chamber A222 at the same end, opposing ends, or both, relative to the expansion chamber A221. In one embodiment, the expansion chamber A221 at the first end 101 is fluidly connected to the compression chamber A222 at the same end (i.e., the first end 101). In another embodiment, the expansion chamber A221 at the second end 102 is fluid connected to the compression chamber A222 at the same end (i.e., the second end 102). In yet another embodiment, the expansion chamber A221 at the first end 101 is fluidly connected to the compression chamber A222 at the second end 102 (i.e., the opposing end). In still yet another embodiment, the expansion chamber A221 at the second end 102 is fluidly connected to the compression chamber at the first end 101 (i.e., the opposing end). It should be appreciated that the arrangement described herein includes each expansion chamber A221 of one piston body C700 of one piston assembly A1010 connected to a respective compression chamber A222 of another, different piston body C700 of another, different piston assembly A1010. It should further be appreciated that, in various embodiments, the expansion chamber A221 of one piston body C700 and one piston assembly C1010 is exclusively fluidly connected to the compression chamber A222 of another piston body C700 of another piston assembly C1010 (i.e., each walled conduit A1050 fluidly connects only one expansion chamber A221 to only one compression chamber A222).

The balanced pressure arrangement of piston assemblies A1010 described herein is such that a uniform temperature applied at the expansion chambers A221 and the compression chambers A222 provides an equal pressure at the expansion chamber A221 of one piston body C700 counteracted by an equal and opposite pressure at the same piston body C700 relative to the expansion chamber A221. Stated alternatively, when a uniform temperature is applied to the expansion chambers A221 and the compression chambers A222, movement of one piston assembly A1010 defining a free piston assembly A1010 results in pressure cancellation at adjacent piston assemblies A1010 such that pressure waves will not propagate to induce movement of the adjacent piston assembly A1010.

It should be appreciated that each interconnected volume described herein includes one or more passages, chambers, openings, or other flowpaths between the arrangements of the compression chamber A222 and the expansion chamber A221 described above. For example, the particular arrangements of walled conduits A1050 providing fluid communication of the engine working fluid between the compression chamber A222 and the expansion chamber A221 such as described in regard to FIGS. 13 through 16 further includes the chiller conduits A54, collection chambers A62, A64, heater conduits C110, etc. such as shown and described in regard to FIG. 4 through FIG. 12. Additionally, or alternatively, the particular arrangements of walled conduits A1050 providing fluid communication between the compression chamber A222 and the expansion chamber A221 such as described in regard to FIG. 13 through FIG. 14 may further include a heat exchanger or regenerator.

Although depicted as a balanced pressure arrangement of four piston assemblies A1010 at eight piston bodies C700 defining eight fluidly connected pairs of expansion chambers A221 and compression chambers A222, it should be appreciated that the engine A100 generally includes an interconnected volume such as described above. As such, other embodiments of the engine A100 may include a quantity of two or more piston assemblies A1010 in which the arrangements of the piston assembly A1010 are scaled accordingly based on the arrangement described above such as to provide at least one interconnected volume of chambers A221, A222 and conduits 1050.

In various embodiments, the system A10 defines the reference longitudinal axis C204 extended co-directional to the lateral direction L or generally along a direction along which the pistons A1011 articulate within the chambers A221, A222. The chambers A221, A222 are positioned in circumferential arrangement relative to the reference longitudinal axis C204. Each chamber 221, 222 is extended along the lateral direction L or otherwise co-directional to the reference longitudinal axis C204.

In one embodiment, the engine includes four piston assemblies A1010 extended along the lateral direction L and in circumferential arrangement relative to the reference longitudinal axis C204. The piston assemblies A1010 may be positioned equidistant to one another around the reference longitudinal axis C204. In one embodiment, a pair of the heater body is positioned at outer ends A103 of the engine. The heater body is positioned proximate to the expansion chamber A221 and distal to the compression chamber A222. Each heater body may be positioned and configured to provide a substantially even flow of thermal energy to four hot side heat exchangers 160 or expansion chambers A221 at a time.

In other embodiments, the engine A100 includes two or more piston assemblies A1010 in side-by-side arrangement. The piston assemblies A1010 may be positioned equidistant relative to one another. In still various embodiments, a single heater body C100 may be positioned relative to each hot side heat exchanger or working fluid body C108. It should be appreciated that various embodiments of the system A10 provided herein may include any quantity of heater bodies positioned at any quantity of expansion chambers A221 as desired. However, it should be appreciated that other arrangements may be utilized as desired such as to provide thermal energy to the expansion chambers A221. In still various embodiments, other arrangements may be utilized such as to provide selective or independent operability of a plurality of heater bodies C100. For example, selective or independent operability of the plurality of heater bodies C100 may desirably control a temperature, flow rate, or other property of thermal energy, or particularly the heating working fluid, provided in thermal communication to the working fluid body C108. Selective operability may further include selective on/off operation of one or more heater bodies C100 independent of one another.

It should further be appreciated that although the piston assemblies A1010 of the engine A100 are depicted in straight, flat, inline, or horizontally opposed arrangements, the piston assemblies A1010 and heater bodies C100 may alternatively be arranged in V-, W-, radial, or circumferential arrangements, or other suitable piston assembly A1010 arrangements. For example, one or more embodiments of the system A10 may include a center and/or outer heater body C100 around which the plurality of piston assemblies A1010 is positioned.

In general, the exemplary embodiments of system A10 and engine, or portions thereof, described herein may be manufactured or formed using any suitable process. However, in accordance with several aspects of the present subject matter, some or all of system A10 may be formed using an additive manufacturing process, such as a 3-D printing process. The use of such a process may allow portions of the system A10 to be formed integrally, as a single monolithic component, or as any suitable number of sub-components. In various embodiments, the manufacturing process may allow the all or part of the heater body, the chiller assembly, the load device c092, or the engine to be integrally formed and include a variety of features not possible when using prior manufacturing methods.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

The component may be "built-up" slice-by-slice, or layer-by-layer, until finished. Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the system A10 provided herein without undue experimentation. For example, build features, such as trusses, grids, build surfaces, or other supporting features, or material or fluid ingress or egress ports, may be added or modified from the present geometries to facilitate manufacture of embodiments of the system A10 based at least on a desired manufacturing process or a desired particular additive manufacturing process.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Closed-cycle engine arrangements, such as Stirling engines, generally define a ratio of power output in Watts to a product of mean average engine working fluid pressure in Pascals, swept volume of the engine working fluid in cubic meters, and engine cycle frequency in Hertz (i.e., operating frequency of a piston assembly), otherwise referred to as a Beale number. Referring to certain embodiments of the system A10 shown and described herein, features, arrangements, ratios, or methods of manufacture and assembly shown and described herein provide the engine A100 to define a first operational parameter in which the first operational parameter defines a maximum operational Beale number greater than or equal to 0.10. In another embodiment, the engine A100 defines a maximum operational Beale number greater than 0.15. In still another embodiment, the engine A100 defines a maximum operational Beale number greater than 0.20. In yet another embodiment, the engine A100 defines a maximum operational Beale number greater than 0.23. In various embodiments, the engine A100 defines a maximum operational Beale number less than or equal to 0.35. In still various embodiments, the engine A100 defines a maximum operational Beale number less than 0.30. In one embodiment, embodiments of the engine A100 shown and described herein define a maximum operational Beale number between 0.10 and 0.35, inclusive. In still various embodiments, the engine A100 defines a maximum operational Beale number between 0.15 and 0.30.

Embodiments of the system A10 and engine A100 provided herein provide greater Beale numbers via one or more of the features, arrangements, ratios, or methods of manufacture and assembly provided herein. Greater Beale numbers are provided at least in part via lower average engine working fluid pressure, lower engine cycle frequency of the piston assemblies A1010, or lower swept volume of the engine working fluid between fluidly connected chambers A221, A222, or combinations thereof, relative to the power output from the piston assembly A1010. Exemplary embodiments of the system A10 and engine A100 provided herein may produce a mechanical power output from the piston assembly A1010 up to 100 kilowatts (kW) or more.

Embodiments of the engine A100 provided herein may provide greater Beale numbers based at least in part on the plurality of heater conduits C110 collectively defining a desired heat transferability of thermal energy from the hot side heat exchanger C108 to the engine working fluid within the plurality of heater conduits C110. In various embodiments, the system A10 defines a ratio of maximum cycle volume of the engine working fluid to a collective volume of the plurality of heater conduits. The maximum cycle volume is the maximum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The minimum cycle volume is the minimum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The difference between the maximum cycle volume and the minimum cycle volume is the swept volume. In one embodiment, the ratio of maximum cycle volume of the engine working fluid to the volume of the passages within the plurality of heater conduits is between 2.5 and 25. For example, in various embodiments, the plurality of heater conduits together contain between two-fifths and one-twenty-fifth of the volume of the total volume of engine working fluid based on the maximum cycle volume. Stated differently, between two-fifths and one-twenty-fifth of the maximum cycle volume of the engine working fluid is receiving thermal energy from the hot side heat exchanger C108 during operation of the system A10.

In still various embodiments, embodiments of the engine A100 provided herein may provide greater Beale numbers based at least in part on a ratio of surface area of the plurality of heater conduits C110 versus volume of the working fluid within the plurality of heater conduits C110. For instance, the plurality of heater conduits may provide a range of surface area collectively within the plurality of heater conduits C110 relative to the volume of the engine working fluid within the plurality of heater conduits C110. The surface area may generally define the internal area of the heater conduits in direct fluid contact with the engine working fluid. In various embodiments, the ratio of surface area of the plurality of heater conduits to volume of the working fluid within the plurality of heater conduits is between 8 and 40. For example, in various embodiments, the plurality of heater conduits together defines a unit surface area within the conduits (i.e., surface area in fluid contact with the engine working fluid) between 8 and 40 times greater than a unit volume of the plurality of heater conduits.

In various embodiments, the internal surface area of the plurality of heater conduits is defined between a first opening and a second opening of the heater conduits C110. The first opening is in direct fluid communication with the expansion chamber A221, such as depicted at the piston chamber aperture C111 in FIG. 12. The second opening is in direct fluid communication with the walled conduit C1050, such as depicted at the opening C113 in FIG. 12. In one embodiment, the second opening is in direct fluid communication with the walled conduit C1050 including the regenerator body C800 defined therewithin. In another embodiment, the surface area of the plurality of heater conduits C110 defines an internal area of the heater conduits C110 corresponding to portions of the heater conduits C110 receiving thermal energy from the heater body C100. In another embodiment, the surface area of the plurality of heater conduits C110 defines an internal area of the heater conduits C110 extending from a first opening, such as defined at the plurality of piston apertures C111 in FIG. 12, to a first or proximal fin, tab, wall, or other feature of the fin array C1016 of the regenerator body C800 at the walled conduit C1050. In still another embodiment, such as an embodiment providing direct fluid communication of the heater conduits C110 to the chiller conduits A54, the second opening, such as depicted at opening C113 in FIG. 12, is in direct fluid communication with chiller collection chamber A62 or the chiller conduits A54. In various embodiments, the second opening, such as depicted at opening C113 in FIG. 12, is in direct fluid communication with the chiller collection chamber opening A60.

Embodiments of the engine A100 provided herein may provide greater Beale numbers based at least in part on the plurality of chiller conduits A54 collectively defining a desired heat transferability of thermal energy from the engine working fluid within the plurality of chiller conduits A54 to the cold side heat exchanger A42. In various embodiments, the system A10 defines a ratio of maximum cycle volume of the engine working fluid to a collective volume of the plurality of chiller conduits A54. In one embodiment, the ratio of maximum cycle volume of the engine working fluid to the volume of the plurality of chiller conduits A54 is between 10 and 100. For example, in various embodiments, the plurality of chiller conduits A54 together contain between one-tenth and one-hundredth of the volume of the total volume of engine working fluid based on the maximum cycle volume. Stated differently, between one-tenth and one-hundredth of the maximum cycle volume of the engine working fluid is transferring thermal energy to the cold side heat exchanger A42 during operation of the system A10.

In still various embodiments, embodiments of the engine provided herein may provide greater Beale numbers based at least in part on a ratio of surface area of the plurality of chiller conduits A54 versus volume of the working fluid within the plurality of chiller conduits A54. For instance, the plurality of chiller conduits A54 may particularly provide a range of surface area collectively within the plurality of chiller conduits A54 relative to the volume of the engine working fluid within the plurality of chiller conduits A54. In various embodiments, the ratio of surface area of the plurality of chiller conduits A54 to volume of the working fluid within the plurality of chiller conduits A54 is between 7 and 40. For example, in various embodiments, the plurality of chiller conduits A54 together defines a unit surface area within the conduits (i.e., surface area in fluid contact with the engine working fluid) between 7 and 40 times greater than a unit volume of the plurality of chiller conduits A54.

In various embodiments, the surface area of the chiller conduits A54 is defined from the chiller passage opening A58 to the chiller collection chamber opening A60. In one embodiment, the surface area of the chiller conduits A54 is the internal area within the chiller conduits A54 corresponding to the portion of the chiller conduits A54 at least partially surrounded by the chiller working fluid within the chiller working fluid passage A66 in thermal communication with the engine working fluid.

Various embodiments of the system A10 and engine A100 shown and described herein provide desired power outputs, power densities, or efficiencies, or combinations thereof, based on one or more elements, arrangements, flowpaths, conduits, surface areas, volumes, or assemblies, or methods thereof, provided herein. Efficiencies described herein may include $T_{Hot,engine}$ corresponding to temperature input to the engine working fluid at the heater conduits or working fluid pathways C110 from the hot side heat exchanger C108. Still various embodiments include $T_{cold,ambient}$ corresponding to temperature removed from the engine working fluid at the chiller conduits A54 to the cold side heat exchanger A42. In other instances, the temperature input may alternatively correspond to heat or thermal energy input to the engine working fluid, such as from the heating working fluid. Still further, the temperature removed may alternatively correspond to heat or thermal energy output from the engine working fluid, such as to the chiller working fluid. In still various embodiments, the environment is the chiller working fluid into which the engine A100 rejects, exhausts, or otherwise releases heat or thermal energy from the engine working fluid at the chiller conduits A54.

In still yet various embodiments, efficiencies described herein may include $Q_{out}$ corresponding to thermal energy received by the engine working fluid at the heater conduits or working fluid pathways C110 from the hot side heat exchanger C108. Still various embodiments include $Q_{in}$ corresponding to thermal energy received at the chiller working fluid at the chiller working fluid passage A56 at the cold side heat exchanger A42 from the engine working fluid at the chiller conduits A54.

In still another embodiment, $E_{out}$ is the net electrical energy output from the load device C092 that is operatively coupled to the engine A100 via the piston assembly C1010.

In various embodiments, the features, arrangements, surface areas, volumes, or ratios thereof provide the engine A100 to operate at higher efficiencies over known closed cycle engines, or Stirling engines particularly. Various embodiments of the system A10 provided herein may be configured to produce mechanical power output from the piston assembly A1010 at a Carnot efficiency $\eta_{Carnot}$ of up to approximately 80%. In some embodiments, the system A10 provided herein may be configured to produce mechanical power output from the piston assembly A1010 at an efficiency of up to approximately 80% in certain cold environments (e.g., space). In one embodiment, the Carnot efficiency corresponds to the thermal efficiency of the engine A100 receiving thermal energy or heat at the heater conduits C110 and expelling thermal energy or heat from the engine working fluid at the chiller conduits A54. In one embodiment, the Carnot efficiency corresponds at least to the engine A100 including the hot side heat exchanger C108 and the cold side heat exchanger A42, such as depicted at the engine level efficiency (FIG. 1).

Various embodiments of the system A10 provided herein may be configured to produce mechanical power output from the piston assembly A1010 at electrical efficiency of up to approximately 80%. In one embodiment, the electrical efficiency corresponds to the useful work generated by the engine A100 receiving heat or thermal energy from the heating working fluid and releasing heat or thermal energy to the chiller working fluid and converted into electrical energy via the load device C092, such as depicted within area A106 in FIG. 1. In one embodiment, the electrical efficiency corresponds at least to the system A10 including the engine A100, the heater body C100, and the chiller assembly A40, such as depicted at the system level efficiency (FIG. 1).

In one embodiment, the system A10 provides a temperature differential via the heater body C100 and the chiller assembly C40 in which the engine A100 generates mechanical power output between 1 kW and 100 kW relative to the piston assembly A1010. In another embodiment, the system A10 is configured to generate between 10 kW and 100 kW. In yet another embodiment, the system A10 is configured to generate between 25 kW and 100 kW. In yet another embodiment, the system A10 may be configured to produce greater than 100 kW. For example, the system A10 may include a plurality of the engine A100 operably coupled at two or more piston assemblies A1010 and the load device c092 to produce greater than 100 kW. In various embodiments, a plurality of the engine A100 may be operably coupled to produce up to 5 megawatts.

In still various embodiments, the engine A100 further defines a second operational parameter defining a ratio of mechanical power output from the piston assembly A1010 to maximum cycle volume of the working fluid between 0.0005 and 0.0040 kW per cubic centimeter (cc) for a given efficiency. In various embodiments, the ratio of mechanical power output from the piston assembly A1010 to maximum cycle volume of the working fluid is a range of maximum ratio at which the mechanical power output from the piston assembly A1010 to maximum cycle volume of the working fluid is defined. In some embodiments, the engine A100 defines a maximum ratio of mechanical power output from the piston assembly A1010 to maximum cycle volume of the working fluid between 0.0005 and 0.0040 kW generated from the piston assembly A1010 for one cubic centimeter of engine working fluid at an engine efficiency of at least 50%. Stated differently, between 0.0005 and 0.0040 kW is generated from the piston assembly A1010 for one cubic centimeter of engine working fluid at an engine efficiency of at least 50%. In various embodiments, the engine A100 defines a ratio of mechanical power output from the piston assembly A1010 to the maximum cycle volume of the working fluid between 0.0010 and 0.0030 kW/cc at an engine efficiency of at least 50%. In another embodiment, the engine A100 defines a ratio of mechanical power output from the piston assembly A1010 to the maximum cycle volume of the working fluid between 0.0015 and 0.0025 kW/cc at an engine efficiency of at least 50%. In one embodiment, the system A10 defines the ratio of mechanical power output from the piston assembly A1010 to maximum cycle volume of the working fluid between 0.0005 kW/cc and 0.0040 kW/cc at a Carnot efficiency of the engine of up to 80%. In another embodiment, the engine A100 defines the ratio of mechanical power output from the piston assembly A1010 to maximum cycle volume of the working fluid between 0.0005 kW/cc and 0.0040 kW/cc with an efficiency of the engine A100 of up to 60%.

Various embodiments of the system A10 shown and described herein provide a power density by efficiency that may be advantageous over certain power generation or energy conversion systems including engine and heat exchanger systems. In certain embodiments, the system A10 includes a third operational parameter defining a multiplication product of power density ($kW/m^3$) and system level efficiency greater than 51. For example, the power density is power output at the load device c092 over volume of the engine working fluid at the engine A100. In particular embodiments, the system A10 includes the power density over maximum cycle volume of the engine working fluid at the engine A100. In some embodiments, the system A10 includes a power density ($kW/m^3$) by efficiency greater than 100. In still other embodiments, the system A10 includes a power density ($kW/m^3$) by efficiency greater than 255. In various embodiments, the system A10 includes a power density ($kW/m^3$) by efficiency less than 400. In other embodiments, the system A10 includes a power density ($kW/m^3$) by efficiency less than 125. In still various embodiments, the system A10 includes a power density ($kW/m^3$) by efficiency between 51 and 400.

In still various embodiments, the engine A100 includes a fourth operational parameter at which one or more of the efficiencies and ratio of mechanical power output from the piston assembly A1010 to maximum cycle volume of the engine working fluid relative to a temperature differential of the engine working fluid at the expansion chamber A221 and the compression chamber A222. In one embodiment, the fourth operational parameter defines the temperature differential of the engine working fluid at the expansion chamber A221 ant he compression chamber A222 of at least 630 degrees Celsius. In one embodiment, the cold side heat exchanger A42 is configured to reduce the temperature of the engine working fluid at the chiller conduits A54 and/or compression chamber A222 less than 120 degrees Celsius. In another embodiment, the cold side heat exchanger A42 is configured to reduce the temperature of the engine working fluid at the chiller conduits A54 or compression chamber A222 to between approximately −20 degrees Celsius and approximately 120 degrees Celsius on average during steady-state full power operation. In still another embodiment, the cold side heat exchanger A42 is configured to reduce the temperature of the engine working fluid at the chiller conduits A54 or compression chamber A222 to between 20 degrees Celsius and approximately 120 degrees Celsius on average during steady-state full power operation. In yet another embodiment, the hot side heat exchanger C108 is configured to heat the engine working fluid at the heater conduits C110 or expansion chamber A221 to at least 750 degrees Celsius. However, it should be appreciated that an upper limit of the heat provided to the hot side heat exchanger C108 or the expansion chamber A221 is based at least on materials limits, such as one or materials listed or described herein, or another suitable material for constructing the engine and/or system. Material limits may include, but are not limited to, a melting point, tensile stress, yield stress, deformation or deflection limits, or desired life or durability of the engine.

It should be appreciated that performances, power outputs, efficiencies, or temperature differentials at the system A10, the engine A100, or both, provided herein may be based on a "Sea Level Static" or "Standard Day" input air condition such as defined by the United States National Aeronautics and Space Administration, unless otherwise specified. For example, unless otherwise specified, conditions provided to the heater body, the chiller assembly, or both, or any subsystems, components, etc. therein, or any other portions of the system A10 receiving an input fluid, such as air, are based on Standard Day conditions.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers A221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers A221, A222, the temperature is relative to an average temperature over a phase of operation of the engine. As another example, where a substantially uniform thermal energy unit is provided or removed to/from the plurality of chambers A221, A222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process.

It should be appreciated that ratios, ranges, minimums, maximums, or limits generally, or combinations thereof, may provide structure with benefits not previously known in the art. As such, values below certain minimums described herein, or values above certain maximums described herein, may alter the function and/or structure of one or more components, features, or elements described herein. For example, ratios of volumes, surface area to volume, power output to volume, etc. below the ranges described herein may be insufficient for desired thermal energy transfer, such as to undesirably limit power output, efficiency, or Beale number. As another example, limits greater than those described herein may undesirably increase the size, dimensions, weight, or overall packaging of the system or engine, such as to undesirably limit the applications, apparatuses, vehicles, usability, utility, etc. in which the system or engine may be applied or operated. Still further, or alternatively, undesired increases in overall packaging may undesirably decrease efficiency of an overall system, application, apparatus, vehicle, etc. into which the engine may be installed, utilized, or otherwise operated. For example, although an engine may be constructed defining a similar or greater efficiency as described herein, such an engine may be of undesirable size, dimension, weight, or overall packaging such as to reduce an efficiency of the system into which the engine is installed. As such, obviation or transgression of one or more limits described herein, such as one or limits relative to features such as, but not limited to, heater conduits, chiller conduits A54, chamber volumes, walled conduit volumes, or operational temperatures, or combinations thereof, may undesirably alter such structures such as to change the function of the system or engine.

Systems and Methods of Control

Control systems and methods of controlling various systems disclosed herein will now be provided. In one aspect, a control system for a power generation system is provided. The power generation system includes one or more closed cycle engines, one or more electric machines operatively coupled thereto, and one or more energy storage devices in communication with the electric machines. The control system can control the closed cycle engine and its associated balance of plant to generate a temperature differential. Thus, the engine defines a hot side and a cold side. The temperature differential causes free piston assemblies to move within their respective piston chambers. The movement of the pistons causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system. The controllable devices execute control actions in accordance with the control commands. Accordingly, the desired output of the system can be achieved. Furthermore, the control system can monitor and anticipate load changes on the electric machines and can control the closed cycle engine to anticipate such load changes to better maintain steady state operation despite dynamic and sometimes significant electrical load changes on the electric machines.

Figure 17:
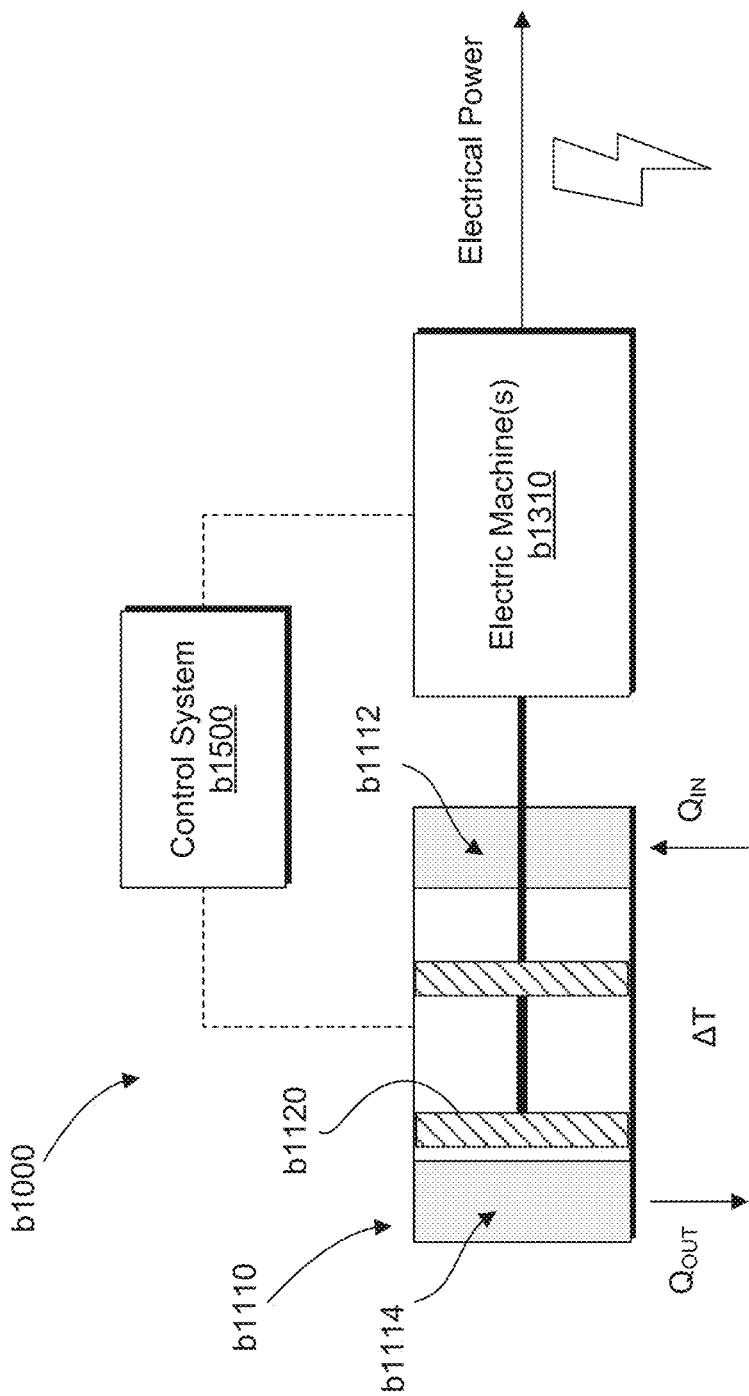
FIG. 17 provides a schematic block diagram of a power generation system according to an aspect of the present disclosure.

FIG. 17 provides a schematic block diagram of a power generation system b1000 according to an aspect of the present disclosure. Generally, the power generation system b1000 is configured to generate electrical power. The generated electrical power can be used in any suitable manner. For instance, the generated electrical power can be used to charge a battery system, fed to a power grid, or used in some other suitable manner.

The power generation system b1000 includes a closed cycle engine b1110, e.g., such as any one of the closed cycle engines described herein. The closed cycle engine b1110 defines a hot side b1112 and a cold side b1114. Accordingly, the closed cycle engine b1110 defines a temperature differential ΔT. Generally, during operation, the hot side b1112 is hotter than or at a higher temperature than the cold side b1114. In some embodiments, the hot side b1112 can be hotter than an ambient temperature. For instance, a heat source can heat or impart thermal energy to the hot side b1112, as denoted by $Q_{IN}$ in FIG. 17. In yet other embodiments, the hot side b1112 can be an ambient temperature and the cold side b1114 can be colder than the ambient temperature. For instance, heat or thermal energy can be removed from the cold side b1114, as denoted by $Q_{OUT}$ in FIG. 17. In some embodiments, the hot side b1112 can be actively heated and the cold side b1114 can be actively cooled or heat can be removed or extracted therefrom. The temperature differential ΔT between the hot side b1112 and the cold side b1114 causes one or more piston assemblies b1120 to move within their respective piston bodies b1116, e.g., between the hot side b1112 and the cold side b1114 of the engine. As the one or more piston assemblies b1120 are moved within their respective piston bodies b1116, one or more electric machines b1310 operatively coupled thereto generate electrical power.

As further depicted in FIG. 17, the power generation system b1000 includes a control system b1500 for controlling various aspects of the power generation system b1000, including controlling the closed cycle engine b1110 and the one or more electric machines b1310 operatively coupled thereto. The control system b1500 can include one or more control devices, such as sensors, controllers, processors, controllable devices b1534, etc. that can monitor and control various aspects of the power generation system b1000. An example manner in which the control system b1500 controls the power generation system b1000 will be described herein.

Figure 18:
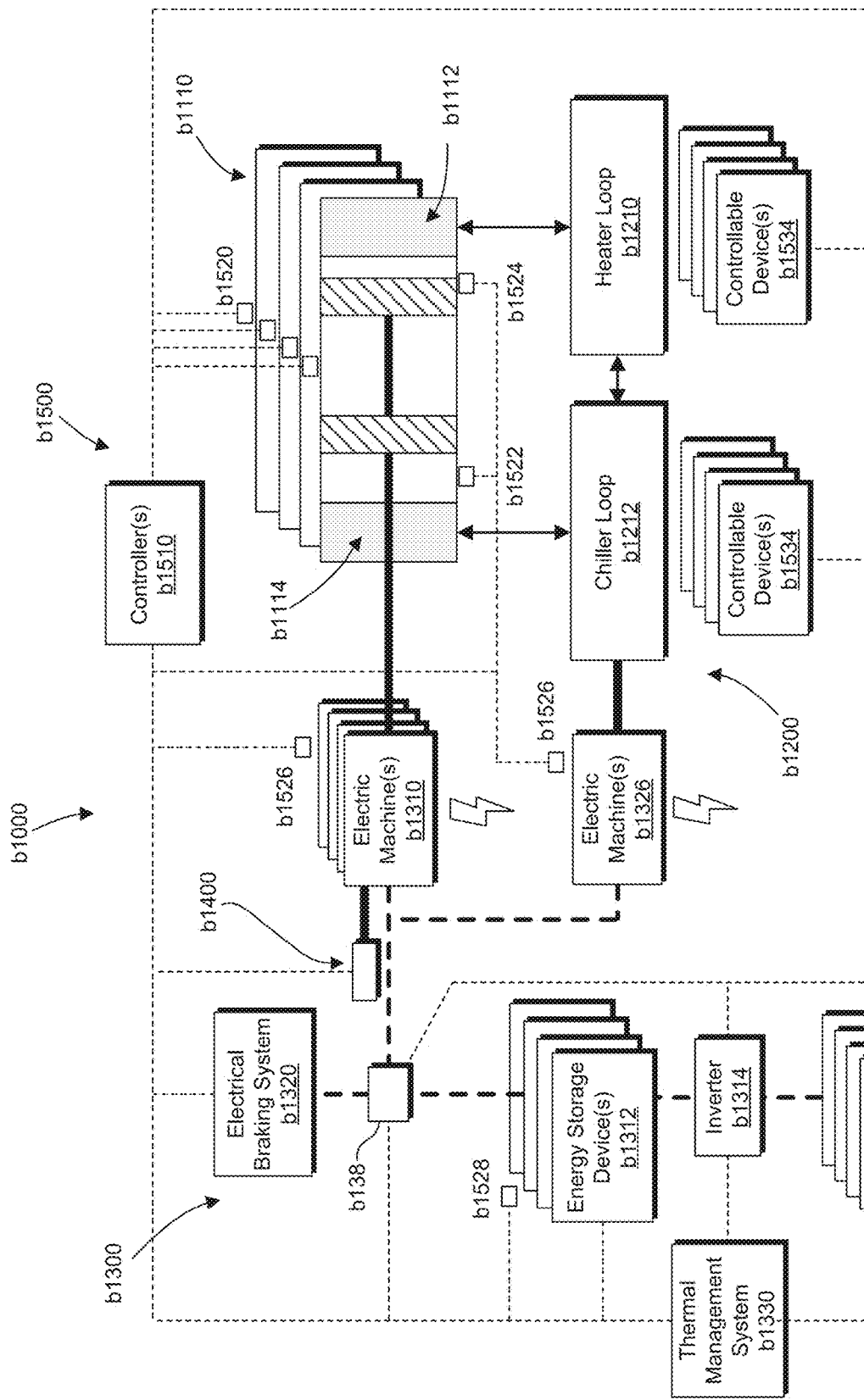
FIG. 18 provides a detailed schematic view of the power generation system of FIG. 17.

FIG. 18 provides a detailed schematic view of the power generation system b1000 of FIG. 17. As shown, the power generation system b1000 includes a closed cycle engine b1110, a balance of plant b1200 for creating or generating the temperature differential ΔT between the hot side b1112 and the cold side b1114 of the engine b1110, and an electrical system b1300 for generating electrical power utilizing the useful work produced by the closed cycle engine b1110. The closed cycle engine b1110 and its associated balance of plant b1200 are configured to produce useful work such that one or more electric machines b1310 of the electrical system b1300 can generate electrical power. As noted above, the generated electrical power can be utilized in any suitable way. For instance, for this embodiment, the generated electrical power can be used to charge one or more energy storage devices b1312 in communication with the one or more electric machines b1310.

The closed cycle engine b1110 can be any of the closed cycle engines b1110 described herein. For instance, in some embodiments, the closed cycle engine b1110 is a Stirling engine, such as e.g., any of the Stirling engines described herein. The closed cycle engine b1110 can include an engine block that has one or more piston bodies b1116. For instance, for the depicted embodiment of FIG. 18, the engine block includes four (4) piston bodies b1116. Each piston body b1116 can receive a piston assembly b1120 therein. The piston assemblies b1120 are each movable within their respective piston bodies b1116, e.g., between the hot side b1112 and the cold side b1114 of the engine. When the piston assemblies b1120 move or travel within their respective piston bodies b1116, the closed cycle engine b1110 produces useful work. Each piston assembly b1120 includes a pair of opposing pistons b1122, b1124 operatively coupled by a connection member b1126, e.g., a shaft.

The balance of plant b1200 shown schematically in FIG. 18 can be any of the balance of plant systems described herein. For this embodiment, the balance of plant b1200 includes a heater loop b1210 for imparting thermal energy or heat to the hot side b1112 of the closed cycle engine b1110 and a chiller loop b1212 for removing or extracted thermal energy or heat from the cold side b1114. Accordingly, the heater loop b1210 and the chiller loop b1212 can generate the temperature differential ΔT. The temperature differential ΔT between the hot side b1112 and the cold side b1114 causes, at least in part, the piston assemblies b1120 to move or travel within their respective piston bodies b1116. Furthermore, the heater loop b1210 and chiller loop b1212 can be in fluid communication as shown in FIG. 18, e.g., for heat recovery purposes. The heater loop b1210 and the chiller loop b1212 can each have one or more controllable devices b1534 associated therewith.

The one or more electric machines b1310 are operatively coupled with the one or more piston assemblies b1120. The one or more electric machines b1310 can be operatively coupled with the one or more piston assemblies b1120 in any suitable manner, such as described herein. In some embodiments, for example, one or more electric machines b1310 can be operatively coupled with each piston assembly b1120. In other embodiments, each piston assembly b1120 need not have an electric machine b1310 operatively coupled thereto. The one or more electric machines b1310 can be operatively coupled with the one or more piston assemblies b1120 in any suitable manner. As one example, a piston body b1116 can serve as the stator b1324 and its associated piston assembly b1120 can serve as the dynamic member b1322 or mover of an electric machine b1310. Particularly, stator windings can be disposed along the piston body b1116 between the hot side b1112 and the cold side b1114 and the piston assembly b1120 can have one or more magnetic devices or permanent magnets connected thereto, e.g., connected to the connection member b1126 and/or to the pistons b1122, b1124 themselves. As the piston assemblies b1120 are moved between the hot side b1112 and the cold side b1114 of the closed cycle engine b1110, the stator windings of the piston body b1116 and the permanent magnets of the piston assembly b1120 are in magnetic communication along at least a portion of travel of the piston assembly b1120. Consequently, the permanent magnets excite the stator windings as the magnets travel thereby. In this way, the one or more electric machines b1310 are operable to generate electrical power when the one or more piston assemblies b1120 are moved between the hot side b1112 and the cold side b1114. Thus, in such instances, the electric machines b1310 operate in an electric generator state. That is, the electric machines b1310 function as generators at least in some instances of operation. Although the described above as having a linear configuration, the one or more electric machines b1310 can be any suitable type of electric machines b1310, including for example, rotary electric machines b1310.

As further depicted in FIG. 18, one or more electric machines b1326 can be operatively coupled with one or more devices of the chiller loop b1212. For instance, one or more electric machines b1326 can be operatively coupled with an expansion device or turbine of the chiller loop b1212. The one or more electric machines b1326 operatively coupled with the chiller loop b1212 can generate electrical power that can be used in some useful way and/or can be used to provide electrical power to drive some component of the chiller loop b1212, such as e.g., an expansion device or turbine of the chiller loop b1212.

For this embodiment, the electrical system b1300 of the power generation system b1000 includes one or more energy storage devices b1312 in communication with the one or more electric machines b1310, b1326. For instance, the one or more energy storage devices b1312 can be in electrical communication with the one or more electric machines b1310, e.g., by one or more suitable wired or wireless communication links. Particularly, the one or more energy storage devices b1312 can be in communication with the one or more electric machines b1310 operatively coupled with the closed cycle engine b1110 and/or the one or more electric machines b1326 operatively coupled with the chiller loop b1212. The one or more energy storage devices b1312 can include any suitable type or combination of energy storage devices b1312. For instance, in some embodiments, the one or more energy storage devices b1312 include one or more batteries. For example, as depicted in FIG. 18, the one or more energy storage devices b1312 are configured as a battery system. In some other embodiments, the one or more energy storage devices b1312 include one or more super capacitors. The one or more energy storage devices b1312 can include other suitable energy storage devices b1312 as well.

The one or more energy storage devices b1312 in communication with the one or more electric machines b1310 are operable to receive electrical power therefrom. That is, the electrical power generated by the one or more electric machines b1310 can be provided to the one or more energy storage devices b1312. Further, in some instances during operation, the one or more energy storage devices b1312 in communication with the one or more electric machines b1310 are operable to provide electrical power thereto. For example, during startup or initialization of the closed cycle engine b1110, the one or more energy storage devices b1312 can provide electrical power to the one or more electric machines b1310. The provided electrical power can cause the one or more electric machines b1310 to drive the one or more piston assemblies b1120 within their respective piston bodies b1116, e.g., between the hot side b1112 and cold side b1114. Accordingly, in some instances, the one or more electric machines b1310 are operable in an electric motor state. Thus, for the depicted embodiment of FIG. 18, the one or more electric machines b1310 operatively coupled with the closed cycle engine b1110 are operable in an electric motor state and in an electric generator state.

As further shown in FIG. 18, the electrical system b1300 can include an inverter b1314 for converting direct electrical current to alternating electrical current and one or more electrical loads b1316. The one or more electrical loads b1316 can be in communication with the one or more energy storage devices b1312 in any suitable manner, such as e.g., any suitable wired or wireless communication link. The one or more electrical loads are operable to receive electrical power from the one or more energy storage devices b1312. In some other embodiments, the one or more electric machines b1310 operatively coupled with the closed cycle engine b1110 and/or the one or more electric machines b1310 operatively coupled with some component of the chiller loop b1212 can provide direct electrical power to the one or more electrical loads b1316. The one or more electrical loads b1316 can include any suitable electrical load, such as e.g., a power grid, a fuel cell, an air conditioning unit of a vehicle, etc. A thermal management system b1330 is communicatively coupled with the various electrical components of the electrical system b1300 and is configured to management the thermal loads thereon, e.g., to maintain satisfactory operating temperatures thereof.

The power generation system b1000 also includes a control system b1500 for controlling various aspects thereof, as noted above. Particularly, the control system b1500 can initialize and control the power generation system b1000 during operation in accordance with various control schemes. As one example, the power generation system b1000 can be controlled in such a way that the efficiency of the overall power generation system b1000 is optimized. As another example, the power generation system b1000 can be controlled in such a way that the cost of operating the power generation system b1000 is optimized. For instance, the power generation system b1000 can be controlled in such a way that the cost of operating the system is minimized. In yet other embodiments, the power generation system b1000 can be controlled in such a way that a cost to power generation ratio is minimized. As yet another example, the power generation system b1000 can be controlled in such a way that a set amount of electrical power is generated by the electric machines b1310 of the system. Other control schemes are also possible.

Figure 19:
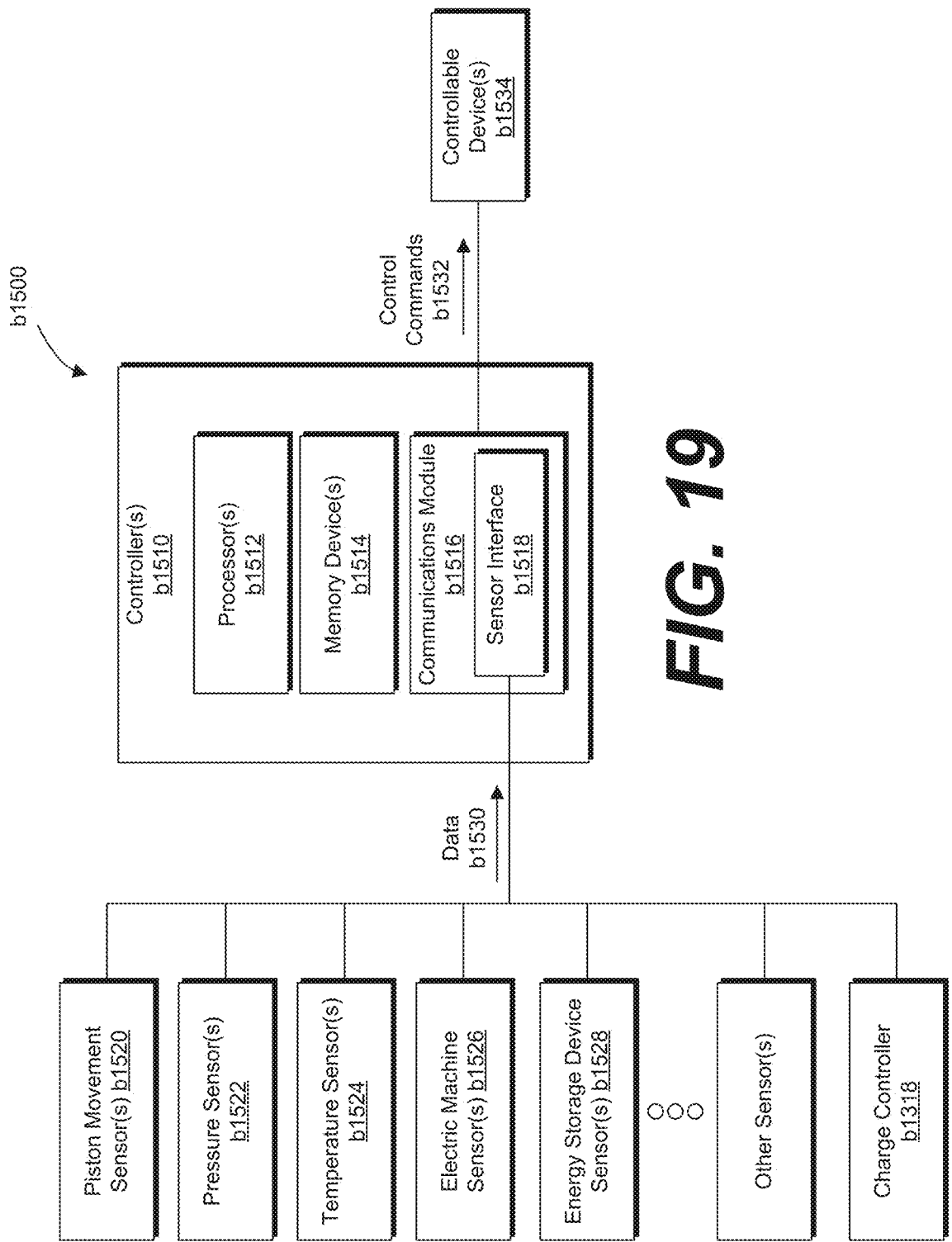
FIG. 19 provides a block diagram of a control system of the power generation system of FIGS. 17 and 18.

With reference now to FIGS. 18 and 19, FIG. 19 provides a block diagram depicting the control system b1500 of the power generation system b1000 of FIGS. 17 and 18. As noted above, the control system b1500 can include one or more control devices, such as sensors, controllers b1510, processors, controllable devices b1534, etc. that can monitor and control various aspects of the power generation system b1000. For instance, the control system b1500 can monitor one or more operating parameters of the closed cycle engine b1110, the one or more electric machines b1310, and/or the one or more energy storage devices b1312 using one or more sensors. For instance, the control system b1500 can monitor one or more piston movement characteristics using one or more piston movement sensors b1520. Example piston movement characteristics can include piston position, speed, amplitude, frequency, and/or phase. The piston movement sensors b1520 can be position encoders, for example. The control system b1500 can also monitor the pressure within the closed cycle engine b1110 at various positions or stations (e.g., within the piston bodies b1116 or along fluid pathways fluidly connecting the piston bodies b1116) using one or more pressure sensors b1522. Further, the control system b1500 can monitor the temperature within the closed cycle engine b1110 at various positions or stations (e.g., within the piston bodies b1116 or along fluid pathways fluidly connecting the piston bodies b1116) using one or more temperature sensors b1524.

In addition, the control system b1500 can monitor various operating parameters associated with components of the electrical system b1300. For instance, the control system b1500 can monitor one or more operating parameters associated with the one or more electric machines b1310 using one or more electric machine sensors b1526. For example, the control system b1500 can monitor the electric current generated or passing through the electric machines b1310 using one or more electric machine sensors b1526, including the amplitude, phase, and/or frequency of the electric current. As another example, the control system b1500 can monitor the voltage at the electric machines b1310 using one or more electric machine sensors b1526, including the amplitude, phase, and/or frequency of the voltage. The control system b1500 can monitor other operating parameters associated with the one or more electric machines b1310 using one or more electric machine sensors b1526, such as e.g., the magnetic field at the electric machines b1310.

Further, the control system b1500 can monitor various operating parameters associated with the one or more energy storage devices b1312 in communication with the one or more electric machines b1310 using one or more energy storage device sensors b1528. In this way, the operating state of the one or more energy storage devices b1312 can be determined. For example, the control system b1500 can monitor the load state of the one or more energy storage devices b1312 using the one or more energy storage device sensors b1528. In some embodiments, the load state of the one or more energy storage devices b1312 is descriptive of at least one of a state of charge and a charge acceptance rate of the one or more energy storage devices b1312 in communication with the one or more electric machines b1310. In some embodiments, the load state of the one or more energy storage devices b1312 is descriptive of both the state of charge and the charge acceptance rate of the one or more energy storage devices b1312. In monitoring the load state of the energy storage devices b1312, the control system b1500 can advantageously control the closed cycle engine b1110 and the one or more electric machines b1310 to meet the charging needs of the one or more energy storage devices b1312.

The state of charge is indicative of the available capacity of the one or more energy storage devices b1312. The state of charge can be expressed as a percentage of the rated capacity of the one or more energy storage devices b1312, e.g., 0-100% with 0% being empty and 100% being full or no available capacity. The state of charge of the one or more energy storage devices b1312 can be determined in any suitable manner, e.g., by a voltage method, coulomb counting method, Kalman filter method, etc. The charge acceptance rate of the one or more energy storage devices b1312 is indicative of the ability of the energy storage devices b1312 to accept and store energy under given conditions, such as e.g., temperature, state of charge, charging rate, charging method, and/or health of the energy storage devices b1312. The charge acceptance rate can be determined in any suitable manner.

The control system b1500 includes one or more controllers b1510. For instance, the control system b1500 can include one or more controllers b1510 that function as the main or primary control devices of the power generation system b1000. The control system b1500 can include other controllers b1510 as well. As shown best in FIG. 19, the controllers b1510 can include one or more processor(s) b1512 and associated memory device(s) b1514 configured to perform a variety of computer-implemented functions and/or instructions (e.g., performing the methods, steps, calculations and the like and storing relevant data as disclosed herein). The instructions, when executed by the one or more processors, can cause the one or more processors to perform operations, including providing control commands b1532 to various controllable devices b1534 of the power generation system b1000.

Additionally, the controllers b1510 can also include a communications module b1516 to facilitate communications between the controllers b1510 and various components of the power generation system b1000. Further, the communications module b1516 can include a sensor interface b1518 (e.g., one or more analog-to-digital converters) to permit signals transmitted from one or more sensors to be converted into signals that can be understood and processed by the one or more processors. It should be appreciated that the sensors can be communicatively coupled to the communications module b1516 using any suitable means. For example, the sensors can be coupled to the sensor interface b1518 via a wired connection. However, in other embodiments, the sensors may be coupled to the sensor interface b1518 via a wireless connection, such as by using any suitable wireless communications protocol. As such, the processor(s) b1512 can be configured to receive one or more signals from the sensors.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to compute advanced control algorithms. Additionally, the memory device(s) b1514 can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) b1514 can generally be configured to store suitable computer-readable instructions that, when implemented by the processor(s) b1512, configure the controllers b1510 to perform the various functions described herein.

The control system b1500 also includes one or more controllable devices b1534. The controllable devices b1534 are communicatively coupled with the one or more controllers b1510, e.g., as shown in FIGS. 18 and 19. The controllable devices b1534 of the power generation system b1000 include any device communicatively coupled with the one or more controllers b1510 that, when commanded by the one or more controllers b1510, can cause a change in output of the power generation system b1000. As one example, the one or more controllers b1510 can control the one or more controllable devices b1534 to cause a change in the temperature differential ΔT between the hot side b1112 and the cold side b1114 of the closed cycle engine b1110. By changing the temperature differential ΔT between the hot side b1112 and the cold side b1114, the work output of the closed cycle engine b1110 can be changed, which can ultimately change the amount of electrical power generated by the one or more electric machines b1310 operatively coupled with the one or more piston assemblies b1120 of the closed cycle engine b1110. To cause a change in the temperature differential ΔT between the hot side b1112 and the cold side b1114, one or more controllers b1510 can command the one or more controllable devices b1534 to apply more or less heat to the hot side b1112 of the closed cycle engine b1110, remove more or less heat from the cold side b1114 of the closed cycle engine b1110, or some combination thereof. As yet another example, the one or more controllers b1510 can control the one or more control devices to cause the load on the one or more electric machines b1310 to change, which causes a change in the amount of electrical power generated by the one or more electric machines b1310.

One example controllable device b1534 includes a charge controller b1318 in communication with the one or more electric machines b1310 and the one or more energy storage devices b1312, e.g., as shown in FIG. 18. The charge controller b1318 are operatively configured to control or regulate the electrical power flowing between the one or more electric machines b1310 and the one or more energy storage devices b1312. The charge controller b1318 can allow all, some, or none of the electrical power generated by the one or more electric machines b1310 to flow to the one or more energy storage devices b1312. For instance, the charge controller b1318 can some of the electrical power to an electrical braking system b1320. The electrical braking system b1320 can include one or more resistor banks for dissipating the electrical power. In this way, the charge controller b1318 can control the flow of electrical power to the one or more energy storage devices b1312, e.g., to prevent overcharging of the one or more energy storage devices b1312.

Another example controllable device b1534 includes a mechanical braking system b1400 in communication with the one or more electric machines b1310, e.g., as shown in FIG. 18. The mechanical braking system b1400 is operatively configured to mechanically apply a counter torque or load on the one or more electric machines b1310 to change the electrical power output of the one or more electric machines b1310 and/or the movement of the piston assemblies b1120. For instance, the one or more controllers b1510 can command the mechanical braking system b1400 to apply a load on the one or more electric machines b1310 to synchronize one or more of the amplitude, phase, and frequency of the electric machine b1310 with one or more of the amplitude, phase, and frequency of the piston assemblies b1120 moving within their respective piston bodies b1116.

Figure 37:
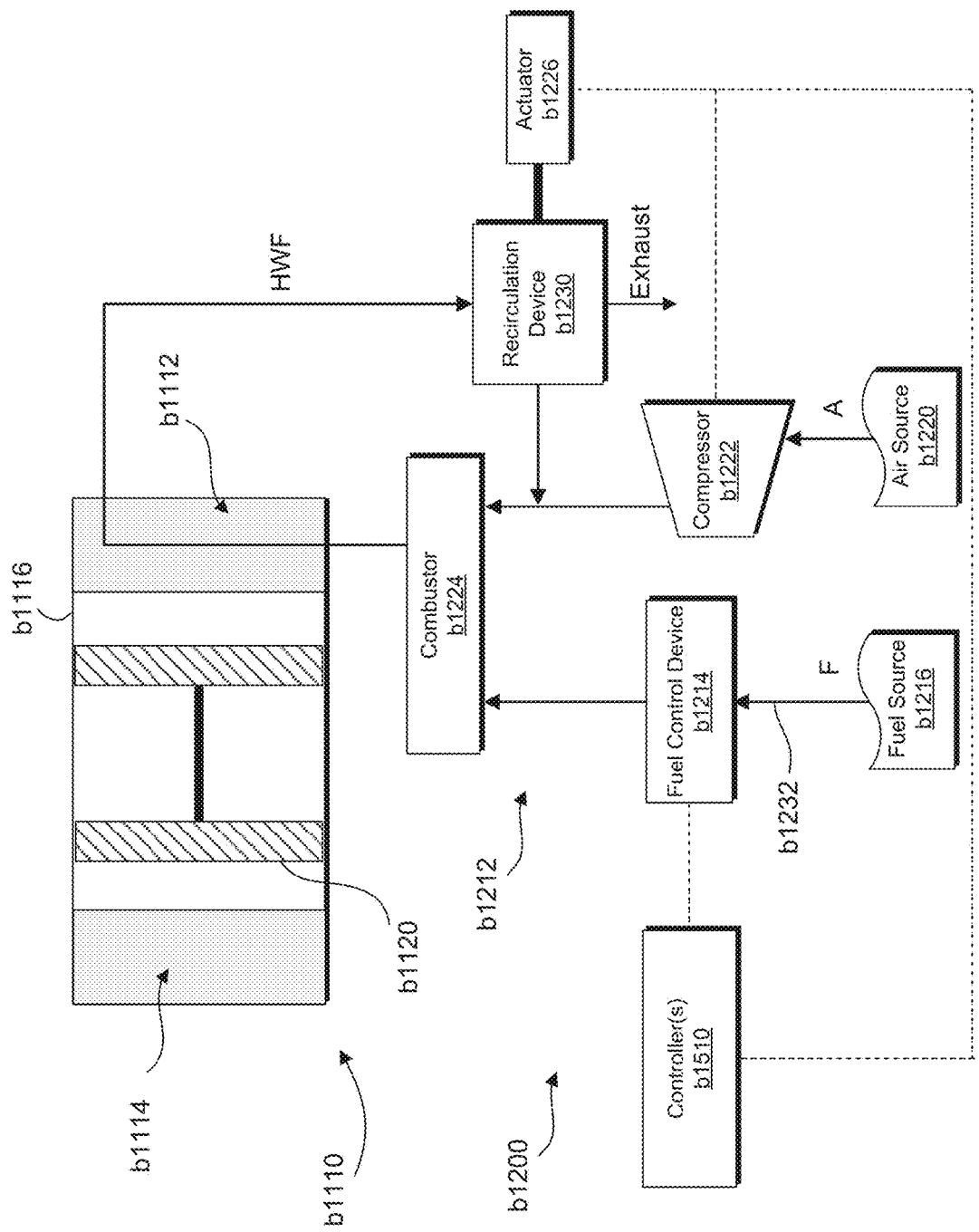
FIG. 37 provides a schematic view of an example heater loop of the balance of plant of the power generation system of FIG. 17 and FIG. 18.

Another example controllable device b1534 can be any of the controllable devices b1534 associated with the heater loop b1210. For instance, one controllable device can include a fuel control device b1214 positioned along an intake line b1232 of the heater loop b1210, e.g., as shown in FIG. 37. The one or more controllers b1510 can command the fuel control device b1214 to allow a desired flow rate of fuel to flow to a combustor b1224 positioned along the heater loop b1210 (e.g., as described herein). Changing the amount of fuel provided to the combustor b1224 can change the heat input to the hot side b1112 of the closed cycle engine b1110, which consequently changes the temperature differential $\Delta T$ and thus the work output of the closed cycle engine b1110. Yet another example controllable device b1534 includes a compressor b1222 of the heater loop b1210. The compressor b1222 is operatively configured to compress or pressurize air flowing from an air source b1220 to the combustor b1224. The one or more controllers b1510 can control the compressor speed, e.g., by one or more control commands b1532, and thus can control the air/fuel mixture entering or at the combustor b1224. By changing the air/fuel mixture entering the combustor b1224, the heat input to the hot side b1112 of the closed cycle engine b1110 can be changed. As noted above, changing the heat input to the hot side b1112 can change the temperature differential $\Delta T$ between the hot side b1112 and the cold side b1114, which ultimately changes the work output of the closed cycle engine b1110.

Another example controllable device b1534 can be any of the controllable devices b1534 associated with the chiller loop b1212. For instance, the one or more controllable devices b1534 can include a compressor and/or pump positioned along the chiller loop b1212. The one or more controllers b1510 can control the speed of the compressor and/or pump and thus the amount of heat removed or extracted from the cold side b1114 of the closed cycle engine b1110. By removing less heat from the cold side b1114 of the engine, the temperature differential $\Delta T$ between the hot and cold side b1114 of the engine is changed, and consequently, the work output of the engine is also changed. Further, a braking system or the like can be used to change the counter torque or load on the one or more electric machines b1310 operatively coupled with one or more components of the chiller loop b1212, such as e.g., an expansion device.

To summarize, as shown best in FIG. 19, the one or more controllers b1510 can receive, from the one or more sensors, data b1530 indicative of one or more operating parameters associated with at least one of the closed cycle engine b1110 and the one or more electric machines b1310. For instance, data b1530 can be received from the piston movement sensors b1520, the pressure sensors b1522, the temperature sensors b1524, the electric machine sensors b1526, etc. The data b1530 can be indicative of operating parameters associated with one or both of the closed cycle engine b1110 and the electric machines b1310. For instance, the data b1530 can be indicative of one or more piston movement characteristics, the pressure within the closed cycle engine b1110 at various positions or stations, the temperature within the closed cycle engine b1110 at various positions or stations, the electric current generated or passing through the electric machines b1310, the voltage at the electric machines b1310 using one or more electric machine sensors b1526, the magnetic field at the electric machines b1310, etc. Additionally, in some embodiments, the one or more controllers b1510 can receive, from the one or more sensors, data b1530 indicative of one or more operating parameters associated with the one or more energy storage devices b1312, such as e.g., the load state of the devices.

Based on the received data b1530, the one or more controllers b1510 can control the power generation system b1000 in accordance with various control schemes. During normal operation, for example, the control system b1500 can monitor various operating parameters and can determine control commands b1532 to drive the operating parameters to an operating setpoint or target value. The control commands b1532 can then be provided to controllable device b1534(s). The controllable device b1534(s) can then perform control actions to execute the control commands b1532. When the controllable devices b1534 execute the control commands b1532, an output of the power generation is changed. For example, in performing the control action, the controllable device b1534 can cause a change to the amount of work done on the piston by the working fluid within the piston body b1116 and/or the amount of work done by the piston on the working fluid within the piston body b1116 (e.g., depending on whether the working fluid is expanding or contracting). By changing the work done by or on the piston, the piston speed of the piston assembly b1120 is changed, which changes the electrical power output of the electric machines b1310. Accordingly, the output of the power generation system b1000 is changed.

In addition, in the event the one or more of the piston assemblies b1120 are out of sync with their associated electric machines b1310 with respect to amplitude, phase, and/or frequency during charging of the energy storage devices b1312, the one or more controllers b1510 can provide a control command to one or more of the controllable devices b1534 to cause an adjustment to at least one of the electric machine b1310 and its associated piston assembly b1120 such that the electric machine b1310 and its associated piston assembly b1120 are synchronized in amplitude, phase, and frequency. Further, the control system b1500 can monitor for and prevent failure modes. In addition, as will be explained below, data b1530 can be received to initialize the power generation system b1000.

Power Generation System Modes of Operation

Figure 20:
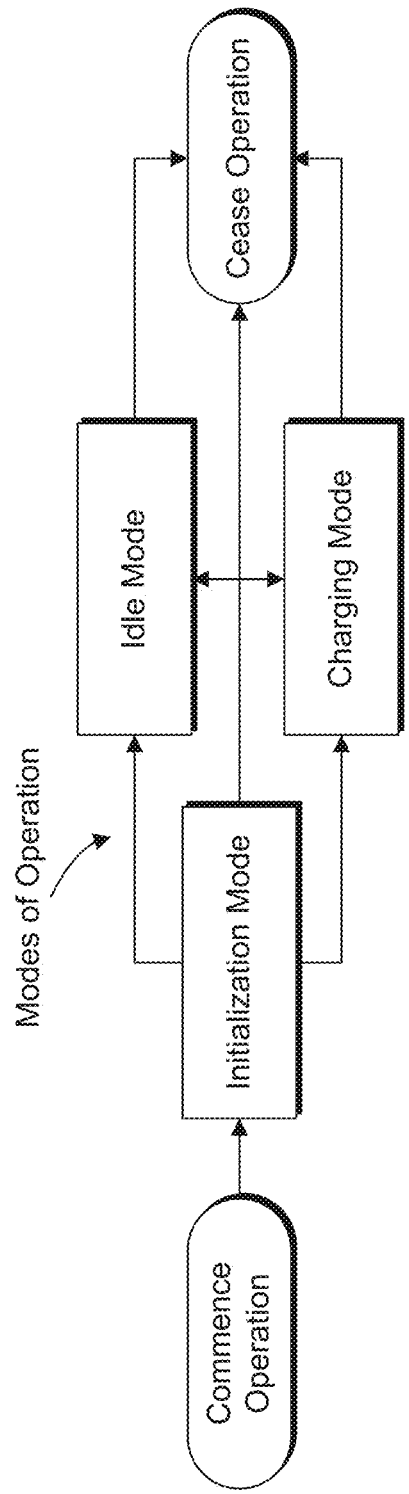
FIG. 20 provides a block diagram depicting various modes of operation of the power generation system of FIG. 17 and FIG. 18.

An example manner in which the power generation system b1000 can be operated will now be provided. FIG. 20 provides a block diagram depicting various modes of operation of the power generation system b1000 of FIGS. 17 and 18. As shown in FIG. 20, to commence operation, the power generation system b1000 can be operated in an initialization mode in which the closed cycle engine b1110 and its associated balance of plant b1200 is started up, e.g., from a non-operational state. Once the system is initialized, the power generation system b1000 can be operated in a normal mode, including an idle mode or a charging mode. In the idle mode, the piston assemblies b1120 move within their respective piston bodies b1116 between the hot side b1112 and the cold side b1114 under their own thermal power (e.g., without need for the electric machines b1310 to motor the piston assemblies b1120) and without or with a negligible load applied to the one or more electric machines b1310. As shown in FIG. 20, the power generation system b1000 can transition from the initialization mode to the idle mode. In the charging mode, the piston assemblies b1120 are moved within their respective piston bodies b1116 and a load is applied to the one or more electric machines b1310 operatively coupled with the piston assemblies b1120 of the closed cycle engine b1110, wherein the applied load is more than a negligible load. For instance, the load can be the one or more energy storage devices b1312. In the normal mode, the power generation system b1000 can transition between the idle mode and the charging mode. As one example, the power generation system b1000 can transition from the idle mode to the charging mode automatically based at least in part on a load state of the one or more energy storage devices b1312 or some other trigger criteria. Additionally or alternatively, the power generation system b1000 can be manually transitioned between operating modes, e.g., by a user input. When operation is no longer desired and/or required, operation of the power generation system b1000 can be ceased. To cease operation, as one example, the one or more controllers b1510 can cause the heat source to cease applying heat to the hot side b1112 of the closed cycle engine b1110 and/or cause one or more components to cease removing heat from or cooling the cold side b1114 of the engine. Eventually, the pistons b1122, b1124 will cease moving within their respective piston bodies b1116.

Power Generation System Initialization

Figure 21:
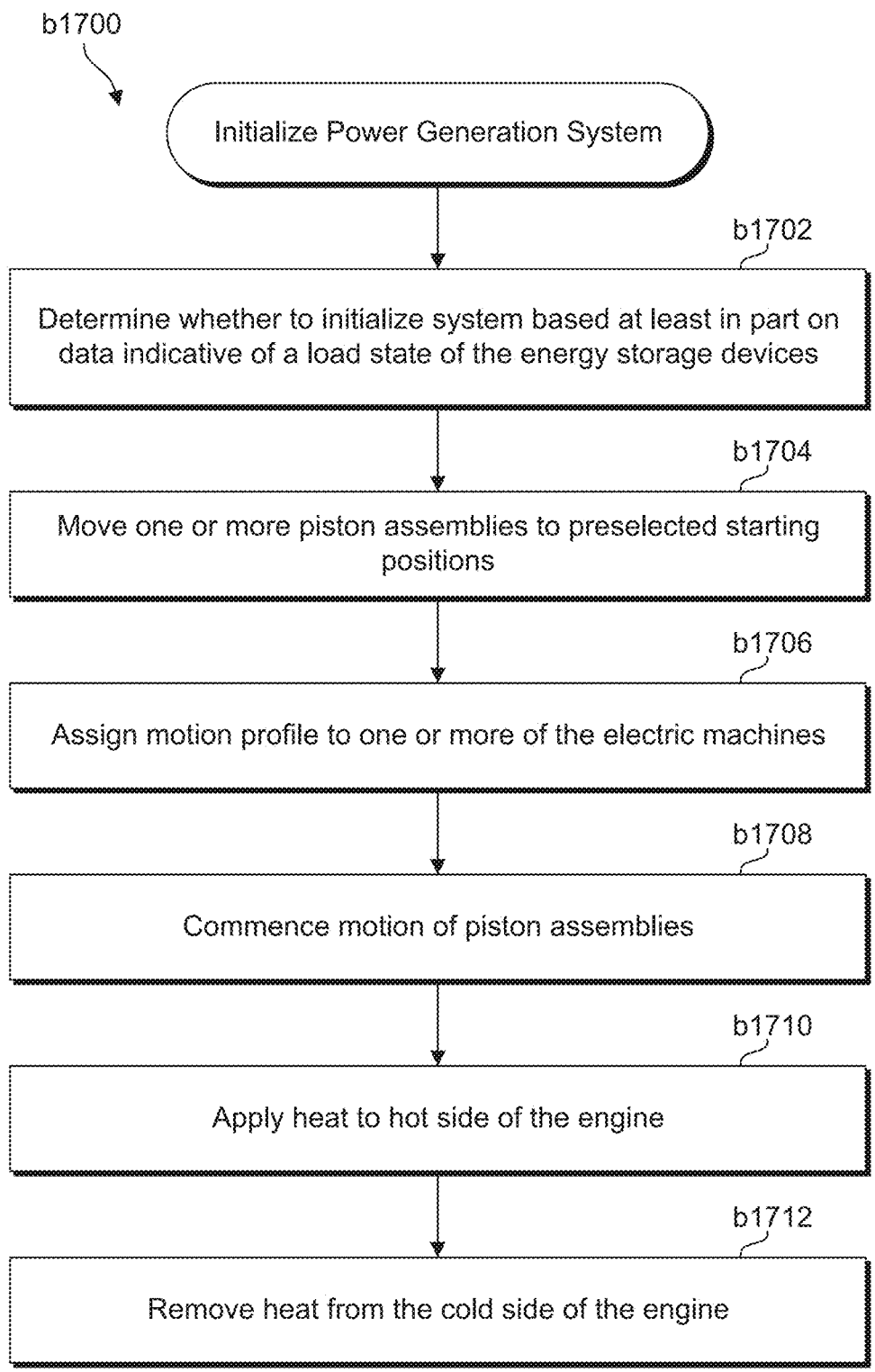
FIG. 21 provides a flow diagram depicting an example method of initializing the power generation system of FIG. 17 and FIG. 18.

The power generation system b1000 can be initialized in the following example manner. FIG. 21 provides a flow diagram depicting an example method (b1700) of initializing the power generation system b1000 of FIGS. 17 and 18. Some or all of the method (b1700) can be implemented by the control system b1500 described herein. In addition, it will be appreciated that the method (b1700) can be modified, adapted, expanded, rearranged and/or omitted in various ways without deviating from the scope of the present subject matter.

At (b1702), the method (b1700) includes determining whether to initialize the power generation based at least in part on received data b1530 indicative of a load state of the one or more energy storage devices b1312 in communication with the one or more electric machines b1310. As one example, the one or more controllers b1510 can receive data b1530 indicative of a load state of the one or more energy storage devices b1312. For instance, the data b1530 can be received from the one or more energy storage device sensors b1528 communicatively coupled with the one or more controllers b1510, e.g., as shown in FIGS. 18 and 19. In some embodiments, the load state is indicative of at least one of a state of charge and a charge acceptance rate of the one or more energy storage devices b1312. In some other embodiments, the load state is indicative of both the state of charge and the charge acceptance rate of the one or more energy storage devices b1312.

After receiving the data b1530 indicative of at least one of the state of charge and the charge acceptance rate of the one or more energy storage devices b1312, the one or more controllers b1510 can determine the load state of the one or more energy storage devices b1312. In some embodiments, the received sensor data b1530 includes the actual state of charge percentage and charge acceptance rate, and thus, the one or more controllers b1510 need not determine or calculate the load state of the energy storage devices b1312.

The one or more controllers b1510 can determine whether to initialize the power generation system b1000 based at least in part on the received data b1530 indicative of the load state of the one or more energy storage devices b1312. For instance, in determining whether to initialize the power generation system b1000 based at least in part on the received data b1530 indicative of the load state, the one or more controllers b1510 are configured to ascertain whether the state of charge of the one or more energy storage devices b1312 is within a predetermined range. On one hand, if the state of charge of the one or more energy storage devices b1312 is within the predetermined range, the one or more controllers b1510 initialize the power generation system b1000, e.g., to ultimately charge the energy storage devices b1312. On the other hand, if the state of charge of the one or more energy storage devices b1312 is not within the predetermined range, the one or more controllers b1510 do not initialize the power generation system b1000.

For instance, the predetermined range can be set having any suitable lower limit and upper limit. For example, the lower limit can be set at 0% and the upper limit can be set at 85% of full capacity. In such an example, if the one or more energy storage devices b1312 have a state of charge between 0% and 85% of full capacity (e.g., 20%), the one or more controllers b1510 determine that the state of charge of the one or more energy storage devices b1312 is within the predetermined range, and thus, the one or more controllers b1510 initialize the power generation system b1000. In contrast, if the one or more energy storage devices b1312 have a state of charge greater than 85% of full capacity (e.g., 95%) the one or more controllers b1510 determine that the state of charge of the one or more energy storage devices b1312 is not within the predetermined range, and thus, the one or more controllers b1510 do not initialize the power generation system b1000. Accordingly, in some embodiments, the state of charge must be within the predetermined range for the power generation system b1000 to initialize.

Further, in some embodiments, in determining whether to initialize the power generation system b1000 based at least in part on the received data b1530 indicative of the load state, the one or more controllers b1510 are configured to ascertain whether the charge acceptance rate of the one or more energy storage devices b1312 is within a predetermined rate range. On one hand, if the charge acceptance rate of the one or more energy storage devices b1312 is within the predetermined rate range, the one or more controllers b1510 initialize the power generation system b1000, e.g., to ultimately charge the energy storage devices b1312. On the other hand, if the charge acceptance rate of the one or more energy storage devices b1312 is not within the predetermined rate range, the one or more controllers b1510 do not initialize the power generation system b1000.

For instance, the predetermined rate rage can be set having any suitable lower limit and upper limit. For example, the lower limit can be set at some predetermined rate threshold and the upper limit can be as any rate above the predetermined rate threshold. In such an example, if the one or more energy storage devices b1312 have a charge acceptance rate between or above the predetermined rate threshold and the upper limit, the one or more controllers b1510 determine that the state of charge of the one or more energy storage devices b1312 is within the predetermined rate range, and thus, the one or more controllers b1510 initialize the power generation system b1000. In contrast, if the one or more energy storage devices b1312 have a charge acceptance rate below the lower limit or predetermined charge threshold, the one or more controllers b1510 determine that the charge acceptance rate of the one or more energy storage devices b1312 is not within the predetermined rate range, and thus, the one or more controllers b1510 do not initialize the power generation system b1000. Accordingly, in some embodiments, the charge acceptance rate must be within the predetermined rate range for the power generation system b1000 to initialize.

In some embodiments, in determining whether to initialize the power generation system b1000 based at least in part on the received data b1530 indicative of the load state of the one or more energy storage devices b1312, the one or more controllers b1510 are configured to determine whether to initialize the power generation system b1000 based at least in part on both of the state of charge and the charge acceptance rate of the one or more energy storage devices b1312. Accordingly, in some embodiments, the state of charge and the charge acceptance rate must be within the predetermined range and the predetermined rate range, respectively, for the power generation system b1000 to initialize.

In some embodiments, in determining whether to initialize the power generation system b1000 based at least in part on the received data b1530 indicative of the load state of the one or more energy storage devices b1312, the one or more controllers b1510 are configured to determine whether to initialize the power generation system b1000 based at least in part on an objective function associated with operating the closed cycle engine b1110. For instance, the objective function can take into account certain parameters, such as the cost associated with operating the closed cycle engine b1110, the other power sources available to charge or power the one or more energy storage devices b1312, electrical loads b1316, and/or power grid b1332, the startup time, the state of charge and charge acceptance rate of the energy storage devices b1312, the power demanded by the one or more energy storage devices b1312, electrical loads b1316, and/or power grid b1332, the planned time for charging and/or powering the energy storage devices b1312, electrical loads b1316, and/or power grid b1332 (e.g., at peak hours or off-hours), etc. If the objective function exceeds a predetermined operation threshold, the one or more controllers b1510 can initialize the system. On the other hand, if the objective function does not exceed the predetermined operation threshold, the one or more controllers b1510 can determined not to initialize the system.

Figure 22:
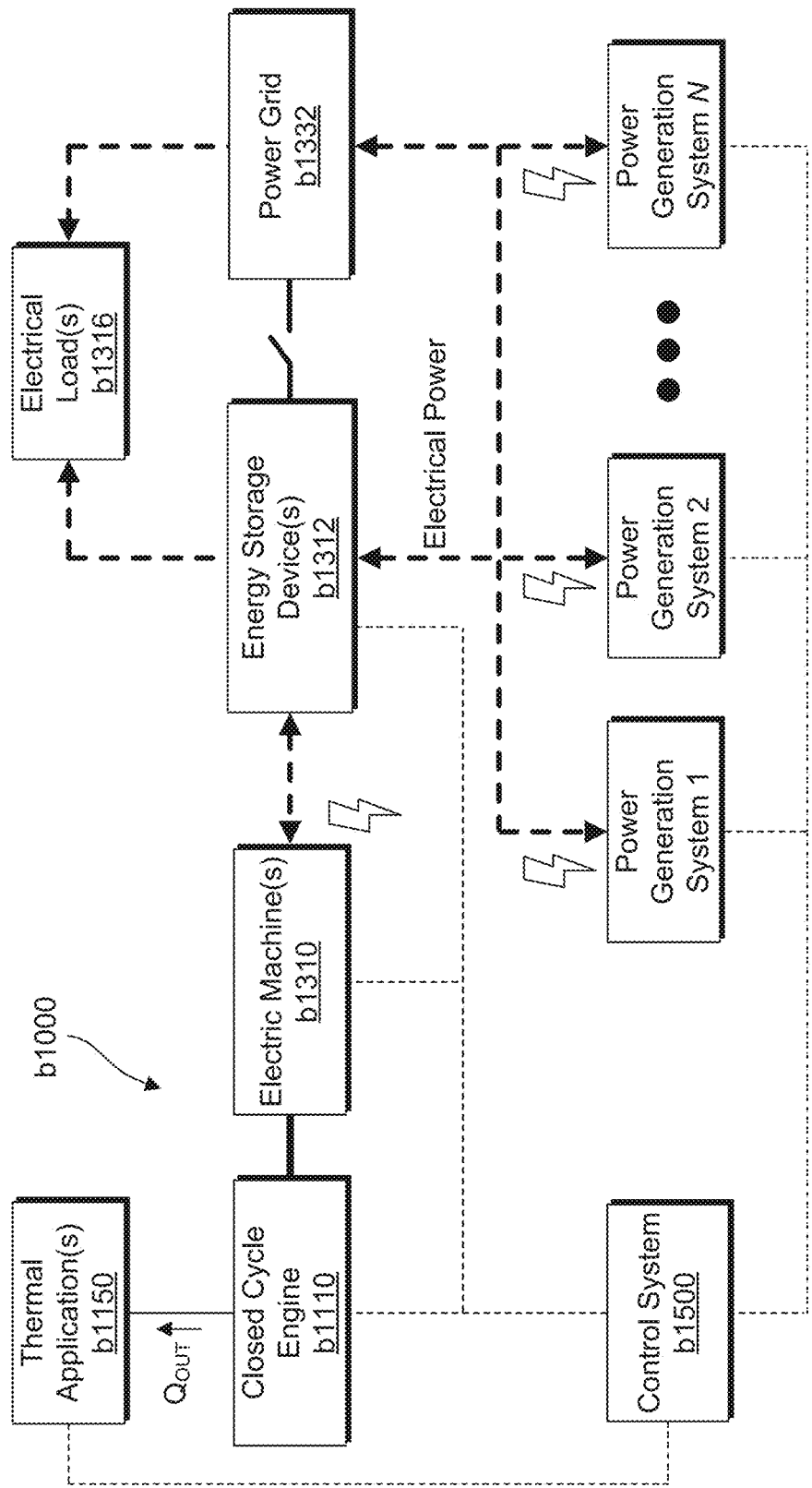
FIG. 22 provides a power generation that includes the power generation system of FIG. 18 as one of a plurality of power generation systems operable to provide electrical power to one or more energy storage devices.

In some embodiments, the power generation system b1000 that includes the closed cycle engine b1110 is one of a plurality of power generation systems operable to provide electrical power to the one or more energy storage devices b1312 and/or power grid. For instance, as shown in FIG. 22, the power generation system b1000 of FIG. 18 is shown as one of a plurality of power generation systems operable to provide electrical power to the one or more energy storage devices b1312 and/or power grid. As depicted, a first power generation system, a second power generation system, and an Nth power generation system are shown in communication with the one or more energy storage devices b1312 and/or power grid. N is an integer. The other power generation systems can be any suitable type of power generation systems, including without limitation, a wind energy power generation system, a solar energy power generation system, a fuel cell system, the grid, etc.

In this example, the one or more controllers b1510 of the control system b1500 can determine an objective function associated with each of the power generation systems b1000 associated with or in communication with the energy storage devices b1312 and/or power grid. The one or more controllers b1510 can assign or determine an objective function for each power generation system. Based on the determined objective functions, the one or more controllers b1510 can determine whether to initialize the power generation system b1000 associated with the closed cycle engine b1110. The determined objective function assigned or determined for the power generation system b1000 associated with the closed cycle engine b1110 can be based at least in part on a thermal demand from one or more thermal applications b1150 in thermal communication with the closed cycle engine b1110. The thermal demand can be indicative of the heating and/or cooling requirements of the thermal application(s) b1150. The one or more thermal applications b1150 can be any of the thermal applications provided herein, such as any of the thermal applications b140 provided herein. In some embodiments, if the power generation system b1000 associated with the closed cycle engine b1110 has the most desirable objective function, the one or more controllers b1510 can initialize the system. If the power generation system b1000 associated with the closed cycle engine b1110 does not have the most desirable objective function, the one or more controllers b1510 can decline or postpone initialization of the system b1000.

At (b1704), returning to FIG. 21, the method (b1700) includes causing at least one of the one or more piston assemblies b1120 to move to a preselected starting position. For instance, in initializing the power generation system b1000, the one or more controllers b1510 are configured to cause at least one of the one or more piston assemblies b1120 to move to a preselected starting position. In some embodiments, all of the piston assemblies b1120 can be moved to their respective preselected starting positions. By moving one, some, or all of the piston assemblies b1120 to their respective starting positions, e.g., prior to motoring or kickstarting the piston assemblies b1120 as will be described below, the closed cycle engine b1110 can more quickly obtain more efficient operation, undesired vibrations can be minimized or eliminated during start up, and drifting of the piston assemblies b1120 within their respective piston bodies b1116 can be accounted for or corrected.

Figure 23:
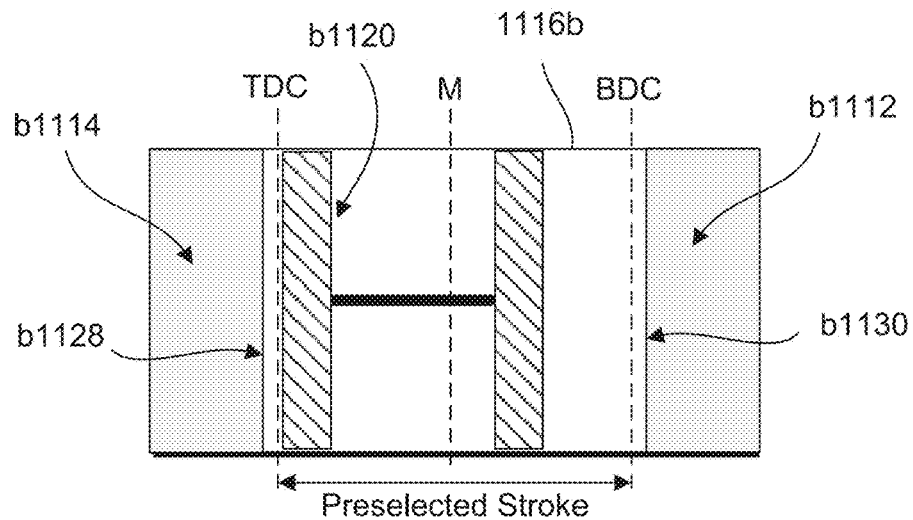
FIG. 23 provides a schematic view of an example piston assembly disposed within one of the piston bodies of a closed cycle engine of the power generation system of FIG. 17 and FIG. 18 and depicts the piston assembly in a top dead center position.
Figure 24:
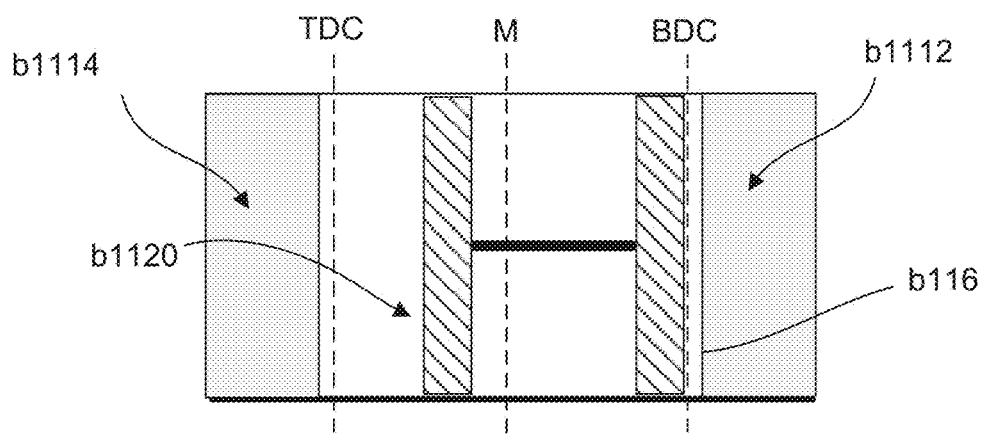
FIG. 24 provides a schematic view of the piston assembly of FIG. 23 and depicts the piston assembly in a bottom dead center position.
Figure 25:
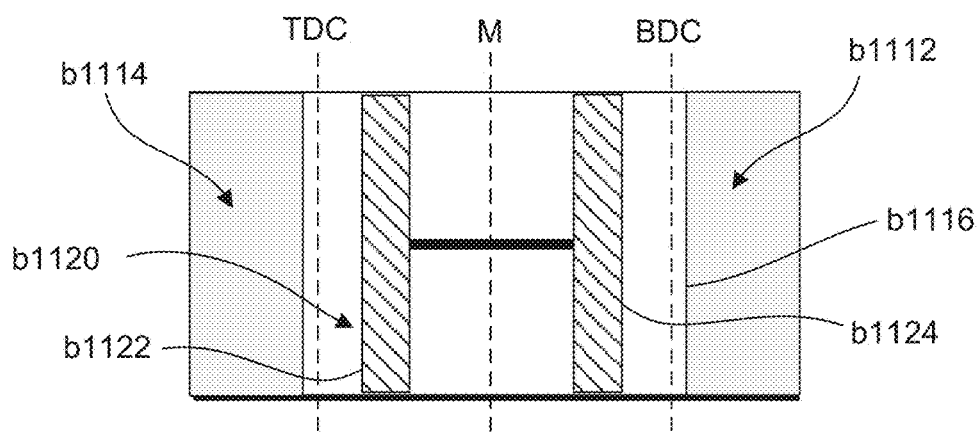
FIG. 25 provides a schematic view of the piston assembly of FIG. 23 and depicts the piston assembly positioned at a midpoint of a preselected stroke of the piston assembly.

The preselected starting position can be any suitable position. For instance, FIG. 23 provides a schematic view of an example piston assembly b1120 disposed within one of the piston bodies b1116 of the closed cycle engine b1110 of the power generation system b1000 of FIGS. 17 and 18. As shown, the piston assembly b1120 has a preselected stroke that extends between a first end or top dead center position (TDC) and an opposing second end or bottom dead center position (BDC). A midpoint (M) is defined midway between the first end and the second end, or stated differently, midway between the top dead center position and the bottom dead center position. As the piston assembly b1120 is a free piston, the top dead center and the bottom dead center positions are selected to provide a predetermined margin between the piston and the end walls b1128, b1130 of the piston body b1116 when the piston assembly b1120 is at one of the top and bottom dead center positions. In this way, the pistons b1122, b1124 of the piston assembly b1120 do not engage or hit the end walls b1128, b1130. In some embodiments, the preselected starting position is substantially a top dead center position of the preselected stroke of the piston assembly b1120, e.g., as shown in FIG. 23. That is, at least one of the pistons b1122, b1124 of the piston assembly b1120 is positioned at the top dead center position. In yet other embodiments, the preselected starting position is substantially a bottom dead center position of the preselected stroke of the piston assembly b1120, e.g., as shown in FIG. 24. That is, at least one of the pistons b1122, b1124 of the piston assembly b1120 is positioned at the bottom dead center position. In some further embodiments, the preselected starting position is substantially a midpoint of the preselected stroke of the piston assembly b1120, e.g., as shown in FIG. 25. That is, the pistons b1122, b1124 of the piston assembly b1120 are spaced evenly from the midpoint.

Figure 26:
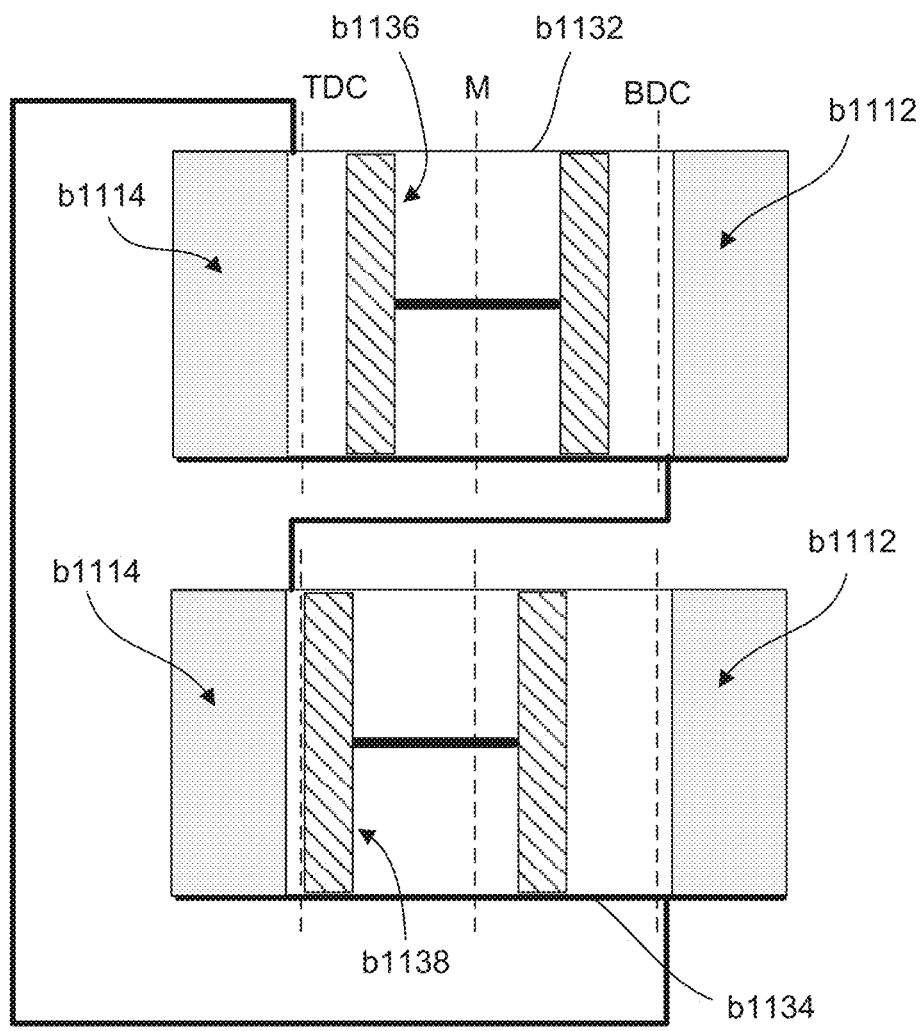
FIG. 26 provides a schematic view of two fluidly coupled piston bodies with piston assemblies disposed therein.

In some embodiments, the preselected starting positions of the piston assemblies of the closed cycle engine can be selected as different starting positions, and consequently, the piston assemblies can be moved to different preselected positions. For instance, FIG. 26 provides a schematic view of two fluidly coupled piston bodies b1132, b1134 with piston assemblies b1136, 1138 disposed therein. As shown, for the first piston body b1132, the preselected starting position of the first piston assembly b1136 is substantially at the midpoint of the preselected stroke of the piston assembly b1136. For the second piston body b1134, the preselected starting position of the second piston assembly b1138 is substantially at a top dead center position of the preselected stroke of the piston assembly b1138. In other example embodiments, the piston assemblies b1136, 1138 can be moved to other suitable preselected starting positions relative to one another.

Figure 27:
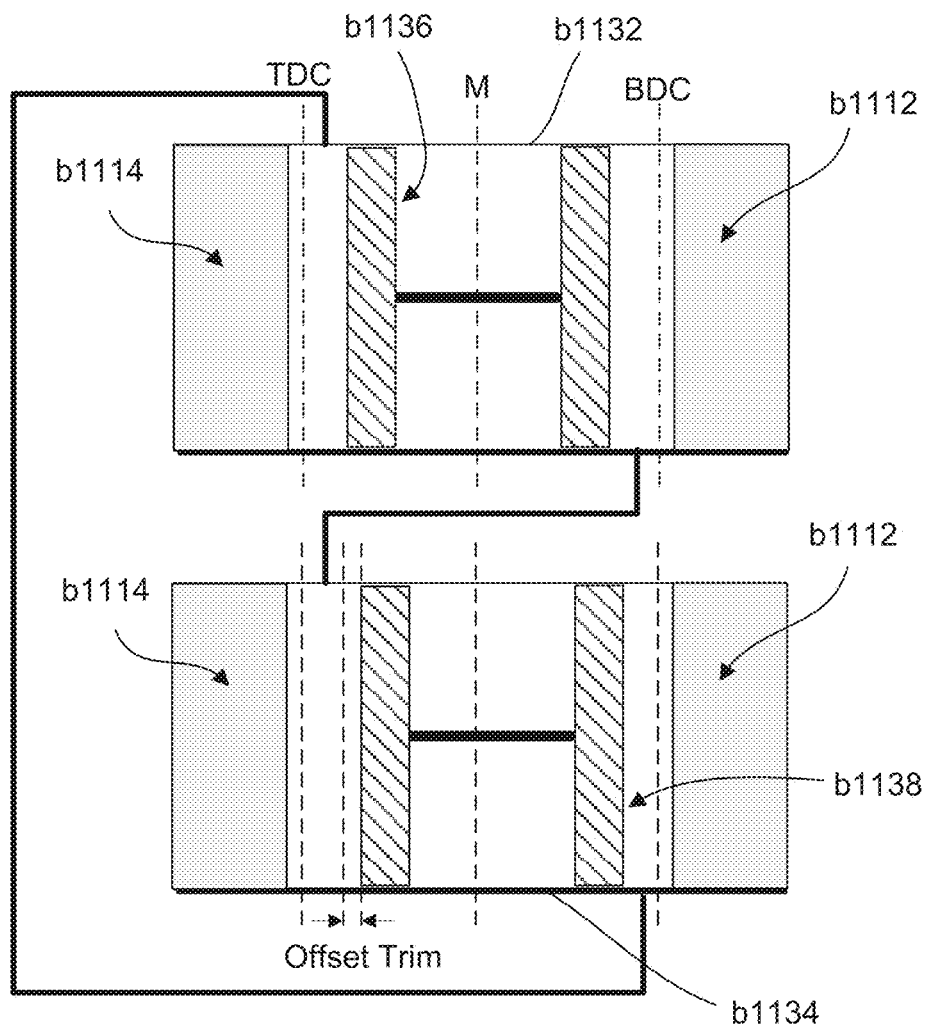
FIG. 27 provides another schematic view of two fluidly coupled piston bodies with piston assemblies disposed therein.

In yet other embodiments, the preselected starting position of one or more of the piston assemblies can be trimmed or adjusted over time, e.g., to account for drifting or degradation of the piston sealing elements over time. For instance, as shown in FIG. 27, two fluidly coupled piston bodies b1132, b1134 are shown with piston assemblies b1136, b1138 disposed therein. As shown, for the first piston body b1132, the preselected starting position of the first piston assembly b1136 is substantially a midpoint of the preselected stroke of the piston assembly b1136. For the second piston body b1134, the preselected starting position of the second piston assembly b1138 disposed therein is offset from the midpoint of the preselected stroke of the piston assembly b1138 by an offset trim. As one example, the determined offset trim can be determined based at least in part on data b1530 collected from previous operations of the power generation system b1000. For instance, the one or more controllers b1510 can receive data b1530 indicative of the movement of the second piston assembly b1138 during past operations (e.g., amplitude, phase, frequency, speed, etc.), and can determine that the second piston assembly b1138 drifts out of sync with respect to the first piston assembly b1136 and thus causes unwanted vibration, reduced work output of the closed cycle engine b1110, etc. By starting the second piston assemblies b1136, b1138 at the preselected starting position and in accordance with the offset trim, initially moving the piston assemblies b1136, b1138 into synchronization may be achieved more easily.

The piston assemblies can be moved to their respective positions in any suitable manner. As one example, the one or more controllers b1510 are configured to receive data b1530 indicative of one or more operating parameters associated with one or more of the piston assemblies b1120. More particularly, the one or more controllers b1510 can receive data b1530 indicative of a current position of the piston assemblies b1120 of the closed cycle engine b1110. For instance, the one or more controllers b1510 can receive data b1530 indicative of the current position of the piston assemblies b1120 from the piston movement sensors b1520, e.g., as shown in FIG. 19. Once the current position of the piston assemblies b1120 are known or obtained, the one or more controllers b1510 can determine one or more repositioning commands indicative of instructions for moving the piston assemblies b1120 to their respective preselected starting positions. The repositioning commands can each include instructions for moving a given piston assembly b1120 a repositioning distance and direction. Once the repositioning commands are determined, the one or more controllers b1510 can provide the repositioning commands to one or more controllable devices b1534 operable to reposition the piston assemblies b1120 within their respective piston bodies b1116.

In some embodiments, for example, the one or more controllable devices b1534 operable to reposition the piston assemblies b1120 within their respective piston bodies b1116 can be the one or more electric machines b1310. For instance, the one or more electric machines b1310 can be used to electrically cam the piston assemblies b1120 into their respective preselected starting positions. Particularly, the one or more controllers b1510 can cause electrical power to be provided to the one or more electric machines b1310. For example, the one or more controllers b1510 can cause the one or more energy storage devices b1312 in communication with the one or more electric machines b1310 to provide electrical power thereto. The electrical power provided to the electric machine b1310 can cause the electric machine b1310, functioning as an electric motor or actuator, to drive or electrically cam the piston assembly b1120 to the preselected starting position. That is, the piston assembly b1120 can be moved via electronics in accordance with a cam profile function or motion profile. In some alternative embodiments, the electrical cam can be some other electric machine b1310 operable to move an associated piston assembly b1120 to a preselected starting position.

In yet other embodiments, the one or more controllable devices b1534 operable to reposition the piston assemblies b1120 within the respective piston bodies b1116 can be an electric motor configured to drive a mechanical cam that in turn is operable to move the one or more piston assemblies b1120 to the respective preselected starting positions. In some other embodiments, as noted above, the closed cycle engine b1110 has a plurality of piston bodies b1116 in which piston assemblies b1120 are movable between their respective hot side b1112 and cold side b1114. The hot side b1112 of each piston body b1116 is in fluid communication with a cold side b1114 of another piston body b1116. Further, in such embodiments, in causing the at least one of the one or more piston assemblies b1120 to move to the preselected starting position, the one or more controllers b1510 are configured to cause one or more valves to move to an open position such that fluid flows between the piston bodies b1116. In this way, the pressure change within the piston bodies b1116 causes the piston assemblies b1120 to move to their respective preselected starting positions. Stated another way, one or more valves can be controlled to cross bleed the fluid between the piston bodies b1116 such that the pistons b1122, b1124 are moved to their respective preselected starting positions.

At (b1706), the method (b1700) includes assigning a motion profile to at least one of the one or more electric machines b1310. For instance, in initializing the power generation system b1000, the one or more controllers b1510 are configured to assign a motion profile to at least one of the one or more electric machines b1310. Particularly, the one or more controllers b1510 are configured to assign a motion profile to at least one electric machine b1310 that is operatively coupled with a piston assembly b1120 of the closed cycle engine b1110. The assigned motion profile can be selected from a motion profile table or database, e.g., stored in a memory device of the one or more controllers b1510. For instance, the motion profiles stored in the motion profile table can be defined as a set of X-Y points that define the position of the dynamic member b1322 of a given electric machine b1310 at a point in time, e.g., during motoring or kickstarting the engine.

The motion profile assigned to the electric machine b1310 includes instructions for controlling the electric machine b1310 to drivingly move at least one piston assembly b1120 during startup or initialization of the power generation system b1000. More specifically, the motion profile assigned to the electric machine b1310 includes instructions for controlling an output of the electric machine b1310 during startup of the power generation system b1000 such that the piston assembly b1120 operatively coupled thereto is drivingly moved by the electric machine b1310 within its piston body b1116. Stated another way, the assigned motion profile provides actuation instructions for the electric machine b1310 operatively coupled with one of the piston assemblies b1120. The motion profile can include various setpoints over time for achieving certain motion characteristics, such as e.g., velocity, acceleration, deceleration, jerk, frequency, phase, amplitude, etc. The motion profile can be based on one, some, or all of the motion characteristics. Accordingly, when electrical power is provided to the electric machine b1310, the electric machine b1310 can actuate the piston assembly b1120 in accordance with the motion characteristics of the assigned motion profile. The one or more controllers b1510 can cause the one or more energy storage devices b1312 to provide electrical power to the electric machine b1310. The provided electrical power can cause the electric machine b1310 to actuate the piston assembly b1120.

In some embodiments, the method (b1700) further includes designating, by the one or more controllers b1510, a master piston assembly b1120 selected from one of the one or more piston assemblies b1120 of the closed cycle engine b1110. For instance, for the depicted embodiment of FIG. 18, the closed cycle engine b1110 includes four (4) piston bodies b1116 with four (4) piston assemblies b1120. Each piston body b1116 has an associated piston assembly b1120 movable therein. One of the piston assemblies b1120 can be designated as the master piston assembly b1120. In such embodiments, the designated master piston assembly b1120 is the sole piston assembly b1120 actuated by its associated electric machine b1310 in accordance with the assigned motion profile. However, when the master piston assembly b1120 is moved by the electric machine b1310 in accordance with the assigned motion profile, the other piston assemblies b1120 are also moved, e.g., based at least in part on the arrangement and configuration of the piston assemblies b1120 as well as the arrangement and configuration of the fluidly connected volumes or piston chambers b1118 defined by the piston bodies b1116. In some embodiments, particularly in embodiments in which some piston assemblies b1120 of the engine are movable independently of one another, more than one piston assembly b1120 can be designated as a master piston assembly b1120. For instance, at least one piston assembly b1120 of each independent group or tetra piece can be designated as a master piston. In such embodiments, the dependent or follower piston assemblies b1120 associated with the master piston assemblies b1120 need not have designated motion profiles as they operable to follow their respective master pistons b1122, b1124.

In yet other embodiments, in assigning the motion profile to the electric machines b1310, each of the of the one or more electric machines b1310 are assigned a motion profile. That is, each electric machine b1310 operatively coupled with a piston assembly b1120 is assigned a motion profile. Accordingly, during startup, the electric machines b1310 actuate their respective piston assemblies b1120 in accordance with their assigned profiles. In some embodiments, for each piston assembly b1120 of the closed cycle engine b1110, at least one electric machine b1310 operatively coupled thereto is assigned a motion profile. Thus, if more than one electric machine b1310 is operatively coupled with a given piston assembly b1120, only one of the electric machines b1310 need be assigned a motion profile.

Figure 28:
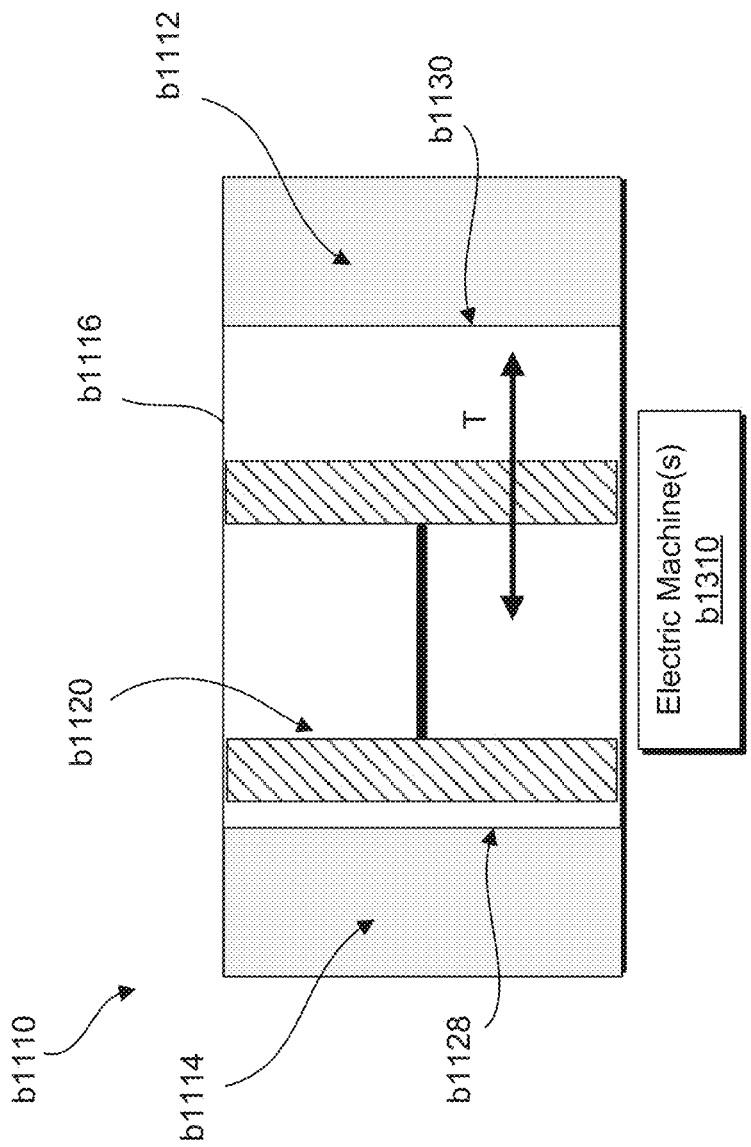
FIG. 28 provides a schematic view of a piston assembly being moved within its associated piston body.

At (b1708), with reference again to FIG. 21, the method (b1700) includes commencing motion of the piston assemblies b1120 of the closed cycle engine b1110. In some implementations, in initializing the power generation system b1000, the one or more controllers b1510 are configured to cause an electric machine b1310 to drivingly motor or electrically cam the piston assembly b1120 operatively coupled thereto based at least in part on the assigned motion profile. For instance, to cause the electric machine b1310 to drivingly motor the piston assembly b1120 operatively coupled thereto, the one or more controllers b1510 can cause the one or more energy storage devices b1312 to provide electrical power to the electric machine b1310 to drivingly motor the piston assembly b1120. Additionally or alternatively, electrical power can be provided by an alternative power supply. The amount of electrical power, the phase, and the frequency of the provided electrical power can be provided based at least in part on the assigned motion profile. When electrical power is provided to the electric machine b1310, the electric machine b1310 drives or motors the piston assembly b1120 operatively coupled thereto such that the piston assembly b1120 is driven or moved between the cold side b1114 and the hot side b1112 of the closed cycle engine b1110, e.g., as shown in FIG. 28. Specifically, as depicted in FIG. 28, the electric machine b1310 operatively coupled with the piston assembly b1120 can drivingly motor the piston assembly b1120 such that the piston assembly b1120 translates (denoted by the arrow labeled "T") between the hot side b1112 and the cold side b1114 of the closed cycle engine b1110.

In some embodiments, the one or more controllers b1510 cause the electric machine b1310 to drivingly motor the piston assembly b1120 operatively coupled thereto for a predetermined initialization time. After the electric machine b1310 drivingly motors the piston assembly b1120 operatively coupled thereto for the predetermined initialization time, the one or more controllers b1510 are further configured to command the electric machine b1310 to cease drivingly motoring the piston assembly b1120 operatively thereto. That is, after the predetermined initialization time elapses, the electric machine b1310 ceases motoring the piston assembly b1120. The predetermined initialization time can be a set or fixed amount of time that corresponds with a time period in which the piston assemblies b1120 can achieve predetermined motion characteristics without need for motoring or actuating by the electric machine b1310.

In yet other embodiments, the one or more controllers b1510 cause the electric machine b1310 to drivingly motor the piston assembly b1120 operatively coupled thereto until the electric machine b1310 completes or substantially completes the assigned motion profile. For instance, the motion profile can designate certain motion characteristics of the electric machine b1310 over time, and when the motion profile has been substantially completed, e.g., greater than ninety percent (90%), then the one or more controllers b1510 are further configured to command the electric machine b1310 to cease motoring the piston assembly b1120 operatively coupled thereto.

In some further embodiments, the one or more controllers b1510 cause the electric machine b1310 to drivingly motor the piston assembly b1120 operatively coupled thereto until the electric machine b1310 and/or the piston assembly b1120 operatively coupled thereto achieves or substantially achieves one or more motion characteristics, e.g., a predetermined speed, acceleration, amplitude, etc. For instance, when the one or more motion characteristics are achieved or substantially achieved, e.g., greater than ninety percent (90%), then the one or more controllers b1510 are further configured to command the electric machine b1310 to cease motoring the piston assembly b1120 operatively coupled thereto. Stated yet another way, once the one or more motion characteristics of the electric machine b1310 and/or piston assembly b1120 are achieved or substantially achieved, the electric machine b1310 ceases motoring the piston assemblies b1120 and the piston assembly b1120 from that point relies on the temperature differential $\Delta T$ between the hot side b1112 and the cold side b1114 to move the piston within the piston body b1116. In some further embodiments, the more controllers b1510 can cause the electric machine b1310 to drivingly motor the piston assembly b1120 operatively coupled thereto when the closed cycle engine b1110 "catches". Particularly, the control devices of the control system b1500 can monitor the motion characteristics noted above, and upon determining a discontinuity in the motion or behavior of the piston assembly b1120 and/or the dynamic member b1322 of the electric machine b1310 has occurred, the controllers b1510 can cause the electric machine b1310 to cease motoring the piston assembly b1120. This determined discontinuity can be associated with the engine catching, or stated differently, the discontinuity can be associated with an event in which the thermal power of the engine takes over to move the piston assemblies b1120 within their respective piston chambers b1118.

Although only one electric machine b1310 was described above as motoring a piston assembly b1120 operatively coupled thereto, it will be appreciated that one, some, or all of the piston assemblies b1120 of the closed cycle engine b1110 can be motored or drivingly moved during initialization, e.g., in the manner described above.

In some implementations, commencing motion of the piston assemblies b1120 of the closed cycle engine b1110 at (b1708) includes kick starting at least one piston assembly b1120 of the closed cycle engine b1110. For instance, in initializing the power generation system b1000, the one or more controllers b1510 are configured to cause one or more of the electric machines b1310 operatively coupled with the piston assemblies b1120 to drivingly kickstart their respective piston assemblies b1120. In some implementations, all of the piston assemblies b1120 of the closed cycle engine b1110 can be kickstarted by their respective electric machines b1310. In yet other implementations, some but not all of the piston assemblies b1120 of the closed cycle engine b1110 can be kickstarted by their respective electric machines b1310. For instance, for closed cycle engines b1110 having four (4) piston assemblies b1120, e.g., such as the closed cycle engine b1110 shown in FIG. 18, two of the four piston assemblies b1120 can be kickstarted. In some further embodiments, only a single piston assembly b1120 of the closed cycle engine b1110 is kickstarted by its associated electric machine b1310.

To cause an electric machine b1310 to drivingly kickstart the piston assembly b1120 operatively coupled thereto, the one or more controllers b1510 can cause the one or more energy storage devices b1312 to provide electrical power to the electric machine b1310. Additionally or alternatively, electrical power can be provided by an alternative power supply. The amount of electrical power, the phase, and the frequency of the provided electrical power can be provided based at least in part on the assigned motion profile. When electrical power is provided to the electric machine b1310, the electric machine b1310 kickstarts the piston assembly b1120 operatively coupled thereto such that the piston assembly b1120 is driven or moved between the cold side b1114 and the hot side b1112 of the closed cycle engine b1110.

In drivingly kickstarting the piston assembly b1120, the electric machine b1310 kickstarts the piston assembly b1120 operatively coupled thereto along a predetermined number of strokes. For instance, in some embodiments, the predetermined number of strokes is no more than one stroke of the piston assembly b1120. In such embodiments, the electric machine b1310 kickstarts the piston assembly b1120 operatively coupled thereto along the predetermined number of strokes and such that the piston assembly b1120 continues moving (e.g., translating) after the electric machine b1310 kickstarts the piston assembly b1120. In yet other embodiments, the predetermined number of strokes is between one and five strokes of the piston assembly b1120.

In initializing the power generation system b1000, the one or more controllers b1510 are configured to create a temperature differential $\Delta T$ between the hot side b1112 and the cold side b1114 of the closed cycle engine b1110. Prior to start up or initialization of the closed cycle engine b1110, the hot side b1112 may not be hotter or at a higher temperature than the cold side b1114, and consequently, the cold side b1114 may not be colder or at a lower temperature than the hot side b1112. Accordingly, the balance of plant b1200 associated with the closed cycle engine b1110 can create a temperature differential $\Delta T$ between the two opposing sides. For instance, in some implementations, the balance of plant b1200 can heat the hot side b1112 of the engine to create the temperature differential $\Delta T$ between the opposing sides. In some implementations, the balance of plant b1200 can cool or remove heat from the cold side b1114 of the engine to create the temperature differential $\Delta T$ between the opposing sides. In yet other implementations, the balance of plant b1200 can heat the hot side b1112 of the engine and cool or remove heat from the cold side b1114 of the engine to create the temperature differential $\Delta T$ between the opposing sides. The balance of plant b1200 can include any suitable heat source to impart thermal energy or heat the hot side b1112 of the closed cycle engine b1110, such as e.g., a combustor b1224 as will be described below. Furthermore, the balance of plant b1200 can include any suitable heat removal system for removing or extracting heat from the cold side b1114 of the closed cycle engine b1110. Additionally or alternatively, the balance of plant b1200 can include any suitable cooling system for cooling the cold side b1114 of the engine.

At (b1710), for instance, the method (b1700) includes causing a heat source to apply heat to the hot side b1112 of the closed cycle engine b1110. In this way, a temperature differential $\Delta T$ between the hot side b1112 and the cold side b1114 of the closed cycle engine b1110 can be created. The one or more controllers b1510 can cause the heat source to apply heat to the hot side b1112 of the closed cycle engine b1110. Particularly, the one or more controllers b1510 can cause the heat source to apply heat to the hot side b1112 before, at the same time, or after commencing motion of the piston assemblies b1120 at (b1708).

The heat source can be any controllable heat source. As one example, for the depicted embodiment of FIG. 18, the balance of plant b1200 includes a heater loop b1210. The heater loop b1210 includes a combustor b1224 operable to generate heat. Thus, in this embodiment, the heat source is the combustor b1224. Heat generated by the combustor b1224 can be exchanged with the hot side b1112 of the engine, e.g. to impart thermal energy thereto. In causing the combustor b1224 to apply heat to the hot side b1112 of the closed cycle engine b1110, the one or more controllers b1510 are configured to cause a compressor b1222 to move pressurized air along an intake line b1232 of the heater loop b1210 to the combustor b1224. Particularly, the one or more controllers b1510 can cause the rotary components of the compressor b1222 to rotate such that air is moved from an ambient environment into the compressor b1222. The compressor b1222 can pressurize the air, and the pressurized air can flow downstream to the combustor b1224. In addition, the one or more controllers b1510 can cause a fuel control device b1214 to selectively allow a fuel to flow to the combustor b1224 such that the fuel and air can mix and combust in the combustor b1224 to generate heat. The combustor b1224 can be in fluid communication with a hot side b1112 heat exchanger positioned along the heater loop b1210 downstream of the combustor b1224 and in a heat exchange relationship with the hot side b1112 for imparting heat thereto.

At (b1712), the method (b1700) includes removing heat from and/or cooling the cold side b1114 of the closed cycle engine b1110. In this manner, a temperature differential $\Delta T$ between the hot side b1112 the cold side b1114 of the closed cycle engine b1110 can be created. As noted above, heat can be removed from and/or the cold side b1114 can be cooled in addition to heat being applied to the hot side b1112 of the closed cycle engine b1110 at (b1710). In some implementations, the one or more controllers b1510 can cause a heat removal system to remove or extract heat from the cold side b1114 of the engine. Particularly, the one or more controllers b1510 can cause the heat removal system to remove/extract heat from the cold side b1114 before, at the same time, or after commencing motion of the piston assemblies b1120 at (b1708). Additionally or alternatively, the one or more controllers b1510 can cause a cooling system to cool the cold side b1114 of the engine. Specifically, the one or more controllers b1510 can cause the cooling system to cool the cold side b1114 before, at the same time, or after commencing motion of the piston assemblies b1120 at (b1708).

For the depicted embodiment of FIG. 18, the balance of plant b1200 includes a chiller loop b1212, such as e.g., one of the chiller loops described herein. The chiller loop b1212 can include a cold side b1114 heat exchanger positioned along the chiller loop b1212 and in a heat exchange relationship with the cold side b1114. In initializing the power generation system b1000, the one or more controllers b1510 are configured to cause the cold side b1114 heat exchanger to remove heat from the cold side b1114 of the closed cycle engine b1110. For instance, the cold side b1114 heat exchanger can remove or extract heat from the cold side b1114 of the engine and can use the thermal energy in some useful way. For example, as depicted embodiment of FIG. 18, the chiller loop b1212 is positioned at least in part in a heat exchange relationship with the heater loop b1210. Accordingly, heat removed from the cold side b1114 of the engine can be exchanged with the heater loop b1210, e.g., to provide for more efficient heating of the hot side b1112 of the engine.

The cooling system can be any suitable system, such as e.g., a system that implements a refrigeration or other cooling cycle. As one example, the balance of plant b1200 can include a refrigeration loop. A cold side b1114 heat exchanger (e.g., an evaporator) can be positioned along the refrigeration loop in a heat exchange relationship with the cold side b1114 of the closed cycle engine b1110. In initializing the power generation system b1000, the one or more controllers b1510 are configured to cause the cold side b1114 heat exchanger to cool the cold side b1114 of the closed cycle engine b1110. Accordingly, the temperature differential $\Delta T$ between the cold side b1114 and the hot side b1112 can be increased.

In summary, to initialize the power generation system b1000, at (b1702), the one or more controllers b1510 of the control system b1500 can determine whether to initialize the system based at least in part on data b1530 of indicative of the load state of the one or more energy storage devices b1312 in communication with the electric machines b1310. If the state of charge and charge acceptance rate of the one or more energy storage devices b1312 are within predetermined ranges, e.g., the energy storage devices b1312 have the capacity and the ability to accept electrical power, the one or more controllers b1510 can proceed with initializing the system. On the other hand, if the energy storage devices b1312 do not have the capacity and/or the ability to accept logical power, the one or more controllers b1510 can determine not to initialize the system. At (b1704) and (b1706), the one or more controllers b1510 can cause the one or more piston assemblies b1120 to move to their respective preselected starting positions (e.g., via electrical camming) and one or more motion profiles can be assigned to the electric machines b1310, respectively. At (b1708), the one or more controllers b1510 can commence motion of the piston assemblies b1120. For instance, the one or more controllers b1510 can cause the one or more electric machines b1310 to drivingly motor their respective piston assemblies b1120. That is, when electrical power is provided to the electric machines b1310, the dynamic members b1322 of the electric machines b1310 move in accordance with their assigned motion profiles, and as a result, the piston assemblies b1120 operatively coupled with the electric machines b1310 are moved within their respective piston bodies b1116, e.g., between the hot and cold side b1114 of the engine. In some embodiments, the one or more controllers b1510 can cause the one or more electric machines b1310 to drivingly kickstart their respective piston assemblies b1120. Particularly, electrical power can be supplied to the electric machine b1310 such that the dynamic member b1322 of the electric machine b1310 operatively coupled with the piston assembly b1120 is kickstarted in accordance with assigned motion profile. At (b1710), the one or more controllers b1510 cause a heat source to apply heat to the hot side b1112 of the engine. At (b1712), the one or more controllers b1510 cause a heat removal system and/or a cooling system to remove or cool the cold side b1114 of the engine. Stated differently, at (b1710) and (b1712), a temperature differential $\Delta T$ is created between the hot side b1112 and the cold side b1114 of the engine. The created temperature differential $\Delta T$ causes the working fluid within the piston bodies b1116 to expand/contract, which causes movement of the piston assemblies b1120 therein. Particularly, the expansion/contraction of the working fluid causes the piston assemblies b1120 to move within their respective piston bodies b1116 between the hot side b1112 and cold side b1114 of the engine. Once the temperature differential ΔT has reached a preselected difference, the piston assemblies b1120 are movable within their respective piston bodies b1116 without assistance from the electric machines b1310 drivingly motoring or kickstarting the pistons b1122, b1124. When the temperature differential ΔT has reached the preselected difference, the system can "let go" or cease motoring/kickstarting the pistons b1122, b1124 and the system can commence normal operation, e.g., in an idle mode or charging mode.

Power Generation System Normal Operation

Once the power generation system b1000 is initialized, the system can operate in a normal mode. That is, the power generation system b1000 can be operated in the idle mode or the charging mode, e.g., as shown in FIG. 20. As noted above, in the charging mode, the piston assemblies b1120 are moved under their own thermal power (e.g., without need for the electric machines b1310 to motor the piston assemblies b1120) and an electrical load is applied to the one or more electric machines b1310 operatively coupled with the piston assemblies b1120 of the closed cycle engine b1110. In the idle mode, the piston assemblies b1120 are moved under their own thermal power but without or with a negligible electrical load applied on the electric machines b1310.

Figure 29:
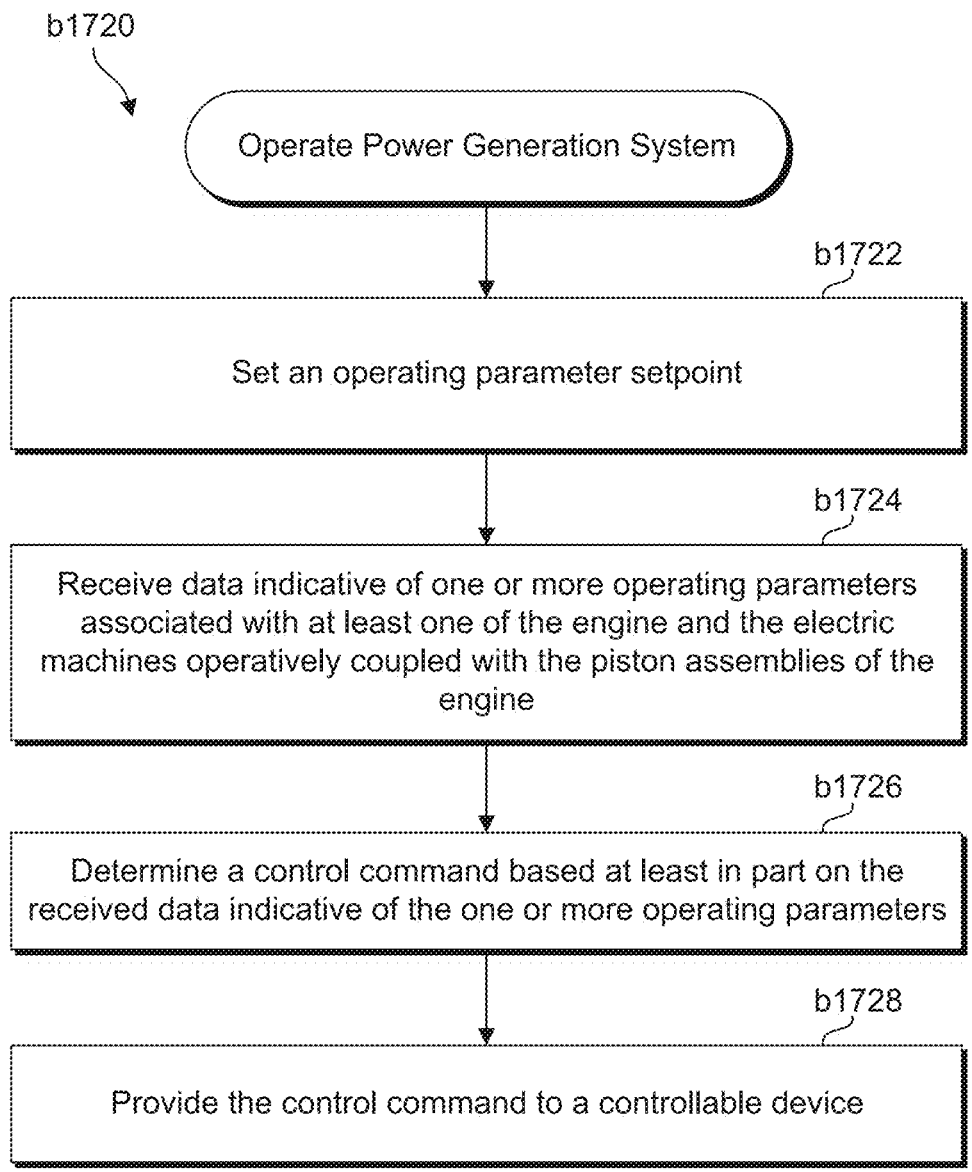
FIG. 29 provides a flow diagram depicting an example method of controlling the power generation system of FIG. 17 and FIG. 18 in a normal mode.

An example manner in which the power generation system b1000 can be controlled in the normal mode will now be provided. FIG. 29 provides a flow diagram depicting an example method (b1720) of controlling the power generation system b1000 of FIGS. 1 and 2 in normal mode. Some or all of the method (b1720) can be implemented by the control system b1500 described herein. In addition, it will be appreciated that exemplary method (b1720) can be modified, adapted, expanded, rearranged and/or omitted in various ways without deviating from the scope of the present subject matter.

At (b1722), the method (b1700) includes setting an operating parameter setpoint. For instance, the one or more controllers b1510 can set the operating parameter setpoint. The operating parameter setpoint is indicative of a desired or target value of some variable operating parameter of the power generation system b1000. In some embodiments, for instance, the operating parameter setpoint can be indicative of an operating parameter associated with the electric machines b1310 operatively coupled with the closed cycle engine b1110. For example, the operating parameter setpoint can be indicative of a target electrical current generated by or at the electric machines b1310. As another example, the operating parameter setpoint can be indicative of a target voltage at the electric machines b1310. In other embodiments, the operating parameter setpoint can be indicative of an operating parameter associated with the closed cycle engine b1110. For example, the operating parameter setpoint can be indicative of a target pressure at some station or position within or fluidly connected with one of the piston bodies b1116. As another example, the operating parameter setpoint can be indicative of a target temperature at some station or position within or fluidly connected with one of the piston bodies b1116. In still other embodiments, the operating parameter setpoint can be indicative of an operating parameter associated with the movement of one or more of the piston assemblies b1120 of the closed cycle engine b1110. For example, the operating parameter setpoint can be indicative of a target speed of one or more of the piston assemblies b1120 of the closed cycle engine b1110.

As another example, the operating parameter setpoint can be indicative of a target amplitude of one or more of the piston assemblies b1120 of the closed cycle engine b1110.

The operating parameter setpoint can be set by the one or more controllers b1510 based at least in part on a selected control scheme. The control scheme can be selected from one of a plurality of control schemes. As one example, in some embodiments, the power generation system b1000 can be controlled in accordance with an efficiency control scheme. Utilizing the efficiency control scheme, the power generation system b1000 can be controlled in such a way that the efficiency of the overall power generation system b1000 is optimized. In such embodiments, the operating parameter setpoint can be set as an objection function that seeks to maximize the efficiency of the power generation system b1000. As another example, in some embodiments, the power generation system b1000 can be controlled in accordance with a cost control scheme. Utilizing the cost control scheme, the power generation system b1000 can be controlled in such a way that the cost of operating the overall power generation system b1000 is optimized. In such embodiments, the operating parameter setpoint can be set as an objection function that seeks to minimize the cost of operating the power generation system b1000. As a further example, in some other embodiments, the power generation system b1000 can be controlled in accordance with a cost to power ratio control scheme. Utilizing the cost to power ratio control scheme, the power generation system b1000 can be controlled in such a way that the cost to power ratio is minimized during operation. In such embodiments, the operating parameter setpoint can be set as an objection function that seeks to minimize the cost to power ratio of operating the power generation system b1000.

As yet another example, in some embodiments, the power generation system b1000 can be controlled in accordance with a power output control scheme. Utilizing the power output control scheme, the power generation system b1000 can be controlled in such a way that a set amount of electrical power is generated by the electric machines b1310 of the system. In such embodiments, the operating parameter setpoint can be set as a target electrical power output of the system. In some embodiments, to achieve a particular electrical power output from the electric machines b1310, the operating parameter setpoint can be set as a target piston movement characteristic, such as e.g., the amplitude, speed (i.e., the amplitude of the piston at constant frequency), frequency, etc. The speed of the piston can be the max linear piston speed, for example. Advantageously, as will be explained further below, in some embodiments the operating parameter setpoint can be set as a target piston speed that corresponds to or is associated with a desired or target electrical power output of the electric machines b1310. By setting the operating parameter setpoint as a target piston speed, a one-to-one relationship can be maintained between the piston speed and the electrical power output of the electric machine b1310. Based on the piston speed set point, the fuel input required to heat the hot side b1112 of the closed cycle engine b1110 to achieve the set piston speed can be determined.

Figure 30:
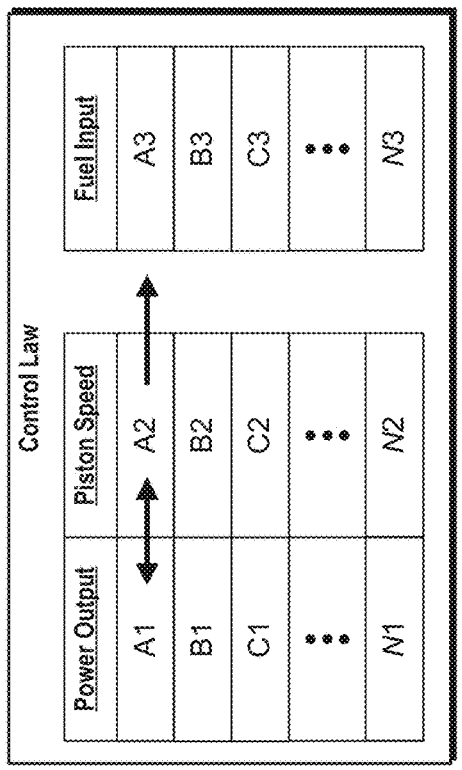
FIG. 30 provides a table of an example control law that associates piston speeds of the piston assembly with power outputs of the electric machines as well as fuel inputs to a combustor for heating a hot side of the closed cycle engine.

For instance, FIG. 30 provides a table of an example control law. The control law can be stored in one or more of the memory devices of the one or more controllers b1510, for example. The control law can be accessed by the one or more processors. As shown, the control law associates or corresponds various piston speeds with electrical power outputs of the electric machines b1310. Then, as noted above, the fuel input (i.e., an amount of fuel to input into the combustor b1224 for combustion) can be determined. Notably, the piston speed has a one-to-one relationship with the power output of the electric machines b1310. For instance, as depicted in FIG. 30, a piston speed A2 is associated with a power output A1 in a one-to-one relationship. The piston speeds B2, C2, and so on to N2 are associated with their respective power outputs B1, C1, and N1 in one-to-one relationships as well. Based on the selected piston speed and/or power output, the fuel input is determined to achieve the desired piston speed and/or power output.

Further, in some example embodiments, the operating parameter setpoint can be varied by the one or more controllers b1510 during operation of the power generation system b1000. For instance, in some embodiments, the operating parameter setpoint can be automatically varied based at least in part on the load state of the one or more energy storage devices b1312 in communication with the one or more electric machines b1310. The one or more controllers b1510 can receive data b1530 from one or more sensors associated with the one or more energy storage devices b1312. Based at least in part on the received data b1530, the one or more controllers b1510 can then determine the load state of the one or more energy storage devices b1312 in communication with the electric machines b1310. As noted previously, the load state can be descriptive of a state of charge or charge capacity of the one or more energy storage devices b1312. In some implementations, the operating parameter setpoint can be varied based at least in part on the state of charge or charge capacity of the one or more energy storage devices b1312.

Figure 31:
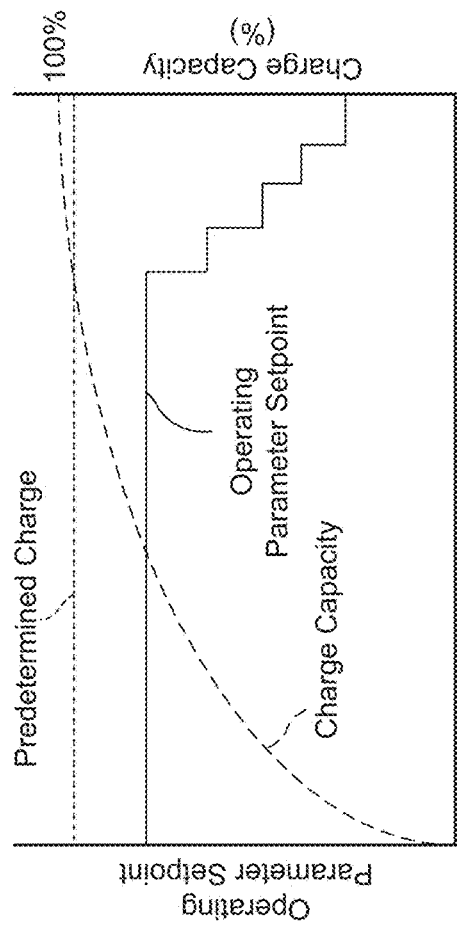
FIG. 31 provides a graph depicting an operating parameter setpoint as well as a charge capacity of the one or more energy storage devices as a function of charge time.

By way of example, FIG. 31 provides a graph depicting an operating parameter setpoint as well as a charge capacity of the one or more energy storage devices b1312 as a function of charge time. As shown, when the charge capacity or state of charge of the one or more energy storage devices b1312 reaches a predetermined charge or predetermined percentage of full charge, the operating parameter setpoint can be varied, e.g., decreased. For instance, in embodiments in which the operating parameter setpoint is indicative of a target piston speed, when the charge capacity of the one or more energy storage devices b1312 reaches the predetermined charge, the operating parameter setpoint of the piston speed can be decreased. In this way, the closed cycle engine b1110 will ultimately produce less useful work, and consequently, the electric machines b1310 operatively coupled thereto will generate less electrical power. Accordingly, the electric machines b1310 can charge the energy storage devices b1312 at a slower charge rate, e.g., to top off or trickle charge the one or more energy storage devices b1312. Moreover, as further shown in FIG. 31, the operating parameter setpoint can be varied multiple times over the charge time, e.g., when the charge capacity of the one or more energy storage devices b1312 reaches a given predetermined charge. Particularly, when the charge capacity of the one or energy storage devices b1312 reaches a given predetermined charge, the operating parameter setpoint can be varied in a step-like manner as shown in FIG. 31. In some embodiments, the operating parameter setpoint can be varied in a gradual or ramp-like manner.

Figure 32:
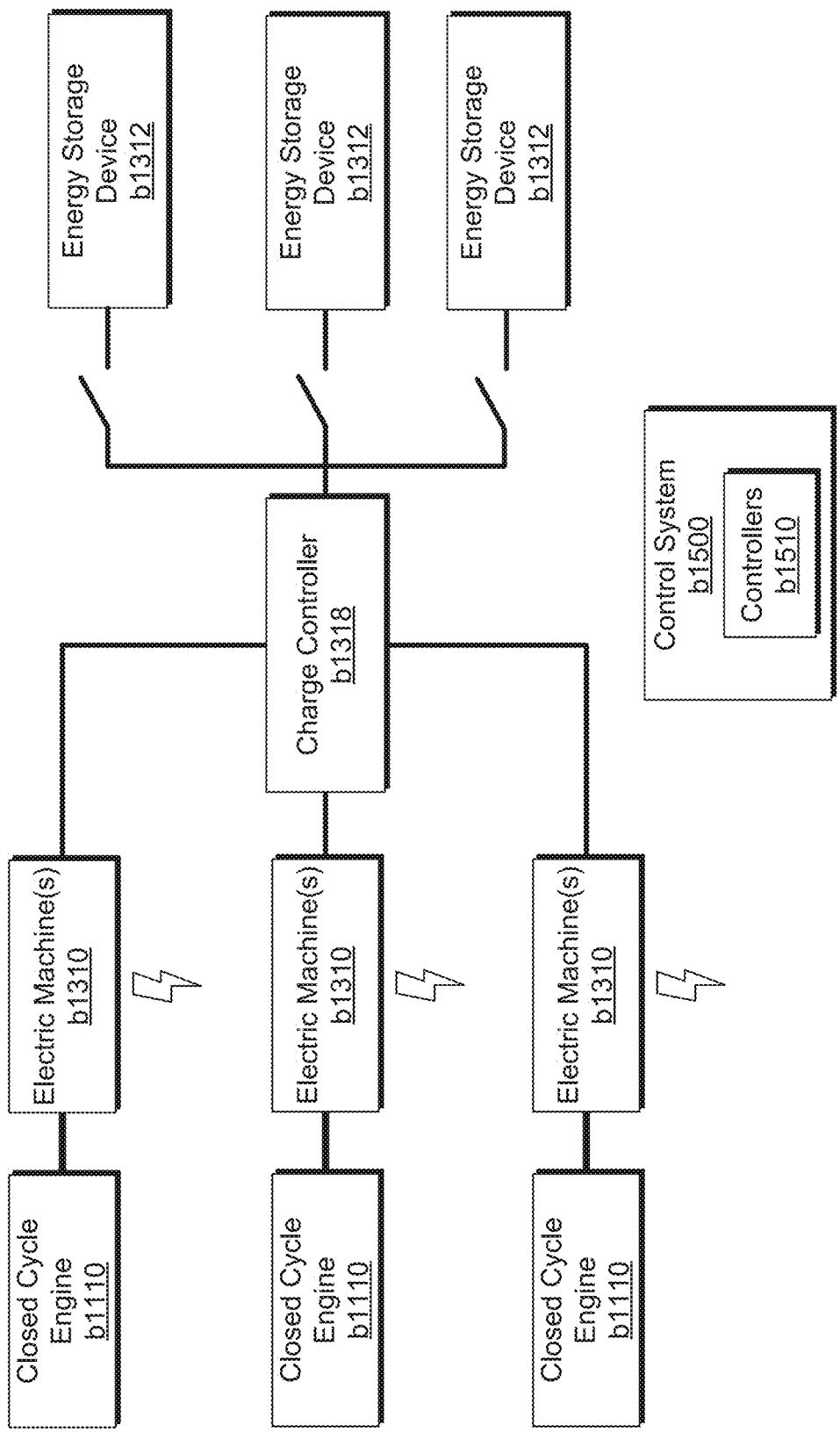
FIG. 32 provides a schematic view of a power generation system that includes a plurality of closed cycle engines each having one or more associated electric machines according to an example aspect of the present disclosure.

In some embodiments, the closed cycle engine b1110 and its associated electric machines b1310 are one of a plurality of closed cycle engines and electric machines b1310 of a power generation system b1000. For instance, FIG. 32 provides a schematic view of a power generation system b1000 that includes a plurality of closed cycle engines each having one or more associated electric machines b1310. Each of the electric machines b1310 of the system are in communication with a charge controller b1318. A plurality of energy storage devices b1312 are in communication with the charge controller b1318 as shown. A switching device can be positioned between the energy storage devices b1312 and the charge controller b1318. Moreover, each closed cycle engine b1110, electric machine b1310, and energy storage devices b1312 are communicatively coupled with the one or more controllers b1510 of the control system b1500. In such embodiments, instead of varying the operating parameter setpoint of a particular engine, the one or more controllers b1510 can control the engines, e.g., to on and off positions. In this way, when the charge capacity of the energy storage devices b1312 reach a predetermined charge (e.g., as shown in FIG. 31), the one or more controllers b1510 can cause one or more of the closed cycle engines b1110 to turn off. Moreover, in embodiments where one or more energy storage devices b1312 come on-line or require electrical power, the one or more controllers b1510 can cause one or more of the closed cycle engines to turn on. In addition, as noted herein, some closed cycle engine b1110 configurations can include piston assemblies b1120 that are movable independently of one another. In such embodiments, the one or more controllers b1510 can cause one or more of the piston assemblies b1120 to cease movement or startup based at least in part on the charge capacity of the one or more energy storage devices b1312.

Further, the one or more controllers b1510 can activate the one or more switching devices, e.g., for better maintaining the health of the energy storage devices b1312. For instance, the one or more controllers b1510 can activate a switching device to an open position based at least in part on a sensed temperature of the energy storage device. In this way, the one or more controllers b1510 can prevent the energy storage devices b1312 from overheating, among other benefits.

Figure 33:
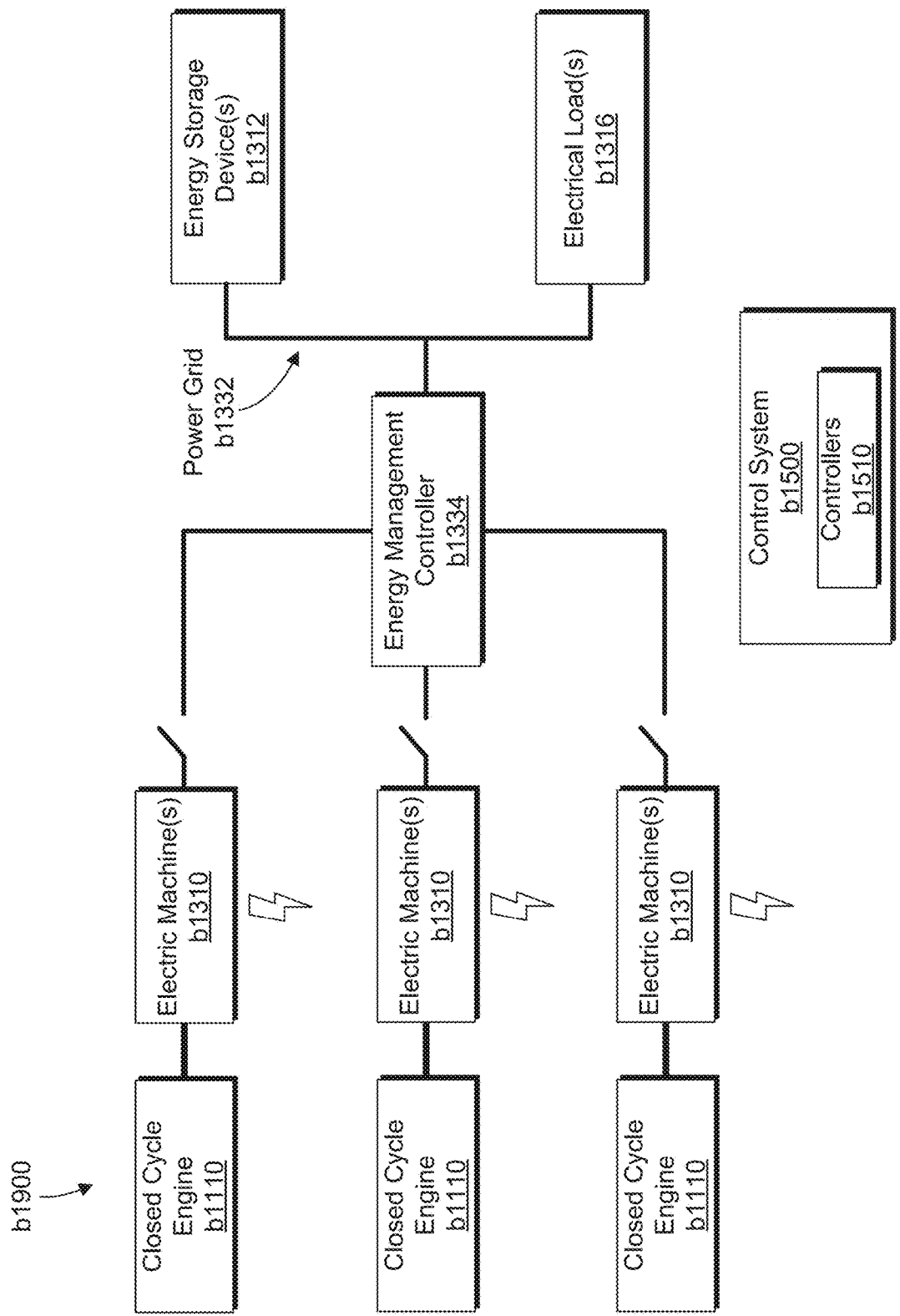
FIG. 33 provides a schematic view of a distributed power generation network that includes a plurality of closed cycle engines each having one or more associated electric machines according to an example aspect of the present disclosure.

FIG. 33 provides a schematic view of a distributed power generation network that includes a plurality of closed cycle engines each having one or more associated electric machines according to an example aspect of the present disclosure. For this embodiment, the closed cycle engine b1110 and its associated electric machines b1310 are one of a plurality of closed cycle engines b1110 and electric machines b1310 of a distributed power generation network b1900. For instance, FIG. 33 provides a schematic view of a distributed power generation network b1900 that includes a plurality of closed cycle engines each having one or more associated electric machines b1310. Each of the electric machines b1310 of the system are in communication with an energy management controller b1334. A switching device can be positioned between each electric machine b1310 and the energy management controller b1334. A power grid b1332 provides communication between the energy management controller b1334 and one or more energy storage devices b1312 and one or more electrical loads b1316. In such embodiments, instead of varying the operating parameter setpoint of a particular engine to control the electrical power output of the distributed network b1900, the one or more controllers b1510 can control the engines b1110, e.g., to on and off positions. In this way, when the charge capacity of the energy storage devices b1312 reach a predetermined charge (e.g., as shown in FIG. 31), the one or more controllers b1510 can cause one or more of the closed cycle engines b1110 to turn off and/or the switching device can be selectively controlled to control the electrical power to the power grid b1332 and ultimately to the energy storage devices b1312 and electrical loads b1316. Moreover, in embodiments where one or more energy storage devices b1312 and/or electrical loads b1316 come on-line or demand additional electrical power, the one or more controllers b1510 can cause one or more of the closed cycle engines b1110 to turn on and/or cause the switching devices to close the circuit to allow electrical power to flow from a given electric machine b1310 to the power grid b1332.

In addition, in some example embodiments, the operating parameter setpoint can be varied by the one or more controllers b1510 based at least in part on the charge acceptance rate of the energy storage devices b1312 in communication with the electric machines b1310. Particularly, the one or more controllers b1510 can receive data b1530 from one or more sensors associated with the one or more energy storage devices b1312. Based at least in part on the received data b1530, the one or more controllers b1510 can then determine the charge acceptance rate of the one or more energy storage devices b1312 in communication with the electric machines b1310. Moreover, the one or more controllers b1510 can determine a charging rate of the energy storage devices b1312, e.g., based at least in part on one or more operating parameters associated with the electric machines b1310 (e.g., electric current and/or voltage at the electric machines b1310). Thereafter, the one or more controllers b1510 can determine whether the charging rate exceeds the charge acceptance rate of the energy storage devices b1312. If the charging rate exceeds the charge acceptance rate of the energy storage devices b1312, the operating parameter setpoint can be changed or varied such that the charging rate is adjusted towards the charge acceptance rate of the energy storage devices b1312. On the other hand, if the charging rate does not exceed the charge acceptance rate of energy storage devices b1312, the operating parameter setpoint can be changed or varied such that the charging rate is adjusted closer to the determined charge acceptance rate of the energy storage devices b1312, e.g., for more efficient charging. Accordingly, in some implementations, the operating parameter setpoint can be varied based at least in part on the charge acceptance rate of the one or more energy storage devices b1312.

In yet other embodiments, the operating parameter setpoint can be varied by the one or more controllers b1510 based at least in part on an anticipated load change on the electric machines b1310. The anticipated load change can be determined by the one or more controllers b1510 based at least in part on the received load state of electrical device(s) in communication with the electric machines b1310, such as energy storage devices b1312, the power grid b1332, electrical loads b1316, etc. For instance, the load state data b1530 can be indicative of an anticipated change in electrical power demanded by the electrical device(s) on the electric machine(s) b1310 and an anticipated time at which the anticipated change in electrical power demanded by the electrical device on the electric machine is to occur. Thus, the magnitude and timing of the load change can be considered by the one or more controllers b1510 and the operating parameter set point can be varied accordingly. In some embodiments, the load state data includes a runtime indicator indicative of a time period or time at which one or more of the electrical devices or elements anticipate coming on-line or are scheduled to drop offline. Stated differently, the runtime indicator is indicative of a time period or time at which one or more electrical devices (e.g., electrical loads b1316, energy storage devices b1312, the power grid b1332, etc.) anticipate or are scheduled to receive electrical power from the electric machine b1310. In some embodiments, in addition to the runtime indicator, the load state data includes a power demand schedule indicative of the electrical power demand that each electrical device places on the electric machine(s) b1310 over a given period or runtime. In some embodiments, the power demanded by the electrical devices on the electric machine(s) b1310 are monitored by the one or more controller(s) b1510 so that dynamic load changes can be anticipated. Thus, in some embodiments, the electrical devices are in communication with or communicatively coupled with the one or more controller(s) b1510.

In some embodiments, particularly where there are multiple electrical devices in communication with the electric machine b1310, the load state of the electrical device is indicative of a total anticipated change in electrical power demanded by the plurality of electrical devices on the electric machine for a predetermined time period. For instance, the predetermined time period can be five seconds (5 s). The load state data can be used to anticipate the total anticipated load change over the predetermined time period. Thus, instead of making changes in response to every load change, the system varies the output of the engine and/or electric machine in response to a cumulative anticipated load over the predetermined time period, e.g., (5 seconds). This may, for example, prevent excessive ramping of the closed cycle engine and/or excessive varying of the operating parameter setpoint. Further, in some embodiments, the load state data b1530 can be indicative of the number of electrical devices (e.g., energy storage devices b1312) that are electrically connected with the electric machines b1310 and the electrical power demanded by the electrical devices on the electric machine(s) b1310.

Generally, by anticipating load changes on the electric machine b1310, the output of the closed cycle engine b1110 can more closely balance with the load on the electric machine b1310 when the anticipated load change actually occurs. In this manner, the piston assemblies b1120 are able to better maintain their respective amplitudes during a load change and amplitude spike increases and decreases can be prevented. The operating parameter setpoint can be varied to account for such anticipated loads so as to allow the closed cycle engine b1110 to better maintain steady-state operation despite dynamic load changes on the electric machines b1310.

At (b1724), returning to FIG. 29, the method (b1720) includes receiving, from the one or more sensors, data indicative of one or more operating parameters associated with at least one of the closed cycle engine b1110 and the one or more electric machines b1310. For instance, the one or more controllers b1510 can receive data from the one or more of the sensors, e.g., as shown in FIG. 19. In some embodiments, as noted above, the one or more controllers b1510 can also receive data indicative of a load state of the one or more energy storage devices b1312 in communication with the electric machines b1310. The one or more controllers b1510 can receive the sensor data from the sensors continuously, at a predetermined interval, and/or upon request.

As one example, the one or more controllers b1510 can receive, from the one or more piston sensors, data indicative of one or more piston movement characteristics. As noted previously, example piston movement characteristics can include piston position, speed, amplitude, frequency, and/or phase. Data indicative of the one or more piston movement characteristics can be received for one, some, or all of the piston assemblies b1120. As another example, the one or more controllers b1510 can receive, from the one or more pressure sensors b1522, data indicative of the pressure within the closed cycle engine b1110 at one or more positions or stations (e.g., within the piston bodies b1116 or along fluid pathways fluidly connecting the piston bodies b1116). As yet another example, the one or more controllers b1510 can receive, from the one or more temperature sensors b1524, data indicative of the temperature within the closed cycle engine b1110 at one or more positions or stations (e.g., within the piston bodies b1116 or along fluid pathways fluidly connecting the piston bodies b1116). Further, the one or more controllers b1510 can receive, from the one or more temperature sensors b1524, data indicative of the temperature at the combustor b1224 or heat source operable to provide thermal energy to the hot side b1112 of the closed cycle engine b1110.

In addition, as another example, the one or more controllers b1510 can receive, from the one or more electric machine sensors b1526, data indicative of one or more operating parameters associated with the one or more electric machines b1310. For instance, the one or more controllers b1510 can receive, from the one or more electric machine sensors b1526, data indicative of the electric current generated or passing through the electric machines b1310, including the amplitude, phase, and/or frequency of the electric current. Moreover, the one or more controllers b1510 can receive, from the one or more electric machine sensors b1526, data indicative of the voltage at the electric machines b1310, including the amplitude, phase, and/or frequency of the voltage. Furthermore, the one or more controllers b1510 can receive, from the one or more electric machine sensors b1526, data indicative of the magnetic field at the electric machines b1310.

As yet another example, the one or more controllers b1510 can receive, from the one or more energy storage device sensors b1528, data b1530 indicative of one or more operating parameters associated with the one or more energy storage devices b1312 in communication with the electric machines b1310. For instance, the one or more controllers b1510 can receive, from the one or more electric machine sensors b1526, data b1530 indicative of the load state of the energy storage devices b1312. In some embodiments, as noted above, the load state of the one or more energy storage devices b1312 is descriptive of at least one of a state of charge and a charge acceptance rate of the one or more energy storage devices b1312 in communication with the one or more electric machines b1310.

At (b1726), the method (b1700) includes determining a control command based at least in part on the received data indicative of the one or more operating parameters associated with at least one of the closed cycle engine and the one or more electric machines, wherein the control command is selected based at least in part to cause a change in output of the power generation system. For instance, the one or more controllers b1510 can receive the data at (b1724), and based at least in part on the received data, the one or more controllers b1510 can determine one or more control commands b1532 indicative of instructions for causing a change in an output of the power generation system b1000. Further, in some embodiments, the control command is determined by the one or more controllers b1510 based at least in part on the operating parameter setpoint set at (b1722).

As one example, the determined control command can be indicative of instructions for causing a change in an output of the one or more electric machines b1310, e.g., by adjusting the electrical load on the electric machines b1310, causing the electric machines b1310 to operate in a more or less efficient manner, etc. As another example, the determined control command can be indicative of instructions for causing a change in an output of the closed cycle engine b1110, which in turn causes a change in the output of the electric machines b1310 operatively coupled thereto. For instance, the control command can be indicative of instructions for causing a change to the pressure of the working fluid within or at some station or position within the engine, the temperature differential $\Delta T$ between the hot side b1112 and the cold side b1114, the volume of the working fluid within the closed cycle engine b1110, the number of moles of the working fluid within the closed cycle engine b1110, etc.

In some embodiments, the one or more controllers b1510 can determine the control command based on only a single operating parameter, such as e.g., piston speed, electric current at the electric machines b1310, the pressure at some station or position within the closed cycle engine b1110, etc. In yet other embodiments, the one or more controllers b1510 can determine the control command based on only two operating parameters, such as e.g., piston speed and the electric current at the electric machines b1310. In some further embodiments, the one or more controllers b1510 can determine the control command based on two or more operating parameters.

In some embodiments, determining the control command based at least in part on the received data indicative of the one or more operating parameters associated with at least one of the closed cycle engine b1110 and the one or more electric machines b1310 includes determining an error or difference between the operating parameter setpoint set at (b1722) and the received operating parameter at (b1724). The one or more controllers b1510 can then determine the control command based at least in part on the determined difference.

For instance, FIG. 34 provides a table of an example control law that associates various differences with various control commands b1532. The control law can be stored in one or more of the memory devices of the one or more controllers b1510, for example. The control law can be accessed by the one or more processors. As noted, the control law associates or corresponds various differences with various control commands b1532. Particularly, as depicted, a difference A corresponds to or is associated with a control command D. For instance, if the difference between the operating parameter setpoint and the received operating parameter yields an error or difference A, the control command D associated with the difference A is determined or selected as the control command. The control command D can be indicative of instructions for adjusting a controllable device b1534, such as e.g., a fuel control device b1214, such that an output of the power generation system b1000 is changed. More specifically, the control command D can be indicative of instructions for adjusting the controllable device b1534 such that the difference between the operating parameter setpoint and the sensed operating parameter received as part of the data is driven toward zero (0). In this way, the control command determined or selected based at least in part on data received from the one or more sensors, when provided to a controllable device, can cause the electric machine operatively coupled with the piston assembly to generate a preselected electrical power output.

As further shown in FIG. 34, a difference B corresponds to or is associated with a control command E, a difference C corresponds to or is associated with a control command F, and so on as the Nth difference corresponds with the Nth control command. In some embodiments, the determined difference and the control command can be associated with one another in a one-to-one relationship. In other embodiments, the determined difference and the control command can be associated with one another based at least in part on some mathematical relationship, such as via derivatives or integrals.

FIG. 35 provides an example feedback control loop for controlling the power generation system b1000 in accordance with an embodiment of the present disclosure. As shown in FIG. 35, an operating parameter setpoint b1536 is input into a summation block. For instance, the operating parameter setpoint b1536 input into the summation block can be the operating parameter setpoint set at (b1722). For this example, the operating parameter setpoint b1536 is a target piston speed of a piston assembly b1120 of the closed cycle engine b1110. The piston speed target can be selected to achieve a particular power output of the electric machines b1310. For instance, the one or more controllers b1510 can access the control law of FIG. 30 and select the piston speed that corresponds with the desired power output of the electric machines b1310. However, the operating parameter setpoint b1536 can be a target value for some other operating parameter associated with at least one of the electric machines b1310 and the closed cycle engine b1110. As further depicted, one or more sensed/calculated operating parameters b1538 received as part of the data at (b1724) are input into the summation block as well. For this example, the sensed/calculated operating parameter b1538 is the piston speed of the piston assembly b1120 of the closed cycle engine b1110. The piston speed of the piston assembly b1120 can be sensed by one of the piston movement sensors b1520.

The operating parameter setpoint b1536 (e.g., the target piston speed) and the sensed/calculated operating parameter b1538 (e.g., the actual piston speed of the piston assembly b1120) are input into the summation block and the one or more controllers b1510 then determine the error or difference b1540 therebetween. The one or more controllers b1510 can then make an adjustment to drive the difference b1540 toward zero (0). For instance, the one or more controllers b1510 can access the control law of FIG. 34, and can determine a control command that corresponds or is associated with the determined difference b1540. The control command is indicative of instructions for causing a change in an output of the power generation system b1000. As one example, the control command b1532 can be provided to a controllable device b1534 that is operable to control an input (e.g., a thermal input) to a working fluid disposed within the piston body b1116 in which the piston assembly b1120 is disposed. In this way, ultimately, the piston speed of the piston assembly b1120 is changed and the difference b1540 between the operating parameter setpoint b1536 and the sensed/calculated operating parameter b1538 is driven towards zero (0), and consequently, the amount of electrical power generated by the electric machine b1310 operatively coupled thereto is changed.

Figure 36:
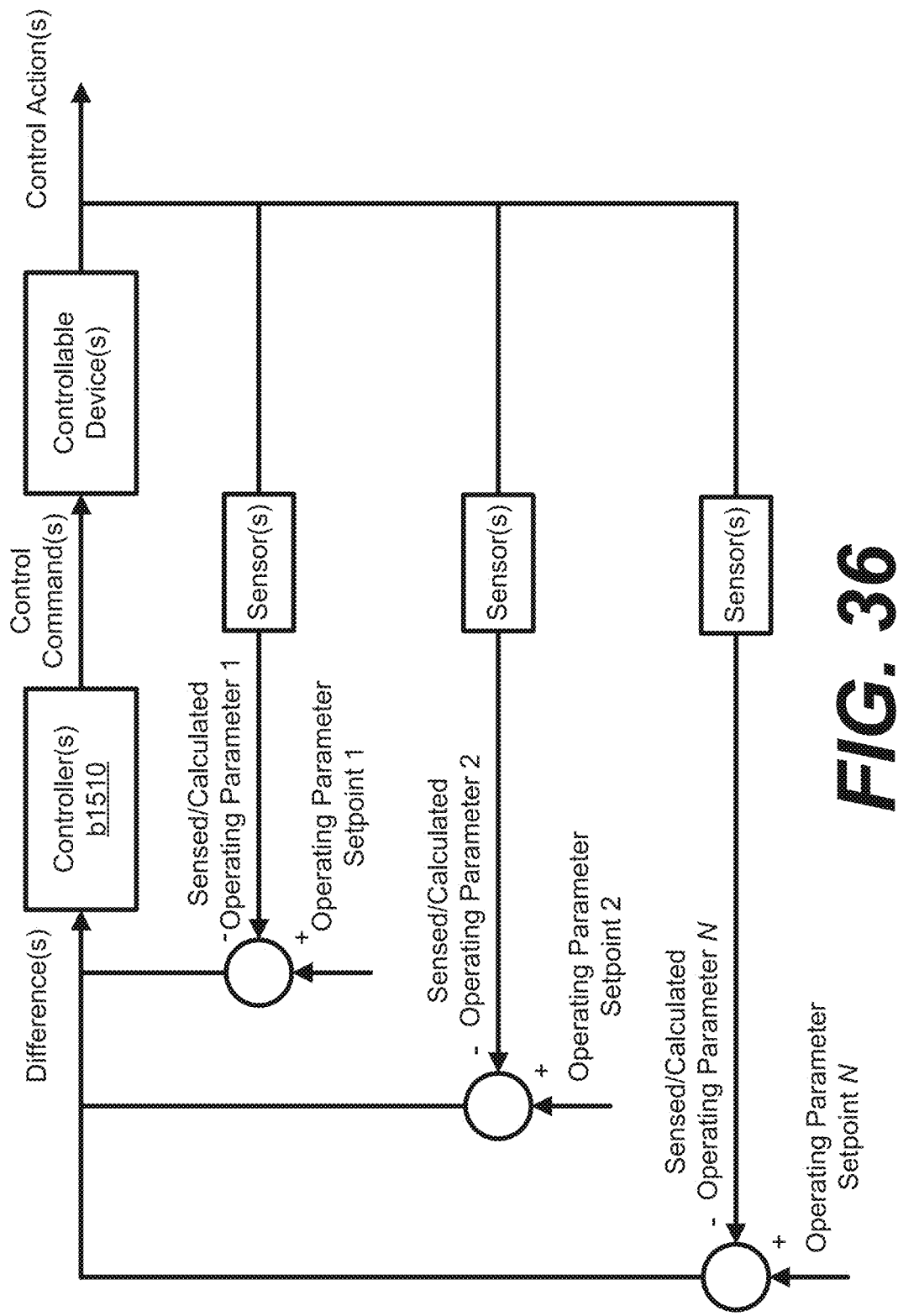
FIG. 36 provides another example feedback control loop for controlling the power generation system in accordance with an embodiment of the present disclosure.

FIG. 36 provides another example feedback control loop for controlling the power generation system b1000 in accordance with an embodiment of the present disclosure. As shown in FIG. 36, in some embodiments, a plurality of differences can be determined and the one or more controllers b1510 can output one or more control commands b1532 based at least in part on the determined differences. Particularly, a first operating parameter setpoint and a first sensed operating parameter are input into a first summation block. Once the first operating parameter setpoint (e.g., the target piston speed) and the first sensed operating parameter (e.g., the actual piston speed of the piston assembly b1120) are input into the first summation block, the one or more controllers b1510 then determine a first difference therebetween. The one or more controllers b1510 can then make an adjustment to drive the first difference toward zero (0), e.g., in a manner noted above. Further, a second operating parameter setpoint and a second sensed operating parameter are input into a second summation block. Once the second operating parameter setpoint (e.g., the target pressure of the working fluid at a station within the engine) and the second sensed operating parameter (e.g., the actual pressure of the working fluid at the station) are input into the second summation block, the one or more controllers b1510 then determine a second difference therebetween. The one or more controllers b1510 can then make an adjustment to drive the second difference toward zero (0), e.g., in a manner noted above. Moreover, a third operating parameter setpoint and a third sensed operating parameter are input into a third summation block. Once the third operating parameter setpoint (e.g., the voltage or current at the electric machines b1310) and the third sensed operating parameter (e.g., the actual voltage or electrical current at the electric machines b1310) are input into the third summation block, the one or more controllers b1510 then determine a third difference therebetween. The one or more controllers b1510 can then make an adjustment to drive the third difference toward zero (0), e.g., in a manner noted above. In such embodiments, the one or more controllers b1510 can determine each of the differences and determine one or more control commands b1532 that drive the differences toward zero (0). In some instances, the one or more controllers b1510 can assign weights to the differences, e.g., based on some preselected criteria, and determine the control commands b1532 in accordance with the determined differences and applied weights. The applied weights can be selected based at least in part on the selected control scheme and/or the importance of driving a particular difference toward zero (0). Further, the applied weights can be selected based at least in part on an optimization function that seeks to minimize or maximize a certain aspect of the power generation system b1000.

At (b1728), with reference again to FIG. 29, the method (b1700) includes providing the control command to a controllable device b1534. In this way, the controllable device b1534 can execute the control command (e.g., perform a control action) to change an output of the power generation system b1000. For instance, as shown in FIG. 35, the determined control command can be provided to the controllable device b1534. The controllable device b1534 can perform a control action b1542 based at least in part on the control command. For instance, if the controllable device b1534 is a valve and the control command is indicative of instructions for opening the valve to a set position or angle, the controllable device b1534 can actuate the valve to the set position based at least in part on the provided control command. When the controllable device b1534 performs the control action b1542 in accordance with the control command, the output of the power generation system b1000 is changed. For example, in performing the control action b1542, the controllable device b1534 can cause a change to the amount of work done on the piston by the working fluid within the piston body b1116 and/or the amount of work done by the piston on the working fluid within the piston body b1116 (e.g., depending on whether the working fluid is expanding or contracting). By changing the work done by or on the piston, the piston speed of the piston assembly b1120 is changed, which ultimately changes the output of the power generation system b1000. As noted herein, the controllable device b1534 can be any device communicatively coupled with the one or more controllers b1510 that, when commanded by the one or more controllers b1510 via a control command, causes a change in output of the power generation system b1000.

FIG. 37 provides a schematic view of an example heater loop b1210 of the balance of plant b1200 of the power generation system b1000 of FIGS. 5.1 and 18. As shown, in some example embodiments, the controllable device b1534 is a device operable to change the temperature differential ΔT between the hot side b1112 and the cold side b1114 of the closed cycle engine b1110. As one example, the controllable device b1534 is a fuel control device b1214 positioned along an intake line b1232 of the heater loop b1210. The one or more controllers b1510 can provide the control command to the fuel control device b1214, e.g., to change the amount of fuel flowing to the combustor b1224 positioned downstream of the fuel control device b1214 along the heater loop b1210. The fuel control device b1214 can perform a control action b1542 based at least in part on the provided control command. For instance, the fuel control device b1214 can modulate the amount of fuel provided to the combustor b1224, e.g., to change the fuel/air mixture thereof and consequently the heat input to the hot side b1112 of the closed cycle engine b1110.

As another example, with reference still to FIG. 37, the controllable device b1534 can be an actuator b1226 operable to move or control a recirculation device b1230 positioned along the heater loop b1210. The actuator b1226 is operatively coupled with the recirculation device b1230. The one or more controllers b1510 can provide the control command to the actuator b1226, e.g., to change the amount of combustion gasses or heating working fluid HWF recirculated to the combustor b1224. In this way, the equivalence ratio (i.e., the ratio of the actual fuel/air ratio to the stoichiometric fuel/air ratio) can be changed, and thus ultimately the heat input to the hot side b1112 of the closed cycle engine b1110 can be changed, which in turn changes the output of the power generation system b1000. In some example embodiments, the recirculation device b1230 is a geometry-based control device. For instance, e.g. the geometry-based control device can be built into some portion of the heater body. Based upon one or more flowrates through the passages of the heater body, the geometry-based control device can direct a preselected amount of recirculated heating working fluid HWF to the combustor b1224 with the remaining portion being exhausted from the system and/or used as a heat recovery source for imparting thermal energy to components of the heater loop b1210 and/or the chiller loop b1212 and/or some other thermal system or application in fluid communication with the balance of plant b1200 of the cycle engine.

As yet another example, the controllable device b1534 can be the compressor b1222 of the heater loop b1210. The one or more controllers b1510 can provide the control command to the compressor b1222, e.g., to change the speed of the compressor b1222. In this way, the mass flow and/or the pressure of the air flowing downstream to the combustor b1224 can be changed, and thus ultimately the heat input to the hot side b1112 of the closed cycle engine b1110 can be changed, which in turn changes the output of the power generation system b1000.

As another example, the controllable device b1534 is a device operable to change the temperature differential ΔT between the hot side b1112 and the cold side b1114 of the closed cycle engine b1110, and particularly, the device is operable to remove more or less heat from the cold side b1114 of the closed cycle engine b1110. For instance, the controllable device b1534 can be a compressor, pump, turbine, or some other controllable device b1534 positioned along the chiller loop b1212 of the balance of plant b1200 of the closed cycle engine b1110.

Figure 38:
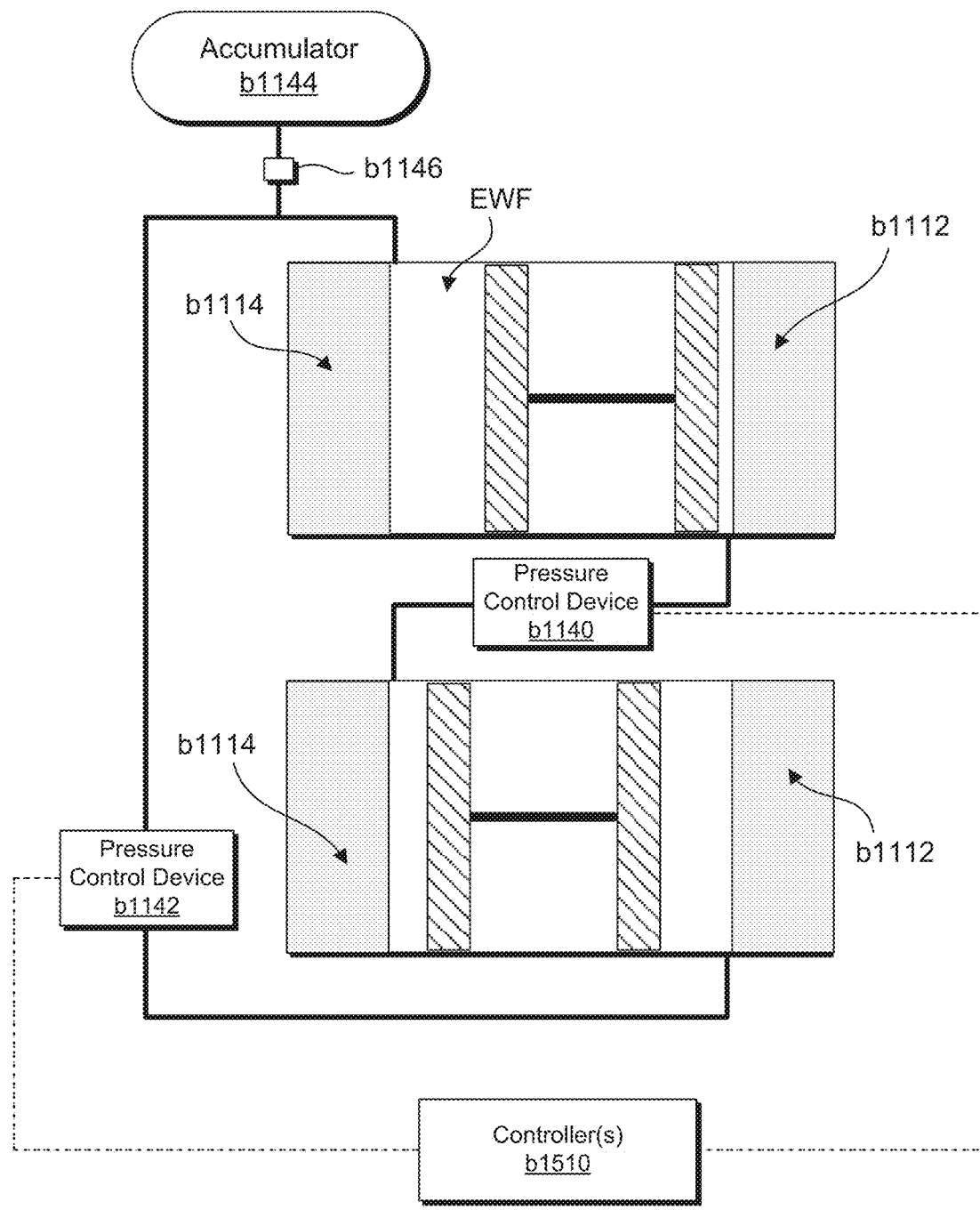
FIG. 38 provides a schematic view of two fluidly coupled piston bodies of the closed cycle engine of FIG. 18.

FIG. 38 provides a schematic view of two fluidly coupled piston bodies b1116 of the closed cycle engine b1110 of FIG. 18. As shown, in some example embodiments, the controllable device b1534 is a device operable to change the pressure and/or the number of molecules of the fluid within the closed cycle engine b1110, e.g., at a particular station of the engine. As one example, the controllable device b1534 can be one or more pressure control devices positioned along a fluid pathway fluidly connecting the piston bodies b1116. The controllable device b1534 can include multiple pressure control devices b1140, b1142, e.g., as depicted in FIG. 38. The pressure control devices b1140, b1142 are communicatively coupled with the one or more controllers b1510. The one or more controllers b1510 can provide the control command to the pressure control devices b1140, b1142, e.g., to change the pressure of the engine working fluid EWF within the closed cycle engine b1110. The pressure control devices b1140, b1142 can perform a control action based at least in part on the provided control command. For instance, the pressure control devices b1140, b1142 can modulate the pressure of the engine working fluid EWF. In this way, the work done by the piston assembly b1120 on the engine working fluid EWF (e.g., during a compression stroke) or the work done on the piston assembly b1120 by the engine working fluid EWF (e.g., during an expansion stroke) can be changed, and thus the output of the power generation system b1000 can be changed.

In yet other embodiments, the pressure control devices b1140, b1142 can add or remove engine working fluid EWF (e.g., the pressure control devices b1140, b1142 can release engine working fluid EWF to an ambient environment) such that the number of molecules of working fluid is changed, which ultimately changes the work done on or by the piston assemblies b1120, which in turn causes the electric machines b1310 to generate more or less electrical power, or more generally, the output of the power generation system b1000 is changed. In yet further embodiments, the closed cycle engine b1110 can include an accumulator b1144 that can change the pressure of the working fluid within the closed cycle engine b1110 or can change the number of molecules of the working fluid. A valve b1146 or the like can be controlled by the one or more controllers b1510 to selectively allow an amount of working fluid to flow into or out of the accumulator b1144.

With reference again to FIG. 18, in some example embodiments, the controllable device b1534 is a device operable to change the load on the electric machines b1310 (i.e., the torque load thereon), which causes a change in the amount of electrical power generated by the one or more electric machines b1310. Changing the electrical load on the electric machines b1310 may also change the motion characteristics of the piston assemblies b1120 of the closed cycle engine b1110. As one example, the controllable device b1534 is a charge controller b1318 in communication with the electric machines b1310. The charge controller b1318 can include one or more switching devices operable to selectively apply a load on the electric machines b1310. The switching devices of the flow control device can be controlled by the one or more controllers b1510 to selectively apply a predetermined load on the electric machines b1310. For instance, based at least in part on a provided control command, the switching devices can allow the energy storage devices b1312 to apply an electric load on the electric machines b1310, or in some instances, the switching devices can prevent the energy storage devices b1312 from applying an electric load on the electric machines b1310. Further, in some embodiments, based at least in part on one or more control commands b1532, the switching devices of the charge controller b1318 can selectively allow one or more resistor banks of the electrical braking system b1320 to apply an electric load on the electric machines b1310, or in some instances, the switching devices can prevent the resistor banks of the electrical braking system b1320 from applying an electric load on the electric machines b1310.

As another example, the controllable device b1534 can be a mechanical braking system b1400 operatively coupled with the electric machines b1310. The one or more controllers b1510 can control the mechanical braking system b1400 to selectively apply a predetermined load on the electric machines b1310. Particularly, the one or more controllers b1510 can provide the control command to the mechanical braking system b1400 and the mechanical braking system b1400 can perform a control action to execute the control command. For instance, the mechanical braking system b1400, when commanded to do so, can apply a predetermined load on the electric machines b1310. Further, the control command can be indicative of instructions to apply more or less of a predetermined load on the electric machines b1310, e.g., to change an output of the power generation system b1000.

As yet another example, the one or more controllers b1510 can cause the one or more electric machines b1310 to operate in a less efficient manner. For instance, the one or more controllers b1510 can provide a control command indicative of instructions for the electric machines b1310 to operate in a less efficient manner, e.g., to apply a predetermined load or torque on the closed cycle engine b1110, which ultimately changes the output of the power generation system b1000. By way of example, the phase or current advance angle, the amplitude of phase current, or some other operating parameter known to affect the efficiency of electric machines b1310 can be controlled to operate one or more of the electric machines b1310 in a reduced-efficiency mode. In some embodiments, the one or more controllers b1510 can cause the one or more electric machines b1310 operate in a more efficient manner, e.g., to change the applied predetermined torque load on the closed cycle engine b1110.

In some implementations, the load state of the electrical device received as part of the data can account for a power generation state of one or more other power generation systems. For instance, with reference to FIG. 22, the load state data associated the electrical device received by the controller b1510 can be indicative of a power generation state of other power generation systems in communication with the electrical device (e.g., the energy storage devices b1312 and/or the electrical loads b1316 via the power grid b1332). Particularly, the load state data associated with the electrical device received by the controller b1510 can be indicative of a power generation state of the first power generation system, the second power generation system, and so on to the Nth power generation system. The power generation state data can be received as part of the load state data of the electrical device as noted above, or in some implementations, directly from the power generation system itself. The power generation state data can include how much and when other power generation systems anticipate providing electrical power to the energy storage devices b1312 and/or the electrical loads b1316 via the power grid b1332. Accordingly, the controller b1510 can receive data b1530 indicative of the power generation state of each power generation system in communication with the electrical device, which can include when and how much the other power generation systems anticipate providing electrical power thereto, which ultimately affects the load state of the electrical device (e.g., the power demanded from the electric machine b1310 by the electrical device). In this way, the closed cycle engine b1110 can ramp up or down to anticipate load changes on the electric machine b1310.

With reference again to FIGS. 32 and 33, in some implementations, the load state of the electrical device received as part of the data can account for a power generation state of one or more other power generation systems that include a closed cycle engine and one or more associated electric machines. In addition, the load state of the electrical device can take into account a plurality of electrical device load states, such as the load state of each energy storage device b1312 shown in FIG. 32. The controller b1510 can utilize the collective load state data of the electrical devices to anticipate power demand changes, or stated differently, load changes on the electric machine b1310. Further, with reference to FIG. 33, the load state of the electrical device received as part of the data can account for a load state of one or more other electrical loads b1316 and/or energy storage devices b1312 in communication with the energy management system b1334. In this way, certain closed cycle engines b1110 of the distributed power network b1900 can be ramped up or down or turned on or off to meet anticipated power demand changes, which as noted above, can ultimately cause load changes on the electric machine b1310.

In some embodiments, the control system b1500 of the power generation system b1000 is operatively configured to prevent the electric machines b1310 from overheating. In such embodiments, with reference again to FIG. 18, during operation of the power generation system b1000, particularly in charging mode, the one or more controllers b1510 can monitor the temperature of the electric machines b1310. Particularly, the one or more controllers b1510 can receive data indicative of one or more operating parameters associated with the electric machines b1310. For instance, the one or more operating parameters received as part of the data can include a temperature of the electric machines b1310. The data can be received from an electric machine b1310 sensor operable to detect or measure temperature at the electric machine b1310.

Next, the one or more controllers b1510 can determine whether the electric machine b1310 temperature is within a preselected operating range. For example, the one or more controllers b1510 can determine whether the electric machine b1310 temperature exceeds (e.g., goes above) a predetermined temperature threshold. If the one or more controllers b1510 determine that the electric machine b1310 temperature exceeds the predetermined temperature threshold, the one or more controllers b1510 can determine a control command indicative of instructions for returning the electric machine b1310 temperature below the predetermined temperature threshold. The control command can then be provided to one or more controllable devices b1534 of the system, such as e.g., any of the controllable devices b1534 noted herein. The controllable devices b1534 can then perform a control action to execute the control command, e.g., to drive or return the electric machine b1310 temperature below the predetermined temperature threshold. As one example, when the controllable device b1534 performs the control action to execute the control command, the control action performed by the controllable device b1534 can cause the piston assemblies b1120 to reduce in speed or amplitude for a predetermined time, e.g., until the electric machine b1310 temperature falls below the predetermined temperature threshold. As yet another example, when the controllable device b1534 performs the control action to execute the control command, the control action performed by the controllable device b1534 can cause the load on the electric machine b1310 to decrease for a predetermined time, e.g., until the electric machine b1310 temperature falls below the predetermined temperature threshold.

In some embodiments, the control system b1500 of the power generation system b1000 is operatively configured to prevent overcharging of the one or more energy storage devices b1312 in communication with the electric machines b1310. In such embodiments, during operation of the power generation system b1000, particularly in charging mode, the one or more controllers b1510 can monitor the load state of the one or more energy storage devices b1312 in communication with the electric machines b1310. Particularly, the one or more controllers b1510 can receive data indicative of state of charge and/or the charge acceptance rate of the one or more energy storage devices b1312. The data can be received from one or more sensors associated with the one or more energy storage devices b1312. The load state of the energy storage devices can be continuously monitored or monitored at a predetermined interval, for example.

In some embodiments, the one or more controllers b1510 can then determine whether the state of charge of the energy storage devices b1312 is within a preselected operating range. For example, the one or more controllers b1510 can determine whether the state of charge of the energy storage devices b1312 exceeds (e.g., goes above) a predetermined charge threshold or capacity. If the one or more controllers b1510 determine that the state of charge exceeds the predetermined charge threshold, the one or more controllers b1510 can determine a control command indicative of instructions for ceasing charging operations. The control command can then be provided to one or more controllable devices b1534 of the system, such as e.g., any of the controllable devices b1534 noted herein. The controllable devices b1534 can then perform a control action to execute the control command, e.g., to cease charging operation.

In some embodiments, after receiving the data, the one or more controllers b1510 can determine whether the charge acceptance rate of the energy storage devices b1312 is within a preselected operating range. For example, the one or more controllers b1510 can determine whether the charge acceptance rate of the energy storage devices b1312 exceeds (e.g., falls below) a predetermined minimum charge rate threshold. If the one or more controllers b1510 determine that the charge acceptance rate exceeds the predetermined minimum charge rate threshold, the one or more controllers b1510 can determine a control command indicative of instructions for ceasing charging operations. The control command can then be provided to one or more controllable devices b1534 of the system, such as e.g., any of the controllable devices b1534 noted herein. The controllable devices b1534 can then perform a control action to execute the control command, e.g., to cease charging operation.

Figure 39:
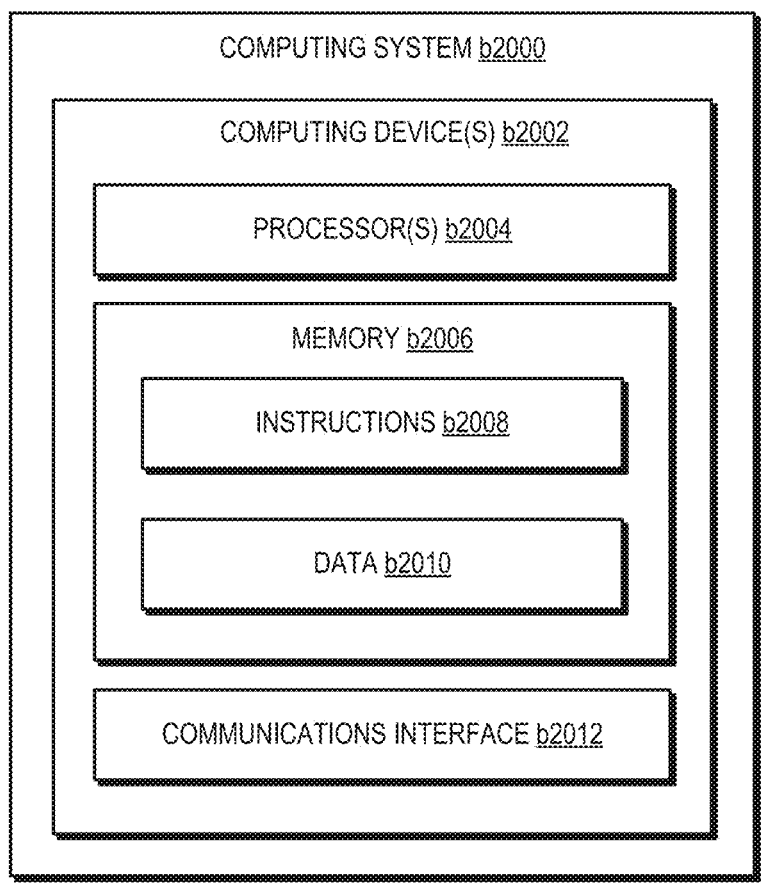
FIG. 39 provides an example computing system in accordance with an example embodiment of the present disclosure.

FIG. 39 provides an example computing system in accordance with an example embodiment of the present disclosure. The one or more controllers, computing devices, or other control devices described herein can include various components and perform various functions of the one or more computing devices of the computing system b2000 described below.

As shown in FIG. 39, the computing system b2000 can include one or more computing device(s) b2002. The computing device(s) b2002 can include one or more processor(s) b2004 and one or more memory device(s) b2006. The one or more processor(s) b2004 can include any suitable processing device, such as a microprocessor, microcontroller, integrated circuit, logic device, and/or other suitable processing device. The one or more memory device(s) b2006 can include one or more computer-readable media, including, but not limited to, non-transitory computer-readable media, RAM, ROM, hard drives, flash drives, and/or other memory devices.

The one or more memory device(s) b2006 can store information accessible by the one or more processor(s) b2004, including computer-readable instructions b2008 that can be executed by the one or more processor(s) b2004. The instructions b2008 can be any set of instructions that when executed by the one or more processor(s) b2004, cause the one or more processor(s) b2004 to perform operations. In some embodiments, the instructions b2008 can be executed by the one or more processor(s) b2004 to cause the one or more processor(s) b2004 to perform operations, such as any of the operations and functions for which the computing system b2000 and/or the computing device(s) b2002 are configured, such as e.g., operations for controlling certain aspects of power generation systems and/or controlling one or more closed cycle engines as described herein. For instance, the methods described herein can be implemented in whole or in part by the computing system b2000. Accordingly, the method can be at least partially a computer-implemented method such that at least some of the steps of the method are performed by one or more computing devices, such as the exemplary computing device(s) b2002 of the computing system b2000. The instructions b2008 can be software written in any suitable programming language or can be implemented in hardware. Additionally, and/or alternatively, the instructions b2008 can be executed in logically and/or virtually separate threads on processor(s) b2004. The memory device(s) b2006 can further store data b2010 that can be accessed by the processor(s) b2004. For example, the data b2010 can include models, databases, etc.

The computing device(s) b2002 can also include a network interface b2012 used to communicate, for example, with the other components of system (e.g., via a network). The network interface b2012 can include any suitable components for interfacing with one or more network(s), including for example, transmitters, receivers, ports, controllers b1510, antennas, and/or other suitable components. One or more controllable devices b1534 and other controllers b1510 can be configured to receive one or more commands or data from the computing device(s) b2002 or provide one or more commands or data to the computing device(s) b2002.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. The scope of the invention(s) described herein is defined by one or more of the claims, including combinations of two or more claims or clauses (as set forth below) and may include other examples that occur to those skilled in the art.

What is claimed is:

1. A system for energy conversion, comprising:
   a closed cycle engine having a piston body defining a hot side and a cold side and having a piston assembly movable within the piston body, wherein the closed cycle engine contains a volume of engine working fluid;
   an electric machine operatively coupled with the piston assembly, wherein the electric machine is operable to generate electrical power when the piston assembly is moved within the piston body; and
   a control system, comprising:
      one or more sensors operable to detect at least a pressure of engine working fluid in the closed cycle engine and a piston movement characteristic corresponding at least to a frequency of the piston assembly movable within the piston body;
      a controllable device; and
      a controller communicatively coupled with the one or more sensors and the controllable device, the controller being configured to:
         determine a control command based at least in part on data indicative of the pressure of engine working fluid and frequency of the piston assembly received from the one or more sensors, the control command selected based at least in part to cause the electric machine operatively coupled with the piston assembly to generate a preselected electrical power output, and wherein the control command is selected based at least in part to generate a ratio of 0.10 or greater of electrical power output to a product of an average cycle pressure of the engine working fluid, an average cycle frequency of the piston assembly, and a swept volume of engine working fluid; and
         provide the determined control command to the controllable device, the controllable device operable to control an input to the engine working fluid that causes expansion and contraction of the engine working fluid, wherein expansion and contraction of the engine working fluid causes the piston assembly to move within the piston body.

2. The system of claim 1, wherein the electric machine comprises:
   a dynamic member operably connected to the piston assembly, and
   a stator assembly surrounding the dynamic member, wherein the electric machine is operatively coupled to the piston assembly to generate electrical power when the piston assembly is moved within the piston chamber.

3. The system of claim 2, wherein the piston assembly has two opposing pistons operatively coupled via a connection member, and wherein the dynamic member is connected to the connection member of the piston assembly.

4. The system of claim 1, wherein the piston assembly has two opposing pistons operatively coupled via a connection member, and wherein the system defines an outer end and an inner end each relative to a lateral extension of the piston assembly, wherein the outer end defines laterally distal ends of the system and the inner end defines a laterally inward position of the system, and wherein the electric machine is positioned at the inner end between the pistons of the piston assembly.

5. The system of claim 4, wherein the hot side of the closed cycle engine is at or proximate to the outer end, and wherein the cold side of the closed cycle engine is at or proximate to the inner end.

6. The system of claim 5, the system comprising:
   a heater body configured to produce a heating working fluid, wherein the heater body is positioned at or proximate to the hot side of the closed cycle engine, and wherein the electric machine is positioned at or proximate to the cold side of the closed cycle engine.

7. The system of claim 6, wherein the system comprises two heater bodies each positioned next to four hot chambers at the hot side of the closed cycle engine, and wherein the hot chambers are positioned in circumferential arrangement relative to a reference longitudinal axis of the closed cycle engine.

8. The system of claim 5, the system comprising:
   a cold side heat exchanger positioned in heat exchange relationship with the cold side of the closed cycle engine and configured to remove heat from the cold side.

9. The system of claim 8, wherein the cold side heat exchanger is positioned at or proximate to the inner end of the closed cycle engine.

10. The system of claim 1, the system comprising:
    a chiller loop positioned in a heat transfer relationship with the cold side of the closed cycle engine.

11. The system of claim 10, wherein the controllable device is operable to remove more or less heat from the cold side of the closed cycle engine, and wherein the controllable device is a compressor, pump, and/or turbine positioned along the chiller loop.

12. The system of claim 1, the system comprising:
    a heater loop operable to generate heat and positioned in heat exchange relationship with the hot side of the closed cycle engine.

13. The system of claim 12, wherein the controllable device is a fuel control device operable to selectively allow a fuel to flow to a combustor positioned in fluid communication with a hot side heat exchanger positioned along the heater loop in heat exchange relationship with the hot side of the closed cycle engine.

14. The system of claim 12, wherein the controllable device is a compressor positioned along an intake line of the heater loop, the compressor operable to change an amount of air received by a combustor positioned along the intake line downstream of the compressor.

15. The system of claim 1, the system comprising:
    an energy storage device in communication with the electric machine, wherein the energy storage device in communication with the electric machine is operable to receive electrical power therefrom or provide electrical power thereto.

16. The system of claim 15, wherein the data received from the one or more sensors is indicative of a load state of the energy storage device, and wherein the control command is determined based at least in part on the load state of the energy storage device, and wherein the load state of the energy storage device is indicative of at least one of a state of charge or a charge acceptance rate of the energy storage device.

17. The system of claim 1, wherein the controller is configured to:
set an operating parameter setpoint;
receive data indicative of one or more operating parameters associated with at least one of the closed cycle engine and the electric machine; and
determine the control command based at least in part on the received data indicative of the one or more operating parameters and the operating parameter setpoint, the control command being indicative of instructions for causing a change in an output of the system.

18. The system of claim 17, wherein the operating parameter setpoint is indicative of an operating parameter associated with the electric machine, and wherein the operating parameter is indicative of a target electrical current, a target voltage, or both, generated by or at the electric machine.

19. The system of claim 17, wherein the operating parameter setpoint is indicative of an operating parameter associated with the closed cycle engine, and wherein the operating parameter setpoint associated with the closed cycle engine is indicative of one or more of a target pressure at a position within or fluidly connected with the piston body or a target temperature at a position within or fluidly connected with the piston body.

20. The system of claim 17, wherein the operating parameter setpoint is indicative of an operating parameter associated with the closed cycle engine, and wherein the operating parameter setpoint associated with the closed cycle engine is indicative of an operating parameter associated with movement of the piston assembly, and wherein the operating parameter associated with movement of the piston assembly is one or more of a target speed of the piston assembly, a target amplitude of the piston assembly, or a target position of the piston assembly at some point along a stroke of the piston assembly.

21. The system of claim 17, wherein the operating parameter setpoint is indicative of an operating parameter associated with the closed cycle engine, and wherein the operating parameter setpoint associated with the closed cycle engine is indicative of a target temperature differential of the engine working fluid at a hot chamber at one piston body at one piston assembly and a cold chamber at another piston body at another piston assembly fluidly interconnected with the hot chamber, and wherein the temperature differential is at least 630 degrees Celsius.

22. The system of claim 17, wherein the operating parameter setpoint is indicative of an operating parameter associated with the closed cycle engine, and wherein the operating parameter setpoint associated with the closed cycle engine is indicative of a target temperature of the engine working fluid at a cold chamber positioned within or fluidly connected with the piston body, and wherein the target temperature is between −20 degrees Celsius and 120 degrees Celsius.

23. The system of claim 22, wherein the cold chamber at the cold side of the piston body and a cold side heat exchanger positioned in heat exchange relationship with the cold side of the closed cycle engine together form an integral, unitary structure.

24. The system of claim 1, wherein the control command is selected based at least in part to generate a ratio between 0.10 and 0.35 of electrical power output to a product of an average cycle pressure of the engine working fluid, an average cycle frequency of the piston assembly, and the swept volume of engine working fluid.

25. The system of claim 1, wherein the controller is configured to determine the control command based at least in part on data indicative of the pressure of engine working fluid at each piston assembly and the frequency of each piston assembly, and wherein the control command is selected based on generating a balanced pressure arrangement of a plurality of the piston bodies in fluid interconnection at different piston assemblies.

26. The system of claim 1, wherein each piston body has a hot chamber and a cold chamber, and wherein each hot chamber of each piston body at each piston assembly is fluidly interconnected in balanced pressure arrangement to a respective cold chamber of another piston body at another piston assembly, and wherein an integral, unitary structure of the cold chamber, the piston body, and a cold side heat exchanger in heat exchange relationship with the cold side of the closed cycle engine provides a ratio of maximum cycle volume of the engine working fluid to a volume of the engine working fluid in the cold side heat exchanger between 10 and 100 when the control command generates the ratio of 0.10 or greater of electrical power output to a product of the average cycle pressure of the engine working fluid, the average cycle frequency of the piston assembly, and the swept volume of engine working fluid.

27. The system of claim 1, wherein the control command is selected based at least in part to generate a ratio between 0.0005 and 0.0040 kW per cubic centimeter of electrical power output from each piston assembly to a maximum cycle volume of the engine working fluid.

28. A system for energy conversion, comprising:
a closed cycle engine containing an engine working fluid and having at least three piston assemblies each moveable within respective piston bodies, wherein each piston assembly has two opposing pistons operatively coupled via a connection member, and wherein each piston body defines a hot side thermally coupled to a hot chamber and a cold side thermally coupled to a cold chamber and separated from the hot chamber by the piston, and wherein the hot chambers and the cold chambers are in balanced pressure arrangement at least by a fluid interconnection of each hot chamber of one piston body at one piston assembly and the cold chamber of another piston body of another piston assembly to one another, wherein at least one pair of the fluid interconnection of the hot chamber of one piston body at one piston assembly and the cold chamber of another piston body at another piston assembly is laterally spaced by the connection member;
an electric machine operatively coupled with one or more piston assemblies, wherein the electric machine is operable to generate electrical power when the piston assembly is moved within the piston body; and
a control system, comprising:
one or more sensors operable to detect a piston movement characteristic of the piston assembly movable within the piston body;
a controllable device; and a controller communicatively coupled with the one or more sensors and the controllable device, the controller being configured to:
  determine a control command based at least in part on data received from the one or more sensors, the control command selected based at least in part to cause the electric machine operatively coupled with the piston assembly to generate a preselected electrical power output, and wherein the control command is selected based at least in part to generate a ratio of 0.10 or greater of electrical power output to a product of an average cycle pressure of the engine working fluid, an average cycle frequency of the piston assembly, and a swept volume of engine working fluid; and
  provide the determined control command to the controllable device, the controllable device operable to control an input to an engine working fluid disposed within the piston body, wherein expansion and contraction of the engine working fluid causes the piston assembly to move within the piston body.

29. The system of claim 28, wherein the cold chamber at the cold side of the piston body and a cold side heat exchanger positioned in heat exchange relationship with the cold side of the closed cycle engine together form an integral, unitary structure.

30. The system of claim 29, wherein the integral, unitary structure provides a ratio of maximum cycle volume of the engine working fluid to a volume of the engine working fluid in the cold side heat exchanger between 10 and 100 when the control command generates the ratio of 0.10 or greater of electrical power output to the product of the average cycle pressure of the engine working fluid, the average cycle frequency of the piston assembly, and the swept volume of engine working fluid.

* * * * *